(12) United States Patent
Kim et al.

(10) Patent No.: US 12,411,575 B2
(45) Date of Patent: Sep. 9, 2025

(54) TOUCH SENSOR AND TOUCH INPUT DEVICE COMPRISING SAME

(71) Applicant: HiDeep Inc., Seongnam-si (KR)

(72) Inventors: Bonkee Kim, Seongnam-si (KR); Seyeob Kim, Seongnam-si (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 18/264,173

(22) PCT Filed: Jan. 26, 2022

(86) PCT No.: PCT/KR2022/001398
§ 371 (c)(1),
(2) Date: Aug. 3, 2023

(87) PCT Pub. No.: WO2022/169185
PCT Pub. Date: Aug. 11, 2022

(65) Prior Publication Data
US 2024/0231532 A1 Jul. 11, 2024

(30) Foreign Application Priority Data

Feb. 4, 2021 (KR) .................. 10-2021-0016237
Feb. 5, 2021 (KR) .................. 10-2021-0017097
Feb. 5, 2021 (KR) .................. 10-2021-0017098

(51) Int. Cl.
*G06F 3/041* (2006.01)
*G06F 3/044* (2006.01)
*G06F 3/046* (2006.01)

(52) U.S. Cl.
CPC ........ *G06F 3/04166* (2019.05); *G06F 3/0418* (2013.01); *G06F 3/0443* (2019.05);
(Continued)

(58) Field of Classification Search
CPC .. G06F 3/03545; G06F 3/0446; G06F 3/0442; G06F 3/04166; G06F 3/0445;
(Continued)

(56) References Cited

U.S. PATENT DOCUMENTS 9,105,255 B2  8/2015  Brown et al.
9,417,747 B2  8/2016  Yumoto et al.
(Continued)

FOREIGN PATENT DOCUMENTS

CN  206627937 U  11/2017
JP  2013228855 A  11/2013
(Continued)

OTHER PUBLICATIONS

International Search Report issued in PCT Published Application No. WO 2022/169185 (A2).
(Continued)

*Primary Examiner* — Sujit Shah
(74) *Attorney, Agent, or Firm* — The Belles Group, P.C.

(57) ABSTRACT

Provided are a touch sensor and a touch input device including the same. The touch sensor includes a driving electrode including a plurality of driving pattern parts arranged in a first direction and a connection pattern configured to electrically connect two driving pattern parts, which are adjacent to each other, of the plurality of driving patterns to each other, and a receiving electrode, in which a first receiving pattern part and a second receiving pattern part, which are disposed with the connection pattern of the driving electrode therebetween, are alternatively arranged in a second direction perpendicular to the first direction.

14 Claims, 41 Drawing Sheets

(52) U.S. Cl.
CPC ............ *G06F 3/0446* (2019.05); *G06F 3/046* (2013.01); *G06F 2203/04107* (2013.01); *G06F 2203/04108* (2013.01)

(58) Field of Classification Search
CPC .................. G06F 3/046; G06F 3/0441; G06F 2203/04106; G06F 2203/04103; G06F 3/047; G06F 3/0443; G06F 3/044; G06F 3/04162; G06F 3/0383; G06F 3/0412; G06F 3/0416; G06F 2203/04104; G06F 3/04182; G01R 27/2605; G02F 1/13338; G02F 1/1343
See application file for complete search history.

(56) References Cited

U.S. PATENT DOCUMENTS

| | | | |
|---|---|---|---|
| 2013/0106769 A1* | 5/2013 | Bakken | H03K 17/955 345/174 |
| 2015/0179122 A1 | 6/2015 | Brown et al. | |
| 2015/0205405 A1 | 7/2015 | Yumoto et al. | |
| 2018/0052548 A1* | 2/2018 | Katsuta | G02F 1/13338 |
| 2020/0333910 A1 | 10/2020 | Kim et al. | |
| 2021/0004135 A1* | 1/2021 | Kim | G06F 3/04182 |
| 2021/0005677 A1* | 1/2021 | Lee | G06F 3/04166 |
| 2022/0214770 A1 | 7/2022 | Bang et al. | |
| 2022/0253173 A1 | 8/2022 | Kim et al. | |

FOREIGN PATENT DOCUMENTS

| | | |
|---|---|---|
| JP | 2016540317 A | 12/2016 |
| KR | 20090019881 A | 2/2009 |
| KR | 101209514 B1 | 12/2012 |
| KR | 20120133474 A | 12/2012 |
| KR | 20140035789 A | 3/2014 |
| KR | 20180125914 A | 11/2018 |
| KR | 20190038711 A | 4/2019 |
| KR | 20200033362 A | 3/2020 |
| KR | 20200116655 A | 10/2020 |
| WO | 2014010228 A1 | 6/2016 |

OTHER PUBLICATIONS

Office Action issued in Korean Application No. 10-2021-0017097 on Jul. 15, 2022.
Office Action issued in Korean Application No. 10-2021-0017098 on Sep. 26, 2022.

* cited by examiner

TOUCH SENSOR AND TOUCH INPUT DEVICE COMPRISING SAME

CROSS-REFERENCE TO RELATED APPLICATIONS

This U.S. non-provisional patent application is a U.S. national stage application under 35 U.S.C. § 371 of PCT Application No. PCT/KR2022/001398, filed Jan. 26, 2022, which claims priority to Korean Patent Application No. 10-2021-0016237, filed on Feb. 4 2021, Korean Patent Application No. 10-2021-0017097, filed on Feb. 5 2021 and Korean Patent Application No. 10-2021-0017098, filed on Feb. 5 2021. The disclosures of the aforementioned priority applications are incorporated herein by reference in their entireties.

BACKGROUND

The present invention relates to a touch sensor and a touch input device including the same.

Various types of input devices are used to manipulate a computing system. For example, input devices such as buttons, keys, joysticks, and touch screens are being used. Due to easy and convenient operation of such a touch screen, the use of the touch screen is increasing when operating the computing system.

The touch sensor may be a type of information input device and may be provided and used in a display device. For example, the touch sensor may be attached to one surface of a display panel or manufactured to be integrated with the display panel. A user may input information by pressing or touching the touch sensor while viewing an image displayed on a screen of the display device.

In the case of implementing a driving electrode and a receiving electrode as a single layer or double layer of the touch sensor, when the touch input device equipped with the touch sensor is touched in a non-holding state (floating state), a phenomenon, in which a signal that has to be normally sensed disappears, or a signal that has to be sensed is diverged as being touched at two or more points appears, may occur.

PRIOR ART DOCUMENTS

Patent Documents (Patent Document 1) KR10-1979891 (May 13, 2019)

SUMMARY

The present invention provides a touch sensor capable of improving touch sensing sensitivity and a touch input device including the same.

The present invention also provides a touch sensor capable of increasing in an active capacitance variation contained in a signal output from a receiving electrode and reducing a dummy capacitance variation when a driving signal is applied to a driving electrode, and a touch input device including the same.

The present invention also provides a touch sensor capable of driving a stylus pen and a touch input device including the same.

The present invention also provides a touch sensor capable of sensing a signal output from a stylus pen to sense a position of the stylus pen and a touch input device including the same.

The present invention also provides a touch sensor capable of sensing a hovering touch and a touch input device including the same.

An embodiment of the inventive concept provides a touch sensor includes: a driving electrode including a plurality of driving pattern parts arranged in a first direction and a connection pattern configured to electrically connect two driving pattern parts, which are adjacent to each other, of the plurality of driving patterns to each other; and a receiving electrode, in which a first receiving pattern part and a second receiving pattern part, which are disposed with the connection pattern of the driving electrode therebetween, are alternatively arranged in a second direction perpendicular to the first direction.

In an embodiment, the first receiving pattern part and the second receiving pattern part may be symmetrical to each other based on the connection pattern of the driving electrode.

In an embodiment, the first receiving pattern part may have an inverted triangular shape, the second receiving pattern part may have a triangular shape, and the first receiving pattern part and the second receiving pattern part may have the same cross-sectional area.

In an embodiment, the receiving electrode may include a first connection pattern and a second connection pattern, wherein the first and second connection patterns may be disposed on a layer different from that on which the first and second receiving pattern parts are disposed, the first receiving pattern part and the second receiving pattern part disposed with the connection pattern of the driving electrode therebetween may be configured to constitute one group, the first connection pattern may be configured to electrically connect the first receiving pattern part and the second receiving pattern part of each of odd-numbered groups of a plurality of groups in the second direction to each other, and electrically connect the odd-numbered groups to each other, and the second connection pattern may be configured to electrically connect the first receiving pattern part and the second receiving pattern part of each of even-numbered groups of a plurality of groups in the second direction, and electrically connect the even-numbered groups to each other.

In an embodiment, a first receiving pattern part of one group of the plurality of groups may have a recessed pattern part corresponding to a protruding pattern part of the second receiving pattern part of the other group, which is adjacent to the first receiving pattern part of the one group, the second receiving pattern part of the one group may have a recessed pattern part corresponding to a protruding pattern part of the first receiving pattern part of further another group, which is adjacent to the second receiving pattern part of the one group, and the first connection pattern may be configured to connect the protruding pattern part of the second receiving pattern part of the other group to the protruding pattern part of the first receiving pattern part of the further another group.

In an embodiment, the first connection pattern may include: a corresponding pattern having a shape corresponding to that of each of the first and second receiving pattern parts of even-numbered groups of the plurality of groups and disposed to overlap the first and second receiving pattern parts; and an extension pattern extending in a direction of the odd-numbered groups from the corresponding pattern.

In an embodiment, the driving electrode may be disposed on the same layer as the first and second receiving pattern parts.

In an embodiment, the driving pattern part may have a diamond or rhombus shape, and the driving electrode may further include a dummy pattern part disposed in an opening defined in the driving pattern part, wherein the dummy pattern part may have a shape corresponding to that of the driving pattern part.

In an embodiment, the first and second receiving pattern parts may have a shape that surrounds the driving pattern part, and the first and second receiving pattern parts configured to surround the driving pattern part may have a rectangular or polygonal shape as a whole.

In an embodiment, the receiving electrode may be disposed on a layer different from a layer on which the driving electrode is disposed, the first receiving pattern part and the second receiving pattern part, which are disposed with the connection pattern of the driving electrode therebetween, may be configured to constitute one group, and the receiving electrode may include a first connection pattern configured to electrically connect odd-numbered groups of the plurality of groups to each other and a second connection pattern configured to electrically connect even-numbered groups of the plurality of groups to each other.

In an embodiment of the inventive concept, a touch sensor includes: a plurality of driving electrodes including a plurality of driving pattern parts arranged in a first direction and a connection pattern configured to electrically connect two driving pattern parts, which are adjacent to each other, of the plurality of driving pattern parts to each other: and a receiving electrode including a first receiving pattern parts disposed on the driving pattern part of each of odd-numbered driving electrodes of the plurality of driving electrodes, a second receiving pattern part disposed on the driving pattern part of each of even-numbered driving electrodes, a second receiving pattern parts disposed on the driving pattern part of each of even-numbered driving electrodes, a first connection pattern configured to electrically connect the add-numbered driving electrodes to each other, and a second connection pattern configured to electrically connect the even-numbered driving electrodes to each other.

In an embodiment, each of the first and second receiving pattern parts may have an opening corresponding to the driving pattern part.

In an embodiment of the inventive concept, a touch input device includes: a touch sensor including a plurality of driving electrodes and a plurality of receiving electrode: a driving unit configured to apply a driving signal to the plurality of driving electrodes of the touch sensor: a sensing unit configured to sense a receiving signal of the plurality of receiving electrodes of the touch sensor; and a control unit configured to control the driving unit and the sensing unit, wherein each of the plurality of driving electrodes includes a plurality of driving pattern parts arranged in a direction and a connection pattern configured to electrically connect two driving pattern parts, which are adjacent to each other, of the plurality of driving pattern parts to each other, and each of the plurality of receiving electrodes has a structure in which a first receiving pattern part and a second receiving pattern part are alternatively arranged in a second direction perpendicular to the first direction.

In an embodiment of the inventive concept, a touch input device includes: a touch sensor including a plurality of driving electrodes and a plurality of receiving electrode: a driving unit configured to apply a driving signal to the plurality of driving electrodes of the touch sensor; a sensing unit configured to sense a receiving signal of the plurality of receiving electrodes of the touch sensor; and a control unit configured to control the driving unit and the sensing unit, wherein each of the plurality of driving electrodes includes a plurality of driving pattern parts arranged in a first direction and a connection pattern configured to electrically connect two driving pattern parts, which are adjacent to each other, of the plurality of driving pattern parts to each other, and each of the plurality of receiving electrodes includes a first receiving pattern part disposed on a driving pattern part of each of odd-numbered driving electrodes of the plurality of driving electrode, a second receiving pattern part disposed on a driving pattern part of each of even-numbered driving electrodes, a first connection pattern configured to electrically connect the odd-numbered driving electrodes to each other, and a second connection pattern configured to electrically connect the even-numbered driving electrodes to each other.

In an embodiment of the inventive concept, a touch sensor includes: a driving electrode including a plurality of driving pattern parts which are arranged in a first direction and each of which has an opening therein, a driving dummy pattern part disposed in the opening of the driving pattern part, and a connection pattern configured to electrically connect two driving pattern parts, which are adjacent to each other, of the plurality of driving pattern parts to each other: a receiving electrode extending in a second direction perpendicular to the first direction; and a conductive pattern extending in the second direction and electrically connected to the driving dummy pattern part of the driving electrode, wherein two or more conductive patterns may be electrically connected to each other to generate a current loop that provides a magnetic field signal to a stylus pen.

In an embodiment, a plurality of first electrodes and a plurality of second electrodes may be arranged, and the conductive pattern may be electrically connected to one first dummy pattern part for each of the plurality of first electrodes, and the conductive pattern may have one end connected to one end of the other conductive pattern to constitute the current loop.

In an embodiment, one ends of the plurality of conductive patterns may be connected to each other to constitute a plurality of current loops.

In an embodiment, the second electrode may include a plurality of second pattern parts which are arranged in the second direction and each of which has an opening therein, a second dummy pattern part disposed in the opening of the second pattern part, and a connection pattern configured to electrically connect two second pattern parts, which are adjacent to each other, of the plurality of second pattern parts to each other.

In an embodiment, the first electrode may be a driving electrode, and the second electrode may be a receiving electrode, wherein, in the receiving electrode, a first receiving pattern part and a second receiving pattern, which are disposed with the connection pattern of the driving electrode therebetween, may be alternatively arranged in the second direction.

In an embodiment, the first receiving pattern part and the second receiving pattern part may be symmetrical to each other based on the connection pattern of the driving electrode.

In an embodiment, the receiving electrode may include a first connection pattern and a second connection pattern, wherein the first and second connection patterns may be disposed on a layer different from that on which the first and second receiving pattern parts are disposed, the first receiving pattern part and the second receiving pattern part disposed with the connection pattern of the driving electrode therebetween may be configured to constitute one group, the first connection pattern may be configured to electrically connect the first receiving pattern part and the second receiving pattern part of each of odd-numbered groups of a plurality of groups in the second direction to each other, and electrically connect the odd-numbered groups to each other, and the second connection pattern may be configured to electrically connect the first receiving pattern part and the second receiving pattern part of each of even-numbered groups of a plurality of groups in the second direction, and electrically connect the even-numbered groups to each other.

In an embodiment, a first receiving pattern part of one group of the plurality of groups may have a recessed pattern part corresponding to a protruding pattern part of the second receiving pattern part of the other group, which is adjacent to the first receiving pattern part of the one group, the second receiving pattern part of the one group may have a recessed pattern part corresponding to a protruding pattern part of the first receiving pattern part of further another group, which is adjacent to the second receiving pattern part of the one group, and the first connection pattern may be configured to connect the protruding pattern part of the second receiving pattern part of the other group to the protruding pattern part of the first receiving pattern part of the further another group.

In an embodiment, the first connection pattern may include: a corresponding pattern having a shape corresponding to that of each of the first and second receiving pattern parts of even-numbered groups of the plurality of groups and disposed to overlap the first and second receiving pattern parts; and an extension pattern extending in a direction of the odd-numbered groups from the corresponding pattern.

In an embodiment, the conductive pattern may include a pattern part configured to overlap the first dummy pattern part and electrically connected to the first dummy pattern part.

In an embodiment, the touch sensor may include a plurality of first electrodes extending in one direction: and a plurality of second electrodes extending in a direction perpendicular to the one direction and having a 'L' or 'U' shape, wherein both ends the second electrode may be connected to a switch and may be electrically connected to each other according to a switching operation of the switch, or any one of both ends may be grounded.

In an embodiment of the inventive concept, a touch input device includes: a touch sensor including a plurality of driving electrodes and a plurality of receiving electrodes: a driving unit configured to apply a driving signal and a loop driving signal to the touch sensor: a sensing unit configured to sense a receiving signal from the plurality of receiving electrodes of the touch sensor; and a control unit configured to control the driving unit and the sensing unit, wherein the touch sensor includes: a driving electrode including a plurality of driving pattern parts which are arranged in a first direction and each of which has an opening therein, a driving dummy pattern part disposed in the opening of each of the driving pattern part, and a connection pattern configured to electrically connect two driving pattern parts, which are adjacent to each other, of the plurality of driving pattern parts: a receiving electrode extending in a second direction perpendicular to the first direction; and a conductive pattern to which the loop driving signal is applied and which extends in the second direction and is electrically connected to the driving dummy pattern part of the driving electrode, wherein two or more conductive patterns are connected to each other to constitute a current loop in which a magnetic signal is provided to a stylus pen.

In an embodiment of the inventive concept, a touch input device includes: a touch sensor including a plurality of first electrodes and a plurality of second electrodes: a driving unit configured to apply a driving signal and a loop driving signal to the touch sensor: a sensing unit configured to sense a receiving signal from the touch sensor; and a control unit configured to control the driving unit and the sensing unit, wherein the first electrode extends in one direction, the second electrode extends in a direction perpendicular to the one direction and has a 't' or 'U' shape, and both ends of the second electrode are connected to a switch and are electrically connected to each other according to a switching operation of the switch, or any one of both ends is grounded.

In an embodiment of the inventive concept, a touch sensor includes: a plurality of first electrodes including a plurality of first pattern parts arranged in a direction and a connection pattern configured to electrically connect two first pattern parts, which are adjacent to each other, of the plurality of first pattern parts to each other: a guard electrode including a plurality of guard pattern parts which are disposed to overlap below one or more first electrodes of the plurality of first electrodes and each of which has a shape corresponding to that of the first pattern part, and a connection pattern configured to connect two guard pattern parts, which are adjacent to each other, of the plurality of guard pattern parts to each other; and a plurality of second electrodes including a plurality of second pattern parts arranged in a second direction perpendicular to the first direction and a connection pattern configured to electrically connect two second pattern parts, which are adjacent to each other, of the plurality of second pattern parts to each other, wherein the guard electrode and the plurality of second electrodes are disposed on a first layer together, and a plurality of second pattern parts of the plurality of first electrodes and the plurality of second electrodes are disposed together on a second layer different from the first layer.

In an embodiment of the inventive concept, a touch sensor includes: a plurality of driving electrodes including a plurality of driving pattern parts arranged in a direction and a connection pattern configured to electrically connect two driving pattern parts, which are adjacent to each other, of the plurality of driving pattern parts to each other: a receiving electrode including a connection pattern configured to electrically connect a first receiving pattern part to a second receiving pattern part, wherein the first receiving pattern part and the second receiving pattern part are alternatively arranged in a second direction perpendicular to the first direction with the connection pattern of the driving electrode therebetween: and a guard electrode including a connection pattern disposed to overlap below one or more driving electrodes of the plurality of driving electrodes, including a plurality of guard pattern parts, each of which has a shape corresponding to that of the driving pattern part, and configured to connect two guard pattern parts, which are adjacent to each other, of the plurality of guard pattern parts to each other.

In an embodiment, the first and second receiving pattern parts of the plurality of receiving electrodes may be disposed on the same layer as the plurality of driving electrodes, and the connection pattern of the plurality of receiving electrodes may be disposed on a layer below the same layer together with the guard electrode.

In an embodiment, the first receiving pattern part and the second receiving pattern part may be symmetrical to each other based on the connection pattern of the driving electrode.

In an embodiment, the connection pattern of the receiving electrode may include a first connection pattern and a second connection pattern, the first receiving pattern part and the second receiving pattern part, which are disposed with the connection pattern of the driving electrode therebetween, may be configured to constitute one group, the first connection pattern may be configured to electrically connect the first receiving pattern part and the second receiving pattern part of each of odd-numbered groups of a plurality of groups in the second direction to each other, and electrically connect the odd-numbered groups to each other, and the second connection pattern may be configured to electrically connect the first receiving pattern part and the second receiving pattern part of each of even-numbered groups of a plurality of groups in the second direction, and electrically connect the even-numbered groups to each other.

In an embodiment, a first receiving pattern part of one group of the plurality of groups may have a recessed pattern part corresponding to a protruding pattern part of the second receiving pattern part of the other group, which is adjacent to the first receiving pattern part of the one group, the second receiving pattern part of the one group may have a recessed pattern part corresponding to a protruding pattern part of the first receiving pattern part of further another group, which is adjacent to the second receiving pattern part of the one group, and the first connection pattern may be configured to connect the protruding pattern part of the second receiving pattern part of the other group to the protruding pattern part of the first receiving pattern part of the further another group.

In an embodiment, the first connection pattern may include: a corresponding pattern having a shape corresponding to that of each of the first and second receiving pattern parts of even-numbered groups of the plurality of groups and disposed to overlap the first and second receiving pattern parts: and an extension pattern extending in a direction of the odd-numbered groups from the corresponding pattern.

In an embodiment, the driving electrode may further include a dummy pattern part disposed in an opening defined in the driving pattern part, and the touch input device may further include a conductive pattern extending in the second direction and electrically connected to one dummy pattern part for each of the plurality of driving electrodes, wherein two or more conductive patterns may be electrically connected to each other to generate a current loop that provides a magnetic field signal to a stylus pen, and the conductive pattern may be disposed on the same layer on the guide electrode and the first and second connection patterns.

In an embodiment of the inventive concept, a touch input device includes: a touch sensor including a plurality of first electrodes, at least one or more guard electrodes, and a plurality of second electrodes: a driving part configured to apply a driving signal to the touch sensor: a sensing unit configured to sense from the touch sensor; and a control unit configured to control the driving unit and the sensing unit, wherein the first electrode includes a plurality of first pattern parts arranged in a direction and a connection pattern configured to electrically connect two first pattern parts, which are adjacent to each other, of the plurality of first pattern parts, each of the guard electrodes includes a connection pattern disposed to overlap below one or more first electrodes of the plurality of electrodes, comprising a plurality of guard pattern parts, each of which has a shape corresponding to that of the first pattern part, and configured to connect two guard pattern parts, which are adjacent to each other, of the plurality of guard pattern parts to each other, and the receiving electrode includes a plurality of second pattern parts arranged in a second direction perpendicular to the first direction and a connection pattern configured to electrically connect two second pattern parts, which are adjacent to each other, of the plurality of second pattern parts to each other.

In an embodiment of the inventive concept, a touch input device includes: a touch sensor including a plurality of driving electrodes, at least one or more guard electrodes, and a plurality of receiving electrodes: a driving part configured to apply a driving signal to the touch sensor; a sensing unit configured to sense from the touch sensor; and a control unit configured to control the driving unit and the sensing unit, wherein each of the driving electrode includes a plurality of driving pattern parts arranged in a first direction and a connection pattern configured to electrically connect two driving pattern parts, which are adjacent to each other, of the plurality of driving pattern parts to each other, each of the receiving electrodes includes a connection pattern configured to electrically connect a first receiving pattern to a second receiving pattern, wherein the first receiving pattern part and the second receiving pattern part, which are disposed with the connection pattern of the driving electrode therebetween, are alternatively arranged in a second direction perpendicular to the first direction, and each of the guide electrodes includes a connection pattern disposed to overlap below one or more driving electrodes of the plurality of driving electrodes, including a plurality of guard pattern parts, each of which has a shape corresponding to that of the driving pattern part, and configured to connect two guard pattern parts, which are adjacent to each other, of the plurality of guard pattern parts to each other.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
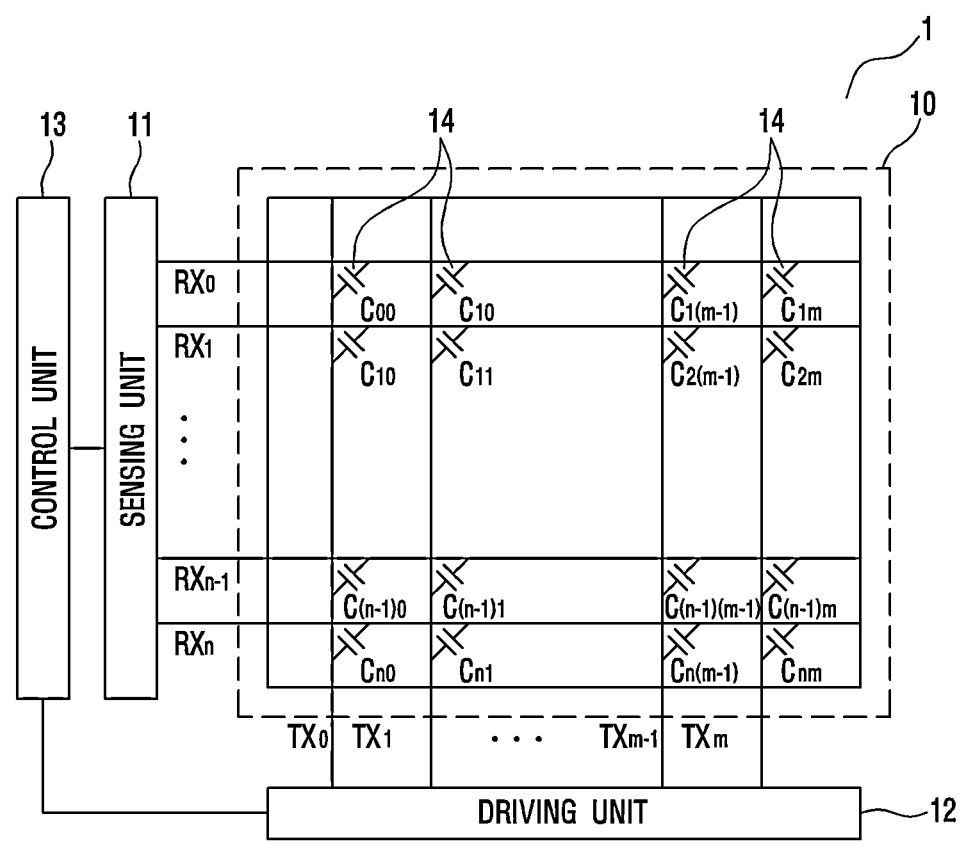
FIG. 1 is a schematic view of a touch input device including a touch sensor according to an embodiment of the present invention.

The following detailed description of the present invention, which will be described below, refers to the accompanying drawings that illustrate a specific embodiment in which the present invention is capable of being practiced. These embodiments are described in sufficient detail to enable those skilled in the art to practice the present invention. It should be understood that the various embodiments of the present invention are different but need not be mutually exclusive. For example, specific shapes, structures, and characteristics described herein may be implemented in other embodiments without departing from the spirit and scope of the present invention with respect to one embodiment. In addition, it is to be understood that the location or arrangement of individual components in each disclosed embodiment may be changed without departing from the spirit and scope of the present invention. The following detailed description is, therefore, not to be taken in a limiting sense, and if properly explained, the scope of the present invention is defined only by the appended claims, along with the full scope of equivalents to which such claims are claimed. Like reference numerals in the drawings refer to the same or similar functions throughout the several aspects.

A touch input device according to various embodiments of the present disclosure may an electronic device, for example, may include at least one of a smartphone, a tablet personal computer (PC), a vehicle display device, a mobile phone, a video phone, an e-book reader, a laptop personal computer (laptop PC), a netbook computer, a mobile medical device, a camera, or a wearable device. Here, the wearable device may include at least one of an accessory type (e.g., a watch, a ring, a bracelet, an anklet, a necklace, glasses, contact lens, or head-mounted-device (HMD)), textile or clothing integral type (e.g., electronic clothing), a body attachment type (e.g., a skin pad or tattoo), or a living body implantation type (e.g., an implantable circuit).

FIG. 1 is a schematic view of a touch input device including a touch sensor according to an embodiment of the present invention.

Referring to FIG. 1, a touch input device 1 according to an embodiment of the present invention may include a touch sensor 10, a sensing unit 11, a driving unit 12, and a control unit 13.

The driving unit 12 applies a driving signal to the touch sensor 10 under the control of the control unit 13, and the sensing unit 11 receives a sensing signal received from the touch sensor 10.

The driving unit 12 may sequentially supply the driving signal to a plurality of driving electrodes of the touch sensor 10.

The sensing unit 11 receives signals output from a plurality of receiving electrodes of the touch sensor 10. Here, the signal may include information on capacitance variation between the driving electrode and the receiving electrode, which are adjacent to each other, an LGM noise signal, and a display noise signal.

The sensing unit 11 may subtract two signals of the signals output from the plurality of receiving electrodes to output a subtraction signal and analog-to-digital convert the output subtraction signal to output the analog-to-digital converted signal. For this, the sensing unit 11 may include a comparator and an ADC.

The control unit 13 may sense a touch and/or a touch position based on the digital signal output from the sensor 11.

In FIG. 1, the sensing unit 11, the driving unit 12, and the control unit 13 are separately illustrated for convenience of explanation, but are not limited thereto. For example, at least two or all of the sensing unit 11, the driving unit 12, and the control unit 13 may be implemented as a single module, unit, or chip.

The touch input device 1 illustrated in FIG. 1 may include a display panel. In this case, the touch sensor 10 may be disposed on the display panel or within the display panel. In some cases, the touch sensor 10 may also be disposed under the display panel. For example, the touch sensor 10 may be directly disposed on an outer surface (e.g., a top surface of an upper substrate or a bottom surface of a lower substrate) or an inner surface (e.g., a bottom surface of the upper substrate or a top surface of the lower substrate). The touch sensor 10 may be coupled to the display panel to provide a touch screen.

The touch sensor 10 may include electrodes, each of which has a predetermined shape, and the predetermined electrodes may include a plurality of driving electrodes TX0 to TXn and a plurality of receiving electrodes RX0 to RXm.

A predetermined capacitance 14 (C00, C01, C10, C11, . . . ) are disposed between the plurality of driving electrodes TX0, TX1, TX2, . . . and the plurality of receiving electrodes RX0, RX1, RX2, . . . , particularly at their intersections, For an operation of the touch sensor 10, the driving unit 12 that applies the driving signal to the plurality of driving electrodes TX0 to TXn and the sensing unit 11 that receives the sensing signal (or receiving signal) including information on a capacitance variation that varies according to a touch on the touch surface from the plurality of receiving electrodes RX0 to RXm may be provided.

In FIG. 1, the plurality of driving electrodes TX0 to TXn and the plurality of receiving electrodes RX0 to RXm of the touch sensor 10 may be illustrated as configuring an orthogonal array, but the present invention is not limited thereto. For example, the plurality of driving electrodes TX0 to TXn and the plurality of receiving electrodes RX0 to RXm may have any number of dimensions and application arrangements including diagonal lines, concentric circles, and three-dimensional random arrangements. Here, n and m are positive integers that have the same or different values and may vary in size depending on embodiments.

The plurality of driving electrodes TX0 to TXn and the plurality of receiving electrodes RX0 to RXm may be arranged to cross each other. The driving electrode TX may include a plurality of driving electrodes TX0 to TXn extending in a first axial direction, and the receiving electrode RX may include a plurality of receiving electrodes RX0 to RXm extending in a second axial direction crossing the first axial direction.

The plurality of driving electrodes TX0 to TXn and the plurality of receiving electrodes RX0 to RXm may be disposed on the same layer (one layer) or may be disposed on different double layers (two layers). The plurality of driving electrodes TX0 to TXn and the plurality of receiving electrodes RX0 to RXm may have a diamond pattern shape.

Figure 2:
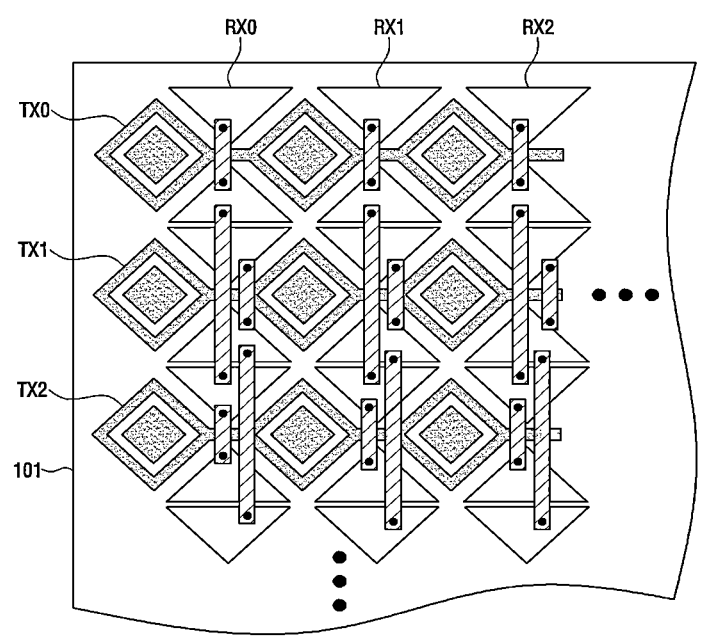
FIG. 2 is a partial plan view of the touch sensor 10 of FIG. 1.
Figure 3:
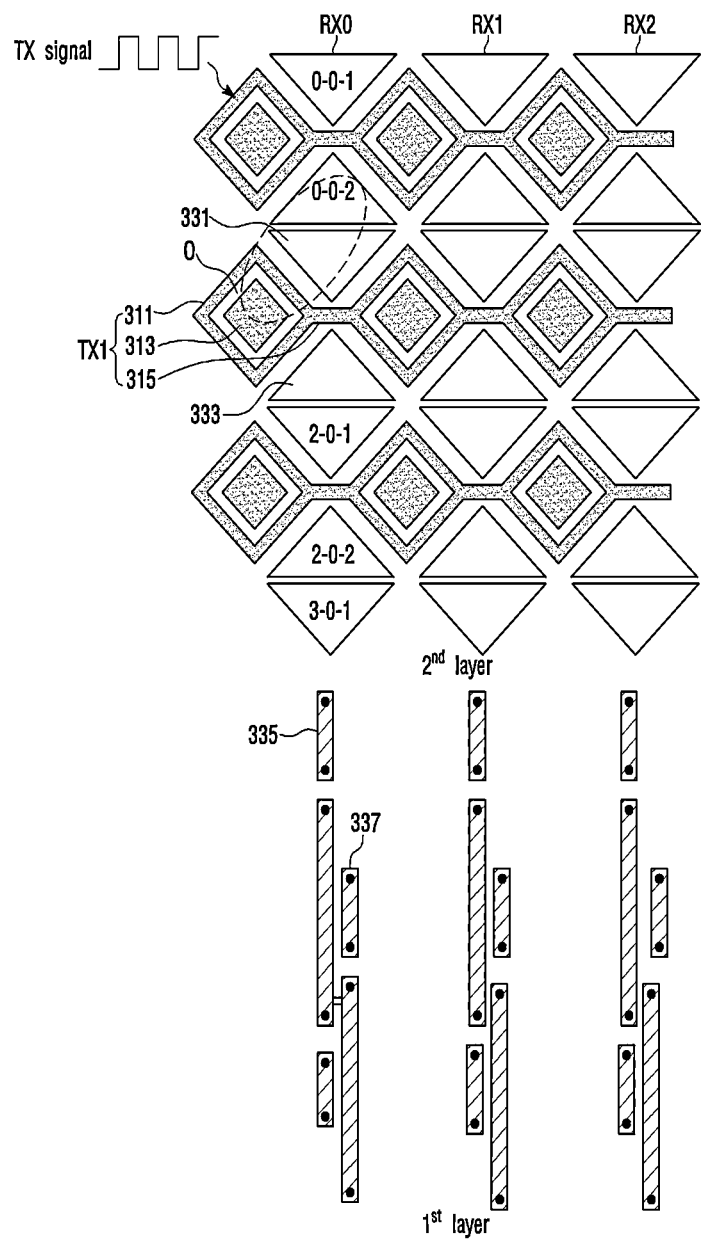
FIG. 3 is a plan view illustrating a state in which the touch sensor 10 of FIG. 2 is divided into two layers.

FIG. 2 is a partial plan view of the touch sensor 10 of FIG. 1, and FIG. 3 is a plan view illustrating a state in which the touch sensor 10 of FIG. 2 is divided into two layers.

Referring to FIG. 2, the touch sensor 10 according to an embodiment of the present invention may be disposed on an active area 101 of the touch input device. The active area 101 may be an area on which a touch is input and may be an area corresponding to a display area of a display panel provided in a touch input device.

The touch sensor 10 includes a plurality of driving electrodes TX0, TX1, TX2, . . . and a plurality of receiving electrodes RX0, RX1, RX2, . . . .

The plurality of driving electrodes TX0, TX1, TX2, . . . have a shape extending in a first direction, and the plurality of receiving electrodes RX0, RX1, RX2, . . . have a shape in a second direction perpendicular to the first direction.

A predetermined capacitance is disposed between the plurality of driving electrodes TX0, TX1, TX2, . . . and the plurality of receiving electrodes RX0, RX1, RX2, . . . , particularly at their intersections. The capacitance varies when a touch input occurs at or around a corresponding point. Thus, a capacitance variation may be detected from signals output from the plurality of receiving electrodes RX0, RX1, RX2, . . . to detect whether the touch occurs and the touch input.

The plurality of driving electrodes TX0, TX1, TX2, . . . illustrated in FIG. 2 may include a driving pattern part 311, a dummy pattern part 313, and a connection pattern 315 as illustrated in FIG. 3. Here, the dummy pattern part 313 may be an additional component and thus may be omitted. When there is no dummy pattern part 313, each of the plurality of driving electrodes TX0, TX1, TX2, . . . may be constituted by the driving pattern part 311 and the connection pattern 315.

The driving pattern part 311 has a diamond shape or a rhombus shape and has an opening O with the inside opened. The opening O has a diamond shape or a rhombus shape corresponding to an external shape of the driving pattern part 311. Due to the opening O, the driving pattern part 311 may have a diamond or rhombus band shape.

Although the driving pattern part 311 is illustrated in the diamond or rhombus shape in the drawing, this is only an example, and for example, the driving pattern part 311 may have a polygonal or rectangular shape.

The dummy pattern part 313 is disposed in the opening O of the driving pattern part 311.

The dummy pattern part 313 has a diamond shape or a rhombus shape. An external shape of the dummy pattern part 313 has a shape corresponding to that of the driving pattern part 311. Unlike the driving pattern part 311, the dummy pattern part 313 has no opening defined therein, and has a shape that is fully filled.

The driving pattern part 311 and the dummy pattern part 313 are spaced a predetermined distance from each other so that the driving pattern part 311 and the dummy pattern part 313 are electrically insulated from each other.

The driving pattern part 311 in which the dummy pattern part 313 is disposed is provided in plurality, which are arranged in the first direction (or horizontal direction). The connection pattern 315 disposed between the plurality of driving pattern parts 311 electrically connects the driving pattern parts 311 to each other.

The connection pattern 315 connects two adjacent driving pattern parts 311 to each other. The connection pattern 315 has one end connected to the driving pattern part 311 disposed at one side and the other end connected to the first pattern part disposed at the other side. The connection pattern 315 may have a bar shape, but is not limited thereto.

The plurality of driving pattern parts 311, the plurality of dummy pattern parts 313, and the plurality of connection patterns 315 are disposed together on the same layer (the second layer in FIG. 3). The plurality of driving pattern parts 311, the plurality of dummy pattern parts 313, and the plurality of connection patterns 315 may be made of the same material. For example, each of the plurality of driving pattern parts 311, the plurality of dummy pattern parts 313, and the plurality of connection patterns 315 may be made of a metal mesh. The metal mesh may be patterned according to the shapes of the plurality of driving pattern parts 311, the plurality of dummy pattern parts 313, and the plurality of connection patterns 315 to provide the plurality of driving electrodes TX0, TX1, TX2, . . . .

In FIGS. 2 and 3, the dummy pattern part 313 is disposed in the opening O inside the driving pattern part 311, but each driving electrode according to the present invention is not limited thereto. For example, the driving pattern part 311 and the dummy pattern part 313 may have shapes other than the diamond or rhombus shape. The driving pattern part 311 and the dummy pattern part 313 may be combined with each other in various shapes to provide the driving electrode.

Each of the plurality of receiving electrodes RX0, RX1, RX2, . . . illustrated in FIG. 3 includes a first receiving pattern part 331, a second receiving pattern part 333, a first connection pattern 335 and a second connection pattern 337.

The first receiving pattern part 331 and the second receiving pattern part 333 are disposed between two driving pattern parts 311 adjacent to each of the driving electrodes TX0, TX1, TX2, . . . .

The first receiving pattern part 331 has an inverted triangular shape, and the second receiving pattern part 333 has a triangular shape that is symmetrical to the first receiving pattern part 331. Here, the first and second receiving pattern parts 331 and 333 are not limited to the triangular shapes. For example, although not shown in the drawing, each of the first and second receiving pattern parts 331 and 333 may have a shape surrounding an outer circumference of one driving pattern part 331, and each of the first and second receiving pattern parts surrounding the outer circumference of the driving pattern part 331 may have a rectangular or polygonal shape as a whole.

The first receiving pattern part 331 and the second receiving pattern part 333 may have the same size and shape. The first receiving pattern part 331 and the second receiving pattern part 333 may have the same cross-sectional area.

The second receiving pattern part 333 is disposed to be spaced a predetermined distance under the first receiving pattern part 331. Alternatively, the second receiving pattern part 333 is disposed to be spaced a predetermined distance from the first receiving pattern part 331 in the second direction perpendicular to the first direction.

The connection pattern 315 of each of the driving electrode TX0, TX1, TX2, . . . may be disposed between the first receiving pattern part 331 and the second receiving pattern part 333. The first receiving pattern part 331 is disposed on the connection pattern 315, and the second receiving pattern part 333 is disposed below the connection pattern 315.

The first receiving pattern part 331 and the second receiving pattern part 333 are provided in plurality, which are alternately arranged in the second direction.

The plurality of first receiving pattern parts 331 and the plurality of second receiving pattern parts 333, which are alternately arranged in the second direction, are electrically connected by the first connection pattern 335 and the second connection pattern 337. Here, the plurality of first receiving pattern parts 331 and the plurality of second receiving pattern parts 333 may be electrically connected to the first connection pattern 335 and the second connection pattern 337 through conductive vias.

The first connection pattern 335 and the second connection pattern 337 may be disposed on a layer (first layer) different from a layer (second layer) on which the first receiving pattern part 331 and the second receiving pattern part 333 are disposed. This is to prevent electrical short-circuit with the driving electrodes TX0, TX1, TX2, . . . disposed on the layer (second layer) on which the second receiving pattern part 333 is disposed. An insulating layer may be disposed between the layer (second layer), on which the first receiving pattern part 331 and the second receiving pattern part 333 are disposed, and the other layer (first layer).

When the first receiving pattern part 331 and the second receiving pattern part 333, which are adjacent to each other in the vertical direction with the connection pattern 315 therebetween, are defined as one group, the plurality of first receiving pattern parts 331 and the plurality of second receiving pattern parts 333 alternately arranged in the second direction may be defined as a plurality of groups arranged in the second direction. Under this definition, the first connection pattern 335 electrically connects the first receiving pattern parts 0-0-1, 2-0-1, . . . and the second receiving pattern parts 0-0-2, 2-0-2, . . . of odd-numbered groups from the top. The second connection pattern 337 electrically connects the first receiving pattern part 331 and the second receiving pattern part 333 of each of even-numbered groups from the top.

The first connection pattern 335 electrically connects the first receiving pattern parts 0-0-1, 2-0-1, . . . and the second receiving pattern parts 0-0-2, 2-0-2, . . . , which are disposed between the two driving pattern parts 311 adjacent in a left and right directions in the odd-numbered driving electrodes TX0, TX2, . . . . In addition, the first connection pattern 335 electrically connects a second receiving pattern part 0-0-2 disposed between the two driving pattern parts 311 adjacent in the left and right direction in one odd-numbered driving electrode TX0 and a first receiving pattern part 2-0-1 disposed between the two driving pattern parts adjacent to each other in the left and right direction in the other odd-numbered driving electrode TX3 disposed next to the one driving electrode TX0. The odd-numbered driving electrodes TX0, TX2, . . . are electrically connected by the first connection pattern 335.

The second connection pattern 337 electrically connects the first receiving pattern part 331 and the second receiving pattern part 333, which are disposed between the two driving pattern parts 311 adjacent to the left and right direction in the even-numbered driving electrodes TX1, . . . . In addition, the second connection pattern 337 electrically connects a second receiving pattern part 333 disposed between the two driving pattern parts 311 adjacent in the left and right direction in one even-numbered driving electrode TX1 and a first receiving pattern part 3-0-1 disposed between the two driving pattern parts adjacent to each other in the left and right direction in the other even-numbered driving electrode disposed next to the one driving electrode TX1. The even-numbered driving electrodes TX1, TX3, . . . are electrically connected by the second connection pattern 337.

The first signal is output through the first connection pattern 335, and the second signal is output through the second connection pattern 337. Thus, signals having two channels are output from each receiving electrode RX0, RX1, RX2, . . . .

According to the driving electrodes TX0, TX1, TX2, . . . to which the driving signal is applied, one of the first signal and the second signal may be an active channel signal, and the other may be a dummy channel signal. When the driving signal is applied to the odd-numbered driving electrodes TX0, TX2, . . . , the first signal output through the first connection pattern 335 may be an active channel signal, and the second signal output through the second connection pattern 337 may be a dummy channel signal. When the driving signal is applied to the even-numbered driving electrodes TX1, . . . , the second signal output through the second connection pattern 337 may be an active channel signal, and the first signal output through the first connection pattern 335 may be a dummy channel signal.

For example, in FIG. 3, it is assumed that the driving signal (TX signal) is applied to the first driving electrode TX1, and an object (dotted line) is in contact with an intersection of the first driving electrode TX1 and the zero-th receiving electrode RX0.

When the driving signal is applied to the first driving electrode TX1, and the object (dotted line) is disposed on a partial area including the intersection of the first driving electrode TX1 and the second receiving electrode RX0, a capacitance (or active capacitance) disposed between the driving pattern part 311 of the first driving electrode TX1 and the first receiving pattern part 331 of the zero-th receiving electrode RX0 varies. The second signal including capacitance variation information is output through the second connection pattern 337. Here, the second signal may include an LGM noise signal and a display noise signal by the display panel.

In addition, a capacitance (or dummy capacitance) generated between the driving pattern part 311 of the first driving electrode TX1 and the second receiving pattern part 0-0-2 of the zero-th receiving electrode RX0 also varies. The first signal including capacitance variation information is output through the first connection pattern 335. Here, the first signal may include an LGM noise signal and a display noise signal by the display panel.

Here, since the first receiving pattern part 331 and the second receiving pattern part 0-0-2, which are in contact with the object (dotted line), have the same cross-sectional area, almost the same or similar LGM noise signals may be input to each of the first receiving pattern part 331 and the second receiving pattern part 0-0-2, and the display noise signal by the display panel may also be input almost identically.

The sensing unit 11 illustrated in FIG. 1 may subtract the second signal output through the first connection pattern 335 from the first signal output through the second connection pattern 337 to offset the LGM noise signal and the display noise signal, which are input into the first receiving pattern 331 and the second receiving pattern part 0-0-2. Although a variation of the active capacitance contained in the second signal, which is the active channel signal, is reduced by the subtraction, since the variation in dummy capacitance contained in the first signal is relatively small, there is no problem in whether the touch occurs or/and detection of a touch position.

In addition, since the first receiving pattern part 331 serves as an AC ground between the driving pattern part 311 and the second receiving pattern part 0-0-2, the variation in capacitance contained in the second signal output through the first receiving pattern part 331 may increase, and the variation in capacitance contained in the first signal output from the second receiving pattern part 0-0-2 may be reduced. In this regard, it will be described in detail with reference to FIG. 4.

Figure 4:
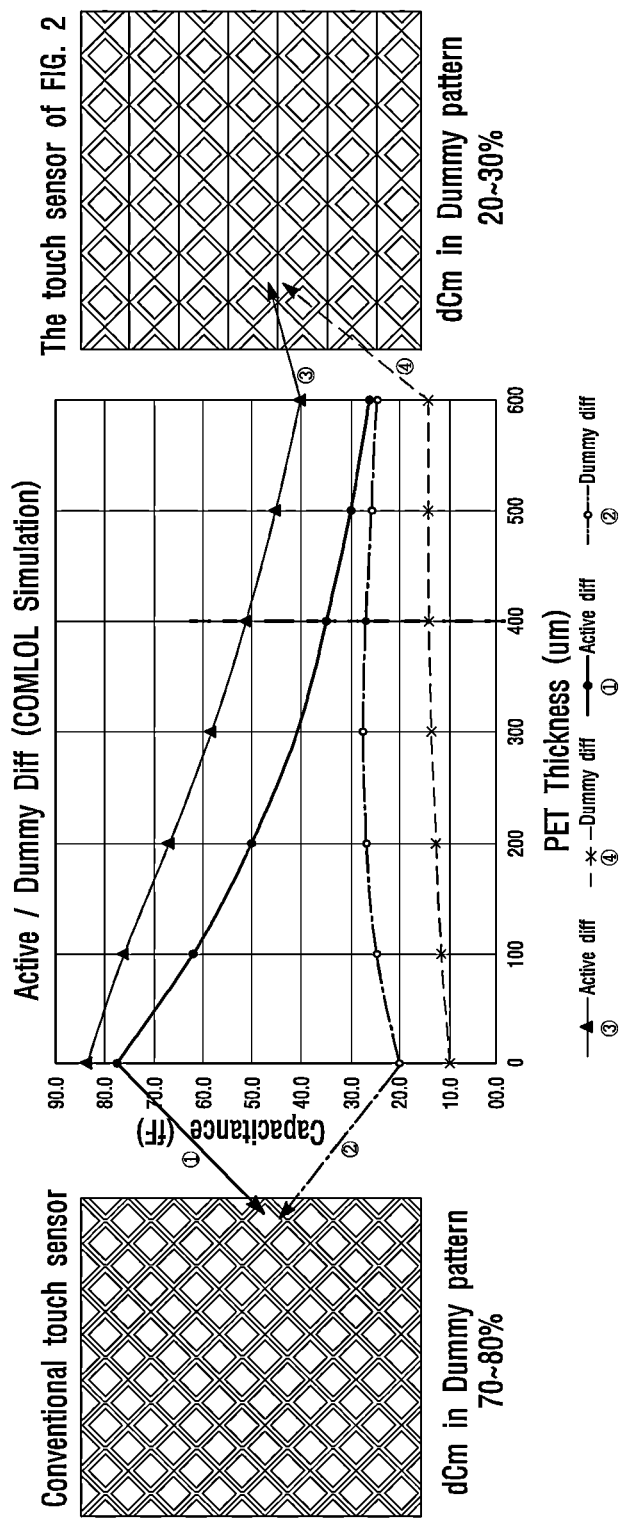
FIG. 4 is a graph illustrating results obtained by comparing a difference in capacitance variation (dCm) between a touch sensor according to the related art and the touch sensor of FIG. 2 according to an embodiment of the present invention.

FIG. 4 is a graph illustrating results obtained by comparing a difference in capacitance variation (dCm) between the touch sensor according to the related art and the touch sensor of FIG. 2 according to an embodiment of the present invention.

Referring to FIG. 4, the touch sensor according to the related art is a touch sensor disclosed in Patent Document 1 and has a structure in which the dummy electrodes are disposed inside the receiving electrode as well as the driving electrode.

The graph shown in FIG. 4 shows a capacitance variation value (①) contained in a signal output from an arbitrary receiving electrode of the conventional touch sensor according to a PET thickness, a capacitance variation value (②) contained in a signal output from the dummy receiving electrode disposed inside an arbitrary receiving electrode, an active capacitance variation value (③) contained in a signal output from an arbitrary second receiving pattern part 333 of the touch sensor illustrated in FIG. 2, and a dummy capacitance variation value (④) contained in a signal output from the first receiving pattern part 331 disposed below the second receiving pattern part 333.

In the graph of FIG. 4, PET is a configuration corresponding to a window layer disposed on the conventional touch sensor and the touch sensor of FIG. 2. For example, comparing the ① value, the ② value, the ③ value, and the ④ value when the PET has a thickness of about 400 um, it is confirmed that the ③ value of the touch sensor illustrated in FIG. 2 more increases than the (①) value of the conventional touch sensor, and it is confirmed that the ④ value of the touch sensor illustrated in FIG. 2 more decreases than the ② value of the conventional touch sensor.

Particularly, since the value ④ of the touch sensor illustrated in FIG. 2 corresponds to approximately 20 to approximately 30% of the value ③ when the PET thickness is about 400 um, even if the value ④ is subtracted from the value ③, whether the touch occurs and the touch position may be detected through the relatively high capacitance variation value of about 70% to about 80%.

On the other hand, in the conventional touch sensor, the ② value corresponds to about 70% to about 80% of the (①) value, when the ② value is subtracted from the (①) value, only about 20% to about 30% of the capacitance change value remains, sensing sensitivity is low, and thus, sensing accuracy is deteriorated.

Figure 5:
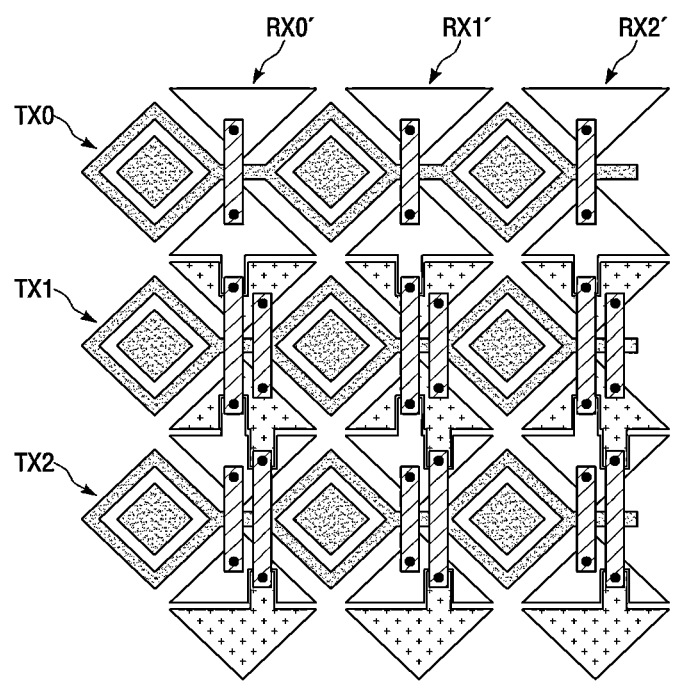
FIG. 5 is a partial plan view of a touch sensor according to another embodiment of the present invention.
Figure 6:
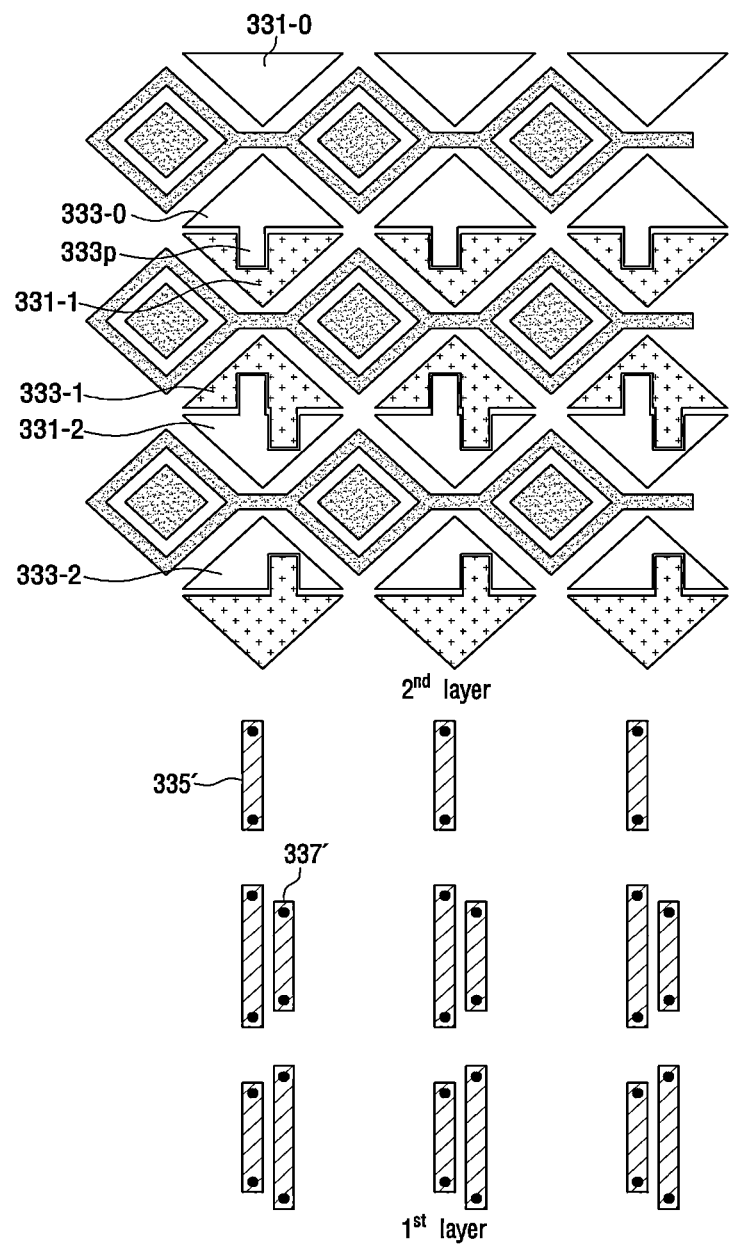
FIG. 6 is a plan view illustrating a state in which the touch sensor of FIG. 5 is divided into two layers.

FIG. 5 is a partial plan view of a touch sensor according to another embodiment of the present invention, and FIG. 6 is a plan view illustrating a state in which the touch sensor of FIG. 5 is divided into two layers.

When compared with the touch sensors illustrated in FIGS. 5 and 6, a plurality of driving electrodes TX0, TX1, TX2, . . . are the same, but there is a difference in a plurality of receiving electrodes RX0', RX1', RX2', . . . . Therefore, hereinafter, the plurality of receiving electrodes RX0 ', RX1', RX2', . . . will be described in detail, and the descriptions of the plurality of driving electrodes TX0, TX1, TX2, . . . are replaced with the above-described contents. In addition, in the plurality of receiving electrodes RX0', RX1', RX2', . . . , descriptions of the same parts as the plurality of receiving electrodes RX0, RX1, RX2, . . . of the touch sensors illustrated in FIGS. 2 and 3 are replaced with the above-described contents.

When compared to the touch sensors illustrated in FIGS. 2 and 3, in the touch sensors illustrated in FIGS. 5 and 6, since a capacitance generated between the first and second receiving pattern parts disposed on different layers and a capacitance generated between the first and second connection patterns are reduced, there is an advantage in that a value of an RC time constant may be reduced.

Shapes of some of the first and second receiving pattern parts 331-1, 333-1, 331-2, 333-2, and 331-3 are different from those of the first and second receiving pattern parts 331 and 333 of the touch sensor illustrated in FIGS. 2 and 3.

The plurality of receiving electrodes RX0', RX1', RX2', . . . include a plurality of first receiving pattern parts 331-0, 331-1, 331-2, . . . and a plurality of second receiving pattern parts 331-0, 331-1, 331-2, . . . , and the plurality of second receiving pattern parts 333-0, 333-1, 333-2, . . . and the receiving pattern parts 333-0, 333-1, 333-2, . . . are alternately arranged in the second direction.

When one first receiving pattern part 331-0 and one second receiving pattern part 333-0 constitute one group, a plurality of groups may be arranged in the second direction.

One first receiving pattern part 331-1 of the plurality of first receiving pattern parts 331-0, 331-1, and 331-2 includes a recess pattern part corresponding to a protruding pattern part 333p of a second receiving pattern part 333-0 of another group adjacent to the group belonging to the one first receiving pattern part 331-1.

In addition, one second receiving pattern part 333-1 of the plurality of second receiving pattern parts 333-0, 333-1, and 333-2 includes a recess pattern part corresponding to a protruding pattern part of a first receiving pattern part 331-2 of another group adjacent to the group belonging to the one second receiving pattern part 333-1.

A minimum interval between the second receiving pattern part 333-0 of another group and the first receiving pattern part 331-2 of another group is shorter than a corresponding interval in the touch sensor illustrated in FIG. 2 by the protruding pattern part 333p of the second receiving pattern part 333-0 of another group and the protruding pattern part of the first receiving pattern part 331-2 of another group. Therefore, a length of a first connection pattern 335' connecting the second receiving pattern part 333-0 of another group to the first receiving pattern part 331-2 of another group may be reduced, and furthermore, a capacitance generated between the first and second receiving pattern parts 331-1 and 333-1 that overlap each other, but are not electrically connected to each other may be reduced.

Figure 7:
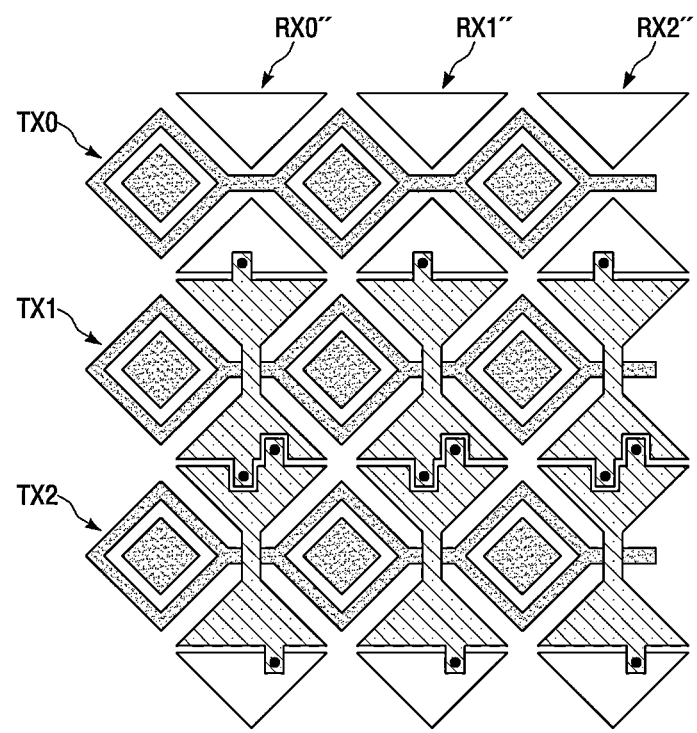
FIG. 7 is a partial plan view of a touch sensor according to further another embodiment of the present invention.
Figure 8:
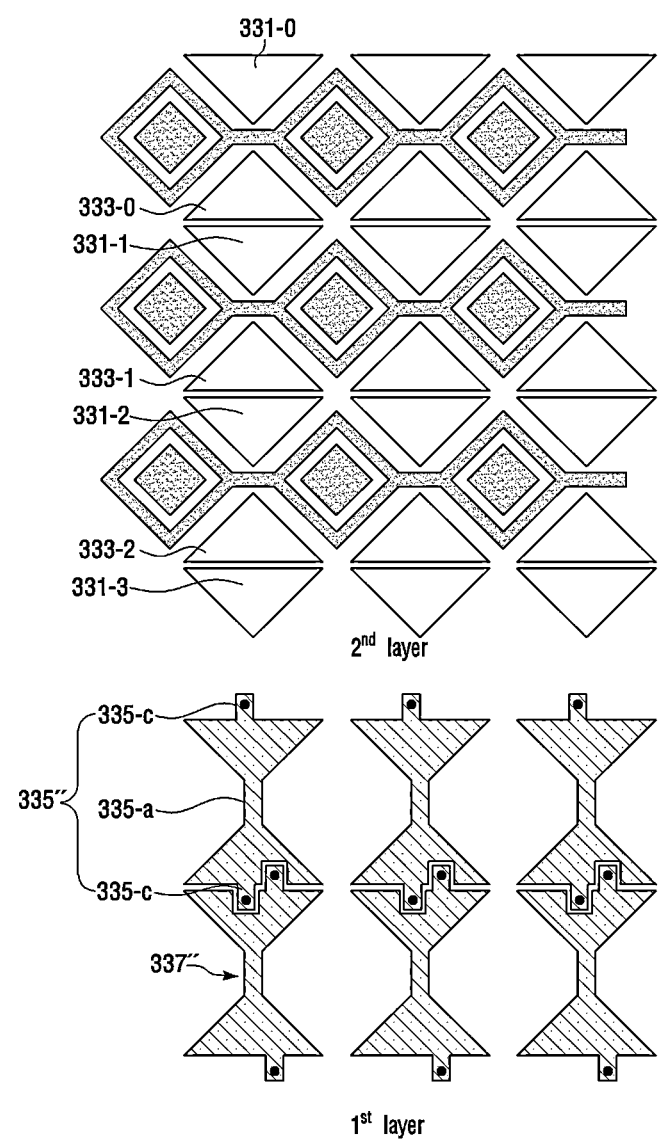
FIG. 8 is a plan view illustrating a state in which the touch sensor of FIG. 7 is divided into two layers.

FIG. 7 is a partial plan view of a touch sensor according to further another embodiment of the present invention, and FIG. 8 is a plan view illustrating a state in which the touch sensor of FIG. 7 is divided into two layers.

When compared with the touch sensors illustrated in FIGS. 7 and 8, a plurality of driving electrodes TX0, TX1, TX2, . . . are the same, but there is a difference in a plurality of receiving electrodes RX0", RX1", RX2", . . . . Therefore, hereinafter, the plurality of receiving electrodes RX0", RX1", RX2", . . . will be described in detail, and the descriptions of the plurality of driving electrodes TX0, TX1, TX2, . . . are replaced with the above-described contents. In addition, in the plurality of receiving electrodes RX0", RX1", RX2", . . . , descriptions of the same parts as the plurality of receiving electrodes RX0, RX1, RX2, . . . of the touch sensors illustrated in FIGS. 2 and 3 are replaced with the above-described contents.

Shapes and arrangement of the first and second receiving pattern parts 331-0, 333-0, 331-1, 333-1, 331-2, 333-2, and 331-3 are the same as the shapes and arrangement of the first and second receiving pattern parts 331 and 333 of each of the touch sensors illustrated in FIGS. 2 and 3.

When one first receiving pattern part 331-0 and one second receiving pattern part 333-0 constitute one group, a plurality of groups may be arranged in the second direction.

A first connection pattern 335" electrically connects odd-numbered groups of a plurality of groups and has a corresponding pattern 335-a, which is disposed at a position overlapping the first and second receiving pattern parts 331-1 and 333-1 of even-numbered groups, is not electrically connected to the first and second receiving pattern parts 331-1 and 333-1, and has a shape corresponding to that of each of the first and second receiving pattern parts 331-1 and 333-1 of even-numbered groups. In addition, the first connection pattern 335" may include an extension pattern 335-c extending from the corresponding pattern 335-a toward the first and second receiving pattern parts 331-0, 333-0, 331-2, and 333-2 of odd-numbered groups.

A second connection pattern 337" electrically connects even-numbered groups of a plurality of groups and has a corresponding pattern, which is disposed at a position overlapping the first and second receiving pattern parts 331-2 and 333-2 of the odd-numbered groups, is not electrically connected to the first and second receiving pattern parts 331-2 and 333-2, and has a shape corresponding to that of each of the first and second receiving pattern parts 331-1 and 333-1 of the odd-numbered groups. In addition, the second connection pattern 337" may include an extension pattern extending from the corresponding pattern toward the first and second receiving pattern parts 331-1, 333-1, and 331-3 of the even-numbered groups.

When compared to the touch sensors illustrated in FIGS. 7 and 8, each of the touch sensors illustrated in FIGS. 2 and 3 has an advantage in that a capacitance between the corresponding pattern 335-a and the first and second receiving pattern parts 331-1 and 331-2, which overlap the corresponding pattern 335-a, but are not electrically connected to each other, slightly increases, but resistance decreases because a cross-sectional area of the first connection pattern 335" is widened.

Figure 9:
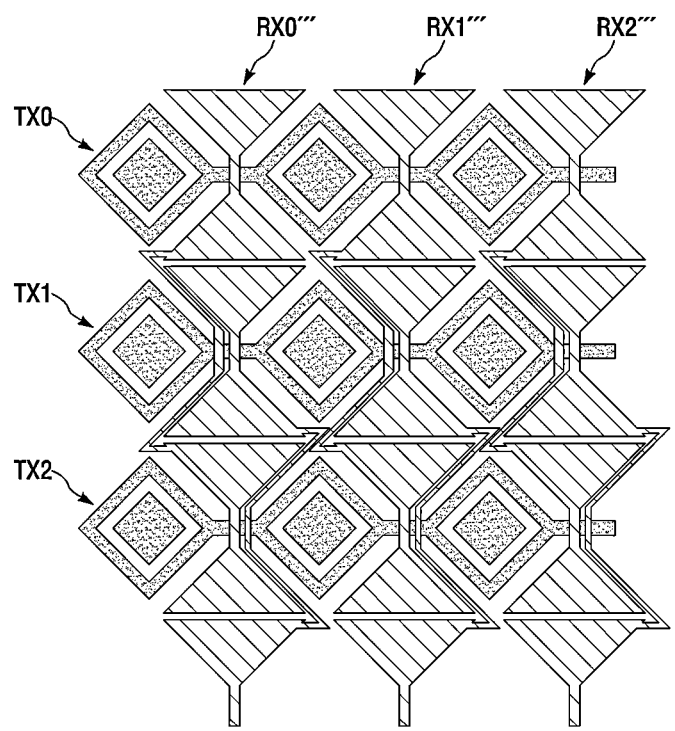
FIG. 9 is a partial plan of a touch sensor according to further another embodiment of the present invention.
Figure 10:
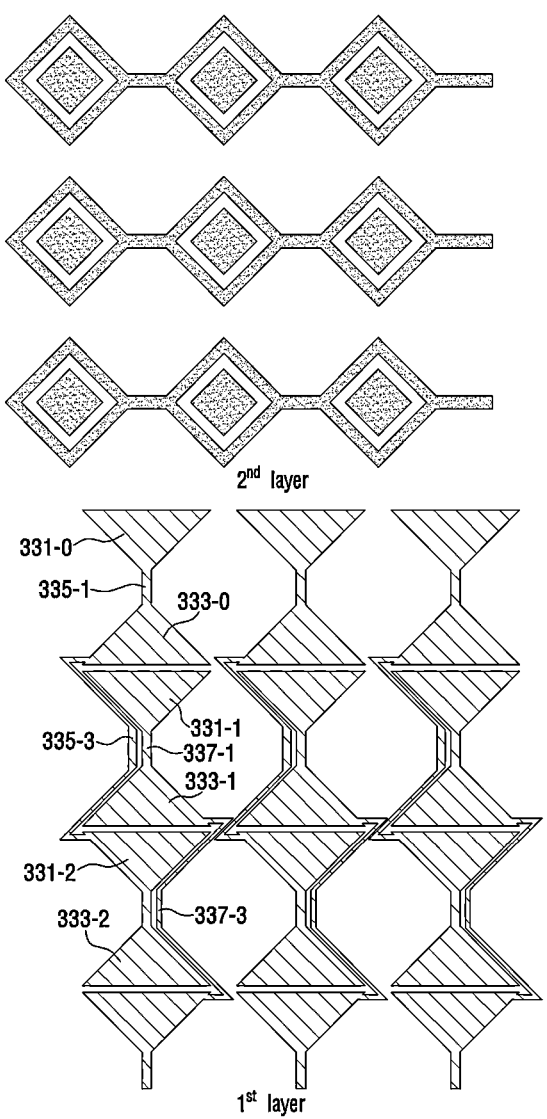
FIG. 10 is a plan view illustrating a state in which the touch sensor of FIG. 9 is divided into two layers.

FIG. 9 is a partial plan of a touch sensor according to further another embodiment of the present invention, and FIG. 10 is a plan view illustrating a state in which the touch sensor of FIG. 9 is divided into two layers.

When compared with the touch sensors illustrated in FIGS. 9 and 10, a plurality of driving electrodes TX0, TX1, TX2, . . . are the same, but there is a difference in a plurality of receiving electrodes RX0", RX1", RX2", . . . . Therefore, hereinafter, the plurality of receiving electrodes RX0", RX1", RX2", . . . will be described in detail, and the descriptions of the plurality of driving electrodes TX0, TX1, TX2, . . . are replaced with the above-described contents.

As illustrated in FIG. 10, the plurality of receiving electrodes RX0", RX1", RX2", . . . are disposed on a layer (first layer) different from a layer (second layer) on which a plurality of driving electrodes TX0, TX1, TX2, . . . are disposed.

The plurality of receiving electrodes RX0", RX1", RX2", . . . may include first and second receiving pattern parts 331-0, 333-0, 331-1, 333-1, 331-2, 333-2, and 331-3, first connection patterns 335-1 and 335-3, and second connection patterns 337-1 and 337-3.

Shapes and arrangement of the first and second receiving pattern parts 331-0, 333-0, 331-1, 333-1, 331-2, 333-2, and 331-3 are the same as the shapes and arrangement of the first and second receiving pattern parts 331 and 333 of each of the touch sensors illustrated in FIGS. 2 and 3.

When one first receiving pattern part 331-0 and one second receiving pattern part 333-0 constitute one group, a plurality of groups may be arranged in the second direction.

The first connection patterns 335-1 and 335-3 are patterns electrically connecting odd-numbered groups of a plurality of groups to each other.

The first connection patterns 335-1 and 335-3 may include a first-1 connection pattern 335-1 electrically connecting the first receiving pattern part 331-0 and the second receiving pattern part 333-0 of each of the odd-numbered groups to each other, and a first-2 connection pattern 335-3 electrically connecting the second receiving pattern part 333-0 of one group of the odd-numbered groups to the first receiving pattern part 331-2 of the next group.

The first-2 connection pattern 335-3 may be disposed at one side of the first receiving pattern part 331-1, the second-1 connection pattern 337-a, and the second receiving pattern part 333-1 of the even-numbered groups disposed between one group and the next group of the even-numbered groups and have a shape corresponding to that of an edge of each of the first receiving pattern part 331-1, the second-1 connection pattern 337-1, and the second receiving pattern part 333-1 of the even-numbered groups.

The first connection patterns 337-1 and 337-3 are patterns electrically connecting the even-numbered groups of the plurality of groups to each other.

The second connection patterns 337-1 and 337-3 may include a second-1 connection pattern 337-1 electrically connecting the first receiving pattern part 331-1 and the second receiving pattern part 333-1 of each of the even-numbered groups to each other and a second-2 connection pattern 337-3 connecting the second receiving pattern part 333-1 of one group of the even-numbered groups to the first receiving pattern part of the next group.

The second-2 connection pattern 337-3 may be disposed at the other side of the first receiving pattern part 331-2, the first-1 connection pattern, and the second receiving pattern part 333-2 of the even-numbered groups disposed between one group and the next group of the odd-numbered groups and have a shape corresponding to that of an edge of each of the first receiving pattern part 331-2, the first-1 connection pattern, and the second receiving pattern part 333-2 of the odd-numbered groups.

Since the plurality of receiving electrodes RX0", RX1", RX2", . . . are disposed on different layers, when compared to the touch sensors illustrated in FIGS. 9 and 10, the touch sensor illustrated in FIGS. 9 and 10 according to another embodiment of the present invention may have an advantage in that the first connection patterns 335-1 and 335-3 and the second connection patterns 337-1 and 337-3 are not connected to the first and second receiving pattern parts 331-0, 333-0, 331-1, 333-1, 331-2, 333-2, and 331-3 through conductive vias and are integrally provided.

Figure 11:
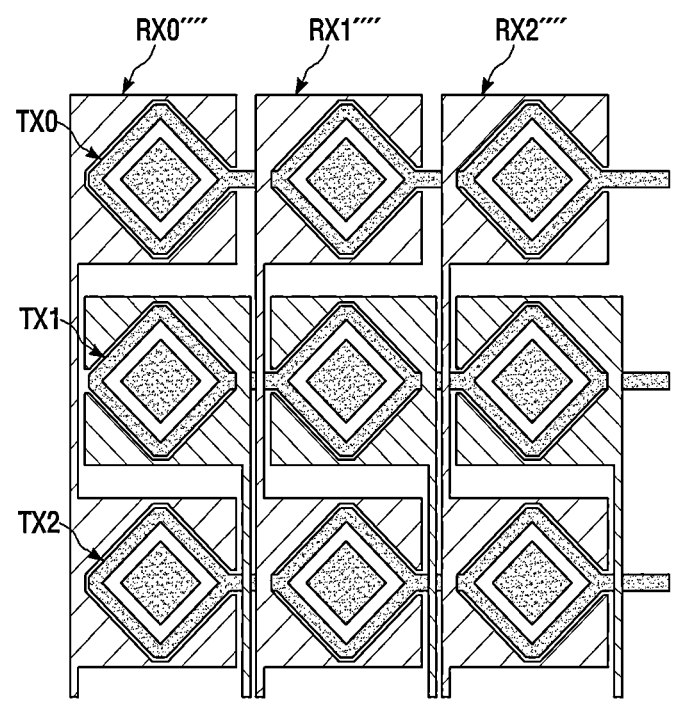
FIG. 11 is a partial plan view of a touch sensor according to further another embodiment of the present invention.
Figure 12:
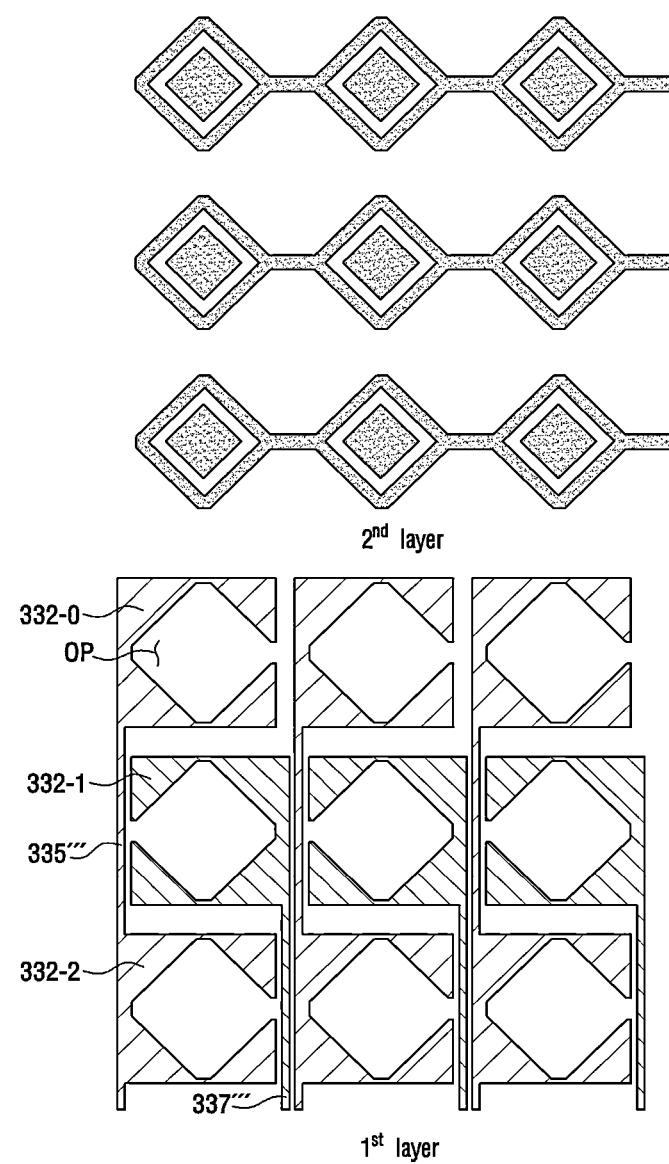
FIG. 12 is a plan view illustrating a state in which the touch sensor of FIG. 11 is divided into two layers.

FIG. 11 is a partial plan view of a touch sensor according to further another embodiment of the present invention, and FIG. 12 is a plan view illustrating a state in which the touch sensor of FIG. 11 is divided into two layers.

When compared with the touch sensors illustrated in FIGS. 11 and 12, a plurality of driving electrodes TX0, TX1, TX2, . . . are the same, but there is a difference in a plurality of receiving electrodes RX0"", RX1"", RX2"", . . . . Therefore, hereinafter, the plurality of receiving electrodes RX0"", RX1"", RX2"", . . . will be described in detail, and the descriptions of the plurality of driving electrodes TX0, TX1, TX2, . . . are replaced with the above-described contents.

As illustrated in FIG. 12, the plurality of receiving electrodes RX0"", RX1"", RX2"", . . . are disposed on a layer (first layer) different from a layer (second layer) on which a plurality of driving electrodes TX0, TX1, TX2, . . . are disposed.

The plurality of receiving electrodes RX0"", RX1"", RX2"", . . . may include first and second receiving pattern parts 332-0, 332-1, 332-2, a first connection pattern 335', and a second connection pattern 337"".

The first and second receiving pattern parts 332-0, 332-1, and 332-2 are alternately disposed in the second direction.

Each of the first and second receiving pattern parts 332-0, 332-1, and 332-2 may be disposed on a corresponding driving pattern part 331 illustrated in FIG. 3.

Each of the first and second receiving pattern parts 332-0, 332-1, and 332-2 has an opening OP corresponding to one driving pattern part 311 and the connection pattern 315 illustrated in FIG. 3. Thus, each of the first and second receiving pattern parts 332-0, 332-1, and 332-2 may have a shape surrounding one driving pattern part 331, and the first and second receiving pattern parts 332-0, 332-1, and 332-2 surrounding an outer circumference of the pattern part 311 illustrated in FIG. 3 may have a rectangular or polygonal shape as a whole.

The first connection pattern 335''' electrically connects the two adjacent first receiving pattern parts 332-0 and 332-2 to each other, and the second connection pattern 337''' electrically connects the two adjacent second receiving pattern parts 332-1 to each other.

The first connection pattern 335''' may be disposed adjacent to one side of the second receiving pattern part 332-1 disposed between the two adjacent first receiving pattern parts 332-0 and 332-2, and the second connection pattern 337''' may be disposed adjacent to the other side of the first receiving pattern part 332-2 disposed between two adjacent second receiving pattern parts 332-1.

Since the plurality of receiving electrodes RX0"", RX1"", RX2"", are disposed on different layers, when compared to the touch sensors illustrated in FIGS. 11 and 12, the touch sensor illustrated in FIGS. 11 and 12 according to another embodiment of the present invention may have an advantage in that the first connection pattern 335''' and the second connection pattern 337''' are not connected to the first and second receiving pattern parts 331-0, 332-1, and 332-2 through conductive vias and are integrally provided.

Figure 13:
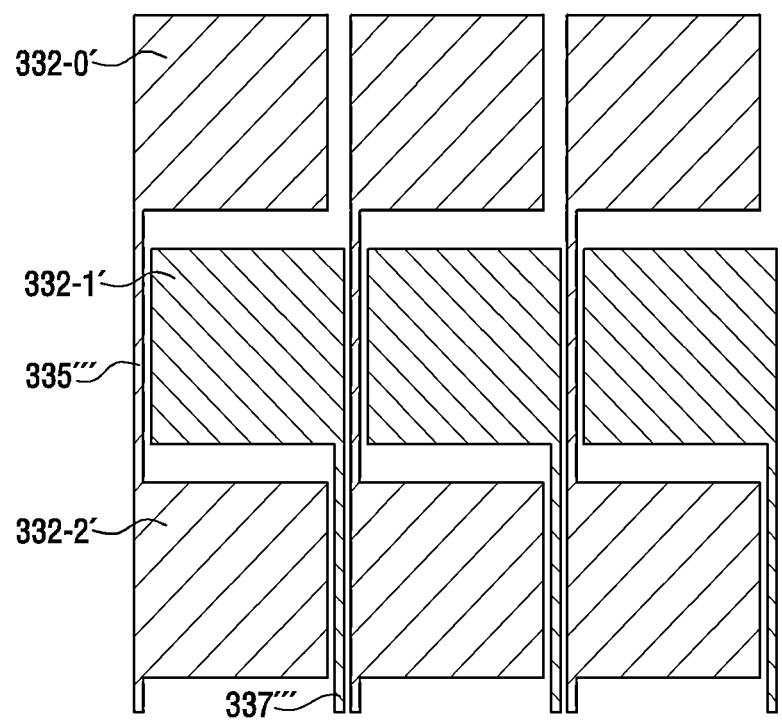
FIG. 13 is a view illustrating a modified example of a plurality of receiving electrodes RX0", RX1", RX2", . . . of FIGS. 11 and 12.

FIG. 13 is a view illustrating a modified example of a plurality of receiving electrodes RX0", RX1", RX2", . . . of FIGS. 11 and 12.

Unlike the plurality of receiving electrodes illustrated in FIG. 12, the plurality of receiving electrodes illustrated in FIG. 13 may not have an opening OP. Since the plurality of receiving electrodes illustrated in FIG. 13 are disposed on a different layer from the plurality of driving electrodes, there is no need for the opening OP.

Figure 14:
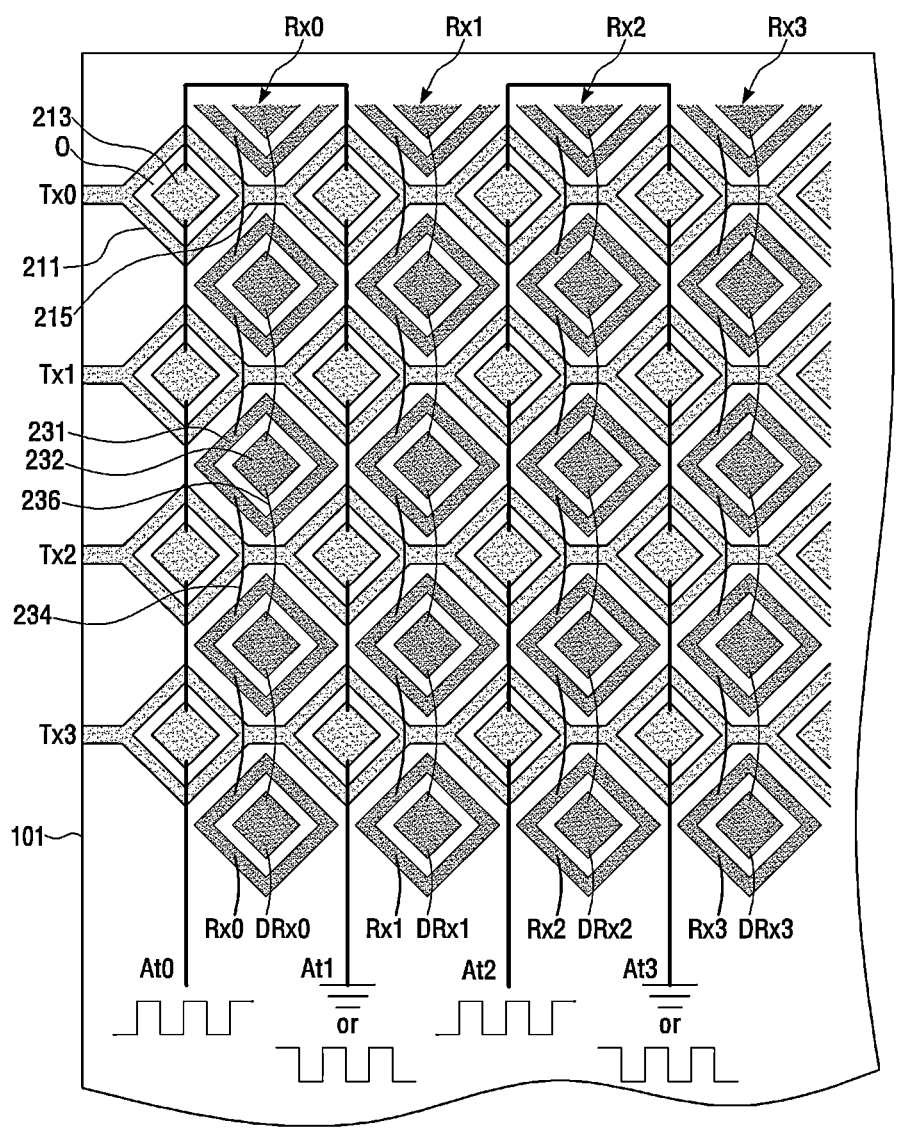
FIG. 14 is a partial plan view of the touch sensor 10 of FIG. 1 according to another embodiment.

FIG. 14 is a partial plan view of the touch sensor 10 of FIG. 1 according to another embodiment.

Referring to FIG. 14, a touch sensor according to another embodiment of the present invention may be disposed in an active area 101 of a touch input device. The active area 101 may be an area on which a touch is input and may be an area corresponding to a display area of a display panel provided in a touch input device.

The touch sensor 10 includes a plurality of first electrodes and a plurality of second electrodes. Hereinafter, the plurality of first electrodes will be described as a plurality of driving electrodes TX0, TX1, TX2, . . . , and the plurality of second electrodes will be described as a plurality of receiving electrodes RX0, RX1, RX2, . . . . Although not shown in the drawings, on the contrary, the plurality of first electrodes may be a plurality of receiving electrodes RX0, RX1, RX2, . . . , and the plurality of second electrodes may be a plurality of driving electrodes TX0, TX1, TX2, . . . .

The plurality of driving electrodes TX0, TX1, TX2, . . . have a shape extending in a first direction, and the plurality of receiving electrodes RX0, RX1, RX2, . . . have a shape in a second direction perpendicular to the first direction.

A predetermined capacitance is disposed between the plurality of driving electrodes TX0, TX1, TX2, . . . and the plurality of receiving electrodes RX0, RX1, RX2, . . . , particularly at their intersections. The capacitance varies when a touch input occurs at or around a corresponding point. Thus, a capacitance variation may be detected from signals output from the plurality of receiving electrodes RX0, RX1, RX2, . . . to detect whether the touch occurs and the touch input.

The plurality of driving electrodes TX0, TX1, TX2, . . . illustrated in FIG. 14 may include a driving pattern part 211, a driving dummy pattern part 213, and a connection pattern 215.

The driving pattern part 211 has a diamond shape or a rhombus shape and has an opening O with the inside opened. The opening O has a diamond shape or a rhombus shape corresponding to an external shape of the driving pattern part 211. Due to the opening O, the driving pattern part 211 may have a diamond or rhombus band shape. Although the driving pattern part 211 is illustrated in the diamond or rhombus shape in the drawing, this is only an example, and for example, the driving pattern part 211 may have a polygonal or rectangular shape.

The driving dummy pattern part 213 is disposed in the opening O of the driving pattern part 211.

The driving dummy pattern part 213 has a diamond shape or a rhombus shape. An external shape of the driving dummy pattern part 213 has a shape corresponding to that of the driving pattern part 211. Unlike the driving pattern part 211, the driving dummy pattern part 213 may not have an opening defined therein.

The driving pattern part 211 and the driving dummy pattern part 213 are spaced a predetermined distance from each other so that the driving pattern part 211 and the driving dummy pattern part 213 are electrically insulated from each other.

The driving pattern part 211 in which the driving dummy pattern part 213 is disposed is provided in plurality, which are arranged in the first direction (or horizontal direction). A connection pattern 215 disposed between the plurality of driving pattern parts 211 electrically connects the driving pattern parts 211 to each other.

The connection pattern 215 connects two adjacent driving pattern parts 211 to each other. The connection pattern 315 has one end connected to the driving pattern part 211 disposed at one side and the other end connected to the driving pattern part disposed at the other side. The connection pattern 215 may have a bar shape, but is not limited thereto and may connect two adjacent driving pattern parts 211 to each other in various shapes.

The plurality of driving pattern parts 211, the plurality of driving dummy pattern parts 213, and the plurality of connection patterns 215 are disposed together on the same layer. The plurality of driving pattern parts 211, the plurality of driving dummy pattern parts 213, and the plurality of connection patterns 215 may be made of the same material. For example, each of the plurality of driving pattern parts 211, the plurality of driving dummy pattern parts 213, and the plurality of connection patterns 215 may be made of a metal mesh. The metal mesh may be patterned according to the shapes of the plurality of driving pattern parts 211, the plurality of driving dummy pattern parts 213, and the plurality of connection patterns 215 to provide the plurality of driving electrodes TX0, TX1, TX2, . . . .

In FIG. 14, the dummy pattern part 213 is disposed in the opening O inside the driving pattern part 211, but each driving electrode according to the present invention is not limited thereto. For example, the driving pattern part 211 and the dummy pattern part 213 may have shapes other than the diamond or rhombus shape. The driving pattern part 211 and the dummy pattern part 213 may be combined with each other in various shapes to provide the driving electrode.

Each of the plurality of receiving electrodes RX0, RX1, RX2, . . . illustrated in FIG. 14 includes a receiving pattern part 231, a receiving dummy pattern part 232, and first and second connection patterns 234 and 236.

The receiving pattern part 231 has a diamond shape or a rhombus shape and has an opening with the inside opened. The opening has a diamond shape or a rhombus shape corresponding to an external shape of the receiving pattern part 231. Due to the opening, the receiving pattern part 231 may have a diamond or rhombus band shape. Although the receiving pattern part 231 is illustrated in the diamond or rhombus shape in the drawing, this is only an example, and for example, the receiving pattern part 231 may have a polygonal or rectangular shape.

The receiving dummy pattern part 232 is disposed in the opening of the receiving pattern part 231.

The receiving dummy pattern part 232 has a diamond shape or a rhombus shape. An external shape of the receiving dummy pattern part 232 has a shape corresponding to that of the receiving pattern part 231. Unlike the receiving pattern part 231, the receiving dummy pattern part 232 may not have an opening defined therein.

The receiving pattern part 231 and the receiving dummy pattern part 232 are spaced a predetermined distance from each other so that the receiving pattern part 231 and the receiving dummy pattern part 232 are electrically insulated from each other.

A plurality of receiving pattern parts 231 are arranged in the second direction (or vertical direction). A first connection pattern 234 disposed between the plurality of receiving pattern parts 231 electrically connects the receiving pattern parts 231 to each other.

A plurality of reception dummy pattern parts 232 are arranged inside the receiving pattern part 231 in the second direction (or vertical direction). A second connection pattern 236 disposed between the plurality of receiving dummy pattern parts 232 electrically connects the receiving dummy pattern parts 232 to each other.

The first connection pattern 234 connects two adjacent receiving pattern parts 231 to each other. The connection pattern 315 has one end connected to the receiving pattern part 231 disposed at one side and the other end connected to the receiving pattern part disposed at the other side. Although the first connection pattern 234 is illustrated in the shape of a jump line in FIG. 2, it is not limited thereto, and the two adjacent receiving pattern parts 231 may be connected to each other in various shapes. For example, the first connection pattern 234 may be disposed on a layer other than the layer on which the receiving pattern part 231 is disposed, and thus, the two adjacent receiving pattern parts 231 may be connected to each other.

The second connection pattern 236 connects the two adjacent receiving dummy pattern parts 232 to each other. The connection pattern 315 has one end connected to the receiving dummy pattern part 232 disposed at one side and the other end connected to the receiving dummy pattern part disposed at the other side. Although the second connection pattern 236 is illustrated in the shape of a jump line in FIG. 2, it is not limited thereto, and the two adjacent receiving dummy pattern parts 232 may be connected to each other in various shapes. For example, the second connection pattern 236 may be disposed on a layer other than the layer on which the receiving dummy pattern part 232 is disposed, and thus, the two adjacent receiving dummy pattern parts 232 may be connected to each other.

The plurality of receiving pattern parts 231 and the plurality of receiving dummy pattern parts 232 are disposed together on the same layer. Here, the plurality of receiving pattern parts 231 and the plurality of receiving dummy pattern parts 232 may be disposed on the same layer together with the plurality of driving pattern parts 211, the plurality of driving dummy pattern parts 213, and the plurality of connection patterns 215.

The plurality of receiving pattern parts 231 and the plurality of receiving dummy pattern parts 232 may be made of the same material. For example, each of the plurality of receiving pattern parts 231 and the plurality of reception dummy pattern parts 232 may be made of a metal mesh. The metal mesh may be patterned to match shapes of the plurality of receiving pattern parts 231 and the plurality of receiving dummy pattern parts 232 to provide a plurality of receiving electrodes RX0, RX1, RX2, . . . .

A touch sensor illustrated in FIG. 14 according to another embodiment of the present invention includes at least one conductive loop At0-At1 and At2-At3.

Figure 15:
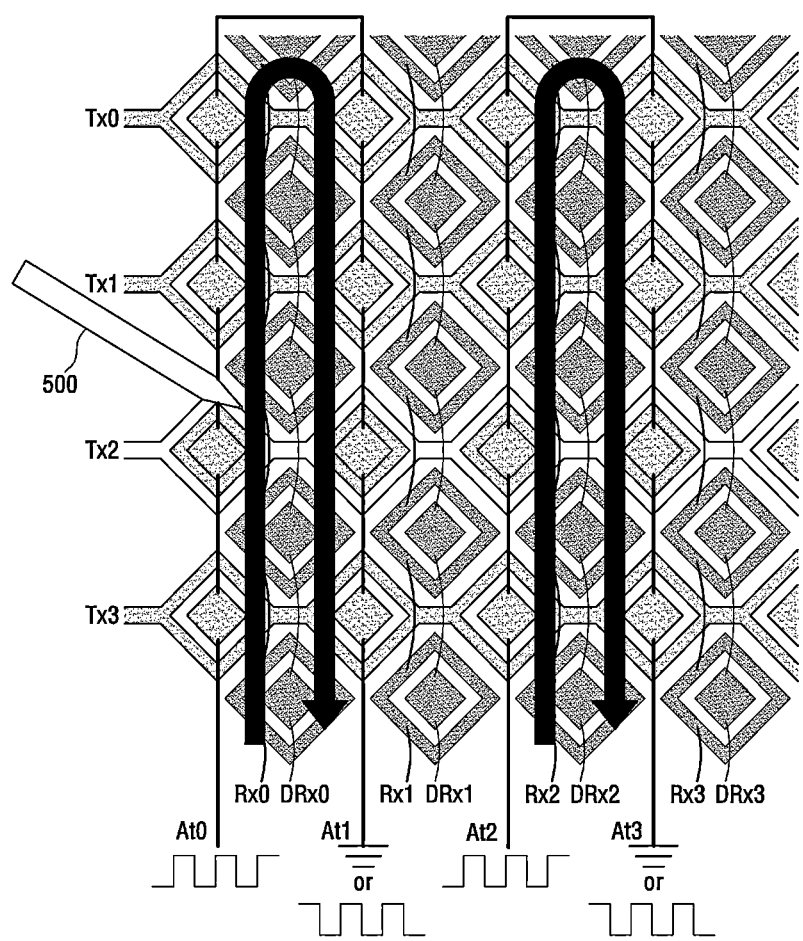
FIG. 15 is a view illustrating a flow of current in a conductive loop of the touch sensor of FIG. 14.

At least one or more conductive loops At0-At1 and At2-At3 generate a magnetic field signal for driving the stylus pen 500, as illustrated in FIG. 15. The generated magnetic field signal may resonate a resonator inside the stylus pen 500 to drive the stylus pen 500.

The at least one conductive loop At0-At1 and At2-At3 may include a first loop At0-At1 and a second loop At2-At3. Although two loops are illustrated in FIGS. 14 and 15, the present invention is not limited thereto, and the touch sensor according to an embodiment of the present invention may include three or more loops. Hereinafter, for convenience of description, the two loops At0-At1 and At2-At3 will be used.

One loop may be provided to electrically connect two conductive patterns to each other. For example, the first loop At0-At1 is provided by electrically connecting a zero-th conductive pattern At0 to a first conductive pattern At1, and the second loop At2-At3 is provided by electrically connecting a second conductive pattern At2 to a third conductive pattern At3.

One conductive pattern is disposed along the second direction, in which each of the receiving electrode RX0, RX1, RX2, RX3, . . . , is arranged and is electrically connected to one driving dummy pattern part 213 for each driving electrodes TX0, TX1, TX2, TX3, . . . . For example, as illustrated in FIG. 15, the zero-th conductive pattern At0 is connected to the first driving dummy pattern part of the third driving electrode TX3, connects the first driving dummy pattern part of the third driving electrode TX3 to the first driving dummy pattern part of the second driving electrode TX2, connects the first driving dummy pattern part of the second driving electrode TX2 to the first driving dummy pattern part of the first driving electrode TX1, and connect the first driving dummy pattern part of the first driving electrode TX1 to the first driving dummy pattern part 213 of the zero-th driving electrode TX0. In addition, the zero-th conductive pattern At0 extends from the first driving dummy pattern part 213 of the zero-th driving electrode TX0 in the second direction.

The first conductive pattern At1 is disposed in the second direction in which each of the receiving electrodes RX0, RX1, RX2, RX3, . . . is arranged, is disposed in parallel with the zero-th conductive pattern At0, and is electrically connected to one driving dummy pattern part for each of the electrodes TX0, TX1, TX2, TX3, . . . . For example, as illustrated in FIG. 2, the first conductive pattern At1 is connected to the second driving dummy pattern part of the third driving electrode TX3, connects the second driving dummy pattern part of the third driving electrode TX3 to the second driving dummy pattern part of the second driving electrode TX2, connects the second driving dummy pattern part of the second driving electrode TX2 to the second driving dummy pattern part of the first driving electrode TX1, and connects the second driving dummy pattern part of the first driving electrode TX1 to the second driving dummy pattern part of the zero-th driving electrode TX0. In addition, the zero-th conductive pattern At0 extends from the second driving dummy pattern part of the zero-th driving electrode TX0 in the second direction.

The second loop At2-At3 have the same structure as the first loops At0-At1 except for the dummy driving pattern part of each of the driving electrodes TX0, TX1, TX2, TX3, . . . to which each of the second conductive pattern At2 and the third conductive pattern At3, which constitute the second loop At2-At3, is electrically connected. That is, the second conductive pattern At2 is electrically connected to the driving dummy pattern parts that are disposed at a third position from a left side to a right side in each of the driving electrodes TX0, TX1, TX2, TX3, . . . , and the third conductive pattern At3 is electrically connected to the driving dummy pattern parts that are disposed at a fourth position from a left side to a right side in each of the driving electrodes TX0, TX1, TX2, TX3, . . . .

Although not shown in the drawing, another loop may be provided by electrically connecting the zero-th conductive pattern At0 to the second conductive pattern At2 or electrically connecting the zero-th conductive pattern At0 to the 3rd conductive pattern At3.

For example, a loop driving signal may be applied to the zero-th conductive pattern At0 constituting the first loop At0-At1, and the first conductive pattern At1 may be connected to ground. As the loop driving signal such as a pulse signal is applied to the zero-th conductive pattern At0, as illustrated in FIG. 3, one current loop At0-At1 is provided. A predetermined magnetic field signal is generated by the provided current loop At0-At1, and when the stylus pen 500 illustrated in FIG. 15 is disposed in the current loop, the generated magnetic field signal may resonate the resonator of the stylus pen 500 and drive the stylus pen 500 by the resonance.

A loop driving signal (loop TX) may be applied to one of the two conductive patterns constituting one conductive loop described above, and other conductive patterns may be grounded. Here, the loop driving signal may be a signal (AC signal) having a resonant frequency capable of resonating the stylus pen 500 illustrated in FIG. 15.

As illustrated in FIG. 15, a signal having a phase opposite to that of the loop driving signal, which is not grounded, may be applied to the remaining conductive patterns that are grounded. When the signal having the phase opposite to that of the loop driving signal is applied to the remaining conductive patterns, an amplitude of the current loop may be doubled, and a flicker phenomenon that may occur in the display panel may be removed.

Figure 16:
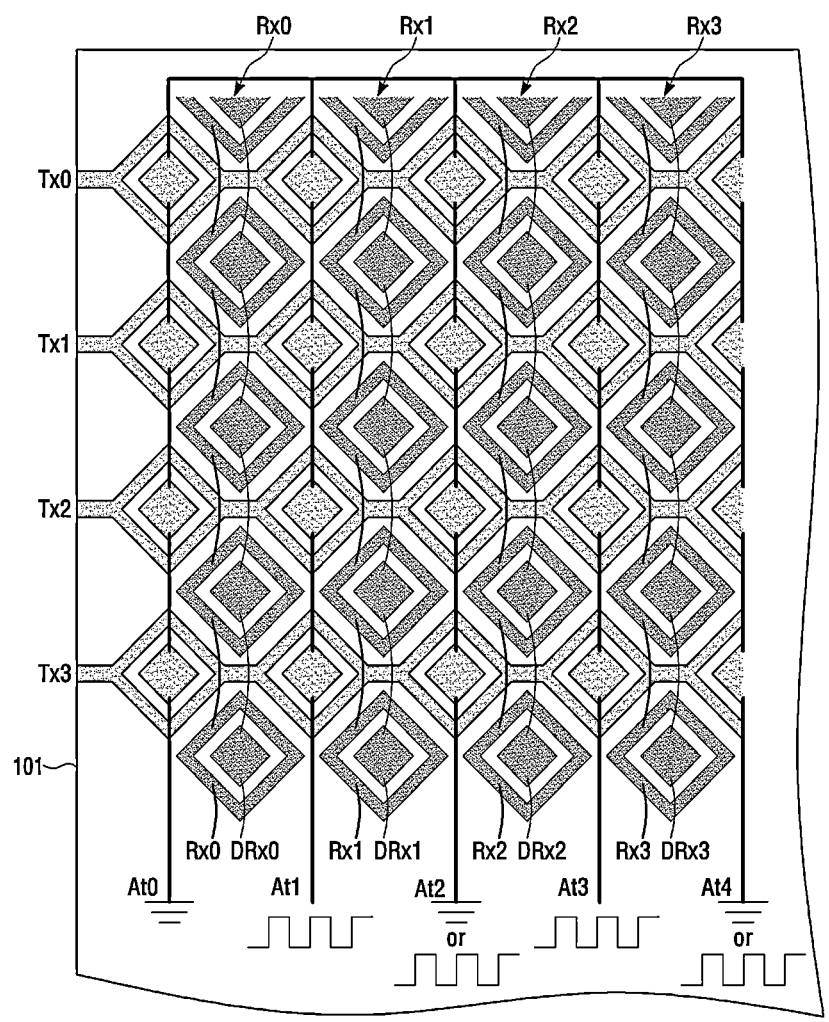
FIG. 16 is a partial plan view illustrating the touch sensor 10 of FIG. 1 according to further another embodiment.

FIG. 16 is a partial plan view illustrating the touch sensor 10 of FIG. 1 according to further another embodiment.

When compared to the touch sensor illustrated in FIG. 14, a touch sensor of FIG. 16 according to another embodiment may have the same configuration as a plurality of driving electrodes TX0, TX1, TX2, TX3, . . . and a plurality of receiving electrodes RX0, RX1, RX2, RX3, . . . , but there is a difference in conductive loop.

The conductive loop of the touch sensor illustrated in FIG. 16 may be provided by electrically connecting ends of the plurality of conductive patterns At0, At1, At2, At3, and At4 to each other.

Figure 17:
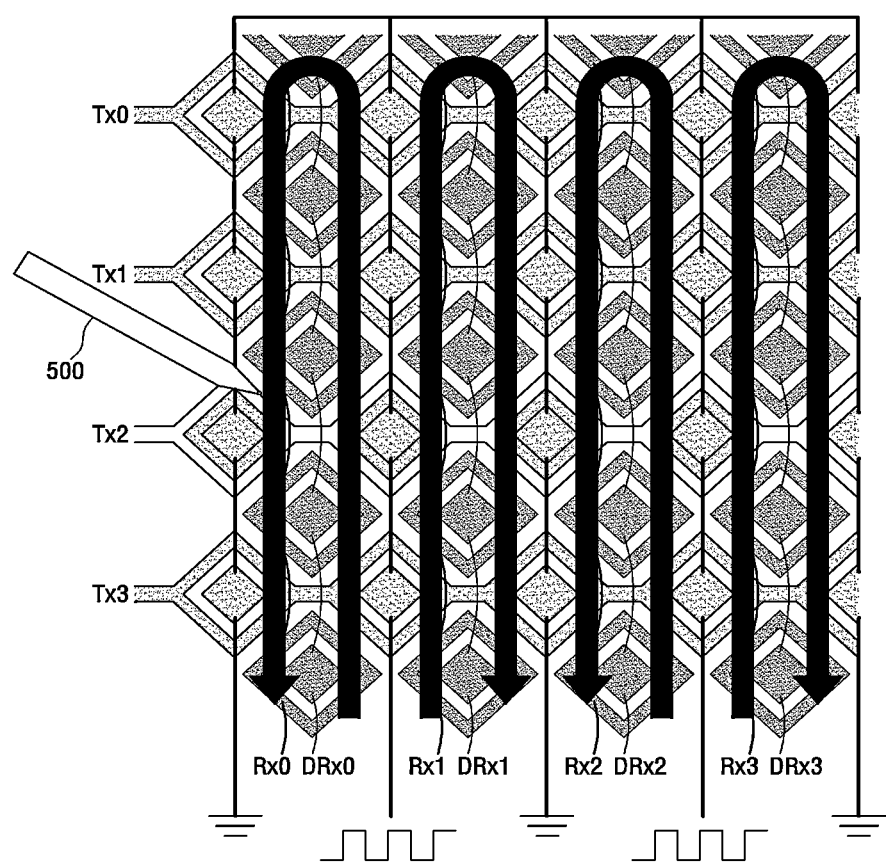
FIG. 17 is a view illustrating a flow of current in a conductive loop of the touch sensor of FIG. 16.

The loop driving signal is applied to the even-numbered conductive patterns At1 and At3 from the left side to the right side among the plurality of conductive patterns At0, At1, At2, At3, and At4, the odd-numbered conductive patterns At0, At2, and At4 may be grounded, or the signal having the phase opposite to that of the loop driving signal may be applied. Then, as illustrated in FIG. 17, more current loops than in FIG. 15 may be provided in comparison to the same area. That is, in FIG. 15, two current loops are provided at regular intervals, but in FIG. 17, four current loops are continuously provided. Therefore, even when the stylus pen 500 moves in the extension direction (or first direction) of the driving electrodes TX0, TX1, TX2, TX3, . . . , a constant magnetic field signal may be continuously provided to the stylus pen 500.

As illustrated in FIG. 16, a loop driving signal that is the same as that applied to the even-numbered conductive patterns At2 and At4 in the conductive patterns At2 and At4 remaining except for the zero-th conductive pattern At0 among the odd-numbered conductive patterns At0, At2, and At4.

Unlike in FIGS. 15 to 17, the plurality of conductive patterns At0, At1, At2, At3, At4, . . . may be electrically connected to the receiving dummy pattern part 232 of the plurality of receiving electrodes RX0, RX1, RX2, RX3, . . . . For example, one conductive pattern may be disposed in the first direction in which the driving electrodes TX0, TX1, TX2, TX3, . . . are arranged and may be electrically connected to one receiving dummy pattern part 232 for each of the receiving electrodes RX0, RX1, RX2, RX3, . . . .

Figure 18:
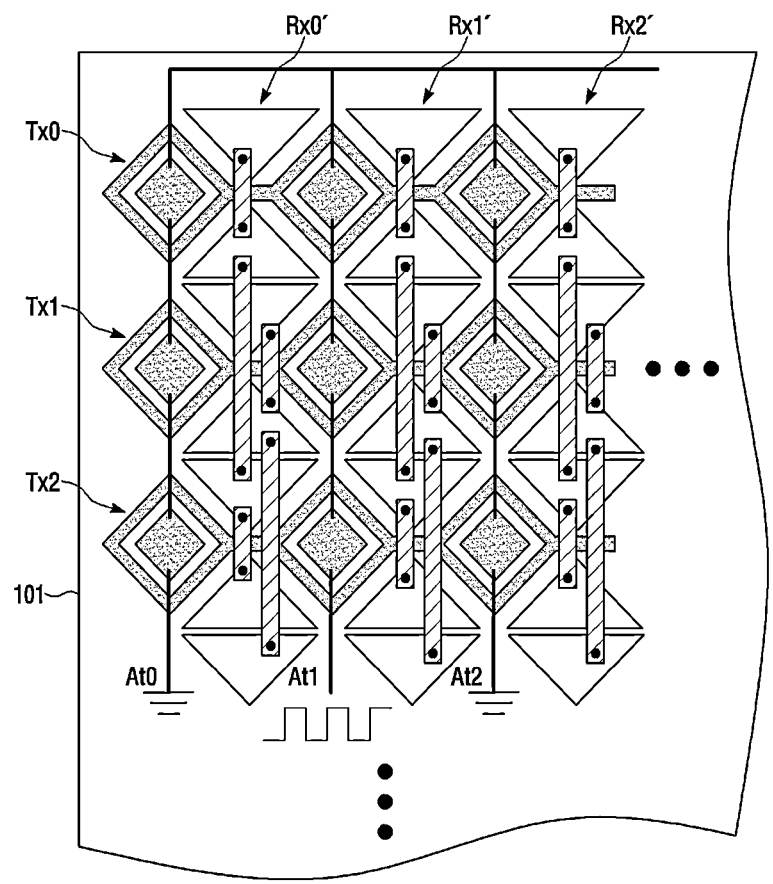
FIG. 18 is a partial plan view illustrating the touch sensor 10 of FIG. 1 according to further another embodiment.
Figure 19:
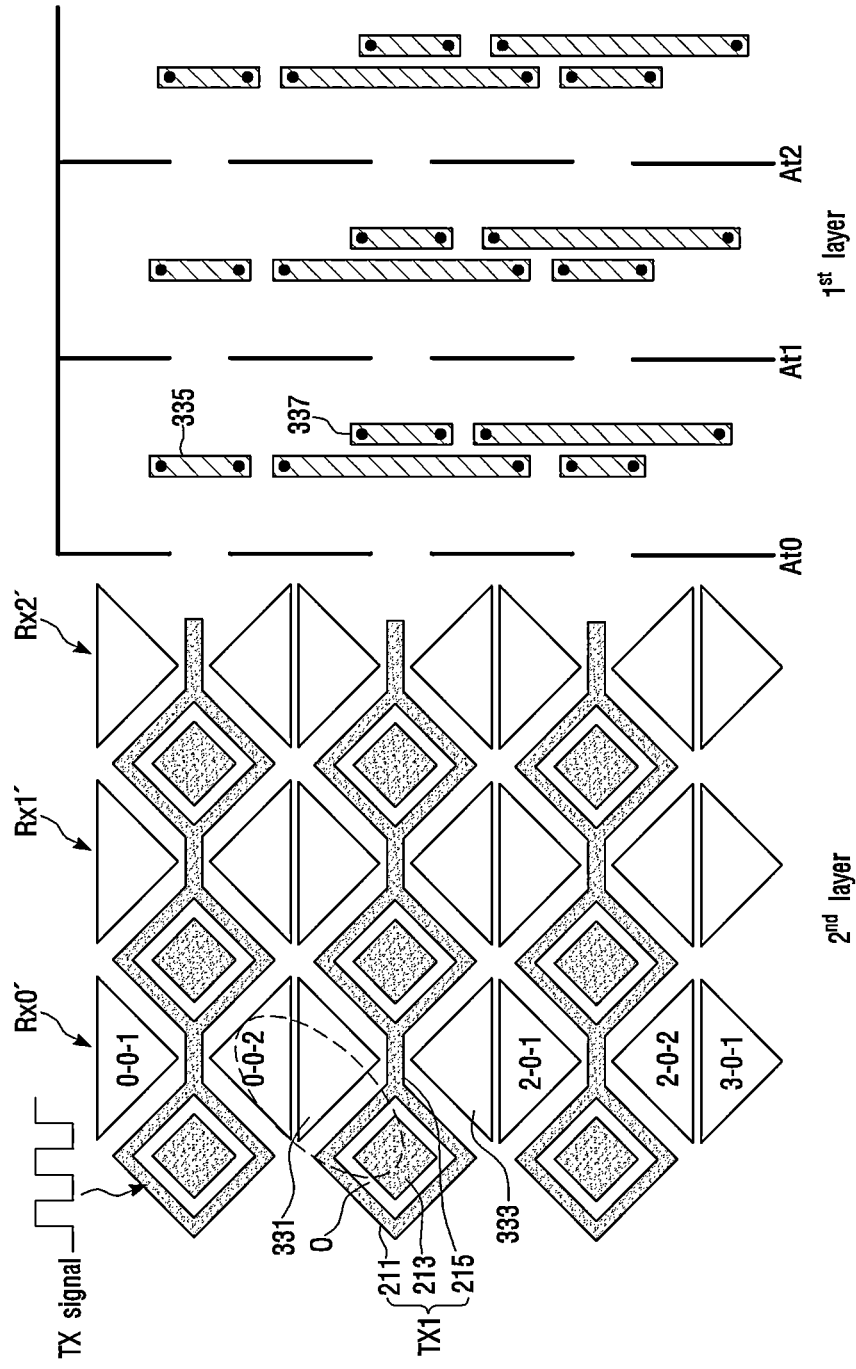
FIG. 19 is a plan view illustrating a state in which the touch sensor of FIG. 18 is divided into two layers.

FIG. 18 is a partial plan view illustrating the touch sensor 10 of FIG. 1 according to further another embodiment, and FIG. 19 is a plan view illustrating a state in which the touch sensor of FIG. 18 is divided into two layers.

Referring to FIGS. 18 to 19, a touch sensor according to further another embodiment of the present invention has the same structure and conductive loop as the plurality of driving electrodes TX0, TX1, TX2, . . . , except for structures of the plurality of receiving electrodes RX0', RX1', RX2', . . . when compared to the touch sensor illustrated in FIG. 16. Hereinafter, the structures of the plurality of receiving electrodes RX0', RX1', RX2', . . . will be described in detail.

As illustrated in FIG. 19, each of the plurality of receiving electrodes RX0', RX1', RX2, . . . illustrated in FIG. 18 includes a first receiving pattern part 331, a second receiving pattern part 333, a first connection pattern 335 and a second connection pattern 337.

The first receiving pattern part 331 and the second receiving pattern part 333 are disposed between two driving pattern parts 311 adjacent to each of the driving electrodes TX0, TX1, TX2, . . . in the left and right direction.

The first receiving pattern part 331 has an inverted triangular shape, and the second receiving pattern part 333 has a triangular shape that is symmetrical to the first receiving pattern part 331. Here, the first and second receiving pattern parts 331 and 333 are not limited to the triangular shapes. For example, although not shown in the drawing, each of the first and second receiving pattern parts 331 and 333 may have a shape surrounding an outer circumference of one driving pattern part 331, and each of the first and second receiving pattern parts surrounding the outer circumference of the driving pattern part 331 may have a rectangular or polygonal shape as a whole.

The first receiving pattern part 331 and the second receiving pattern part 333 may have the same size and shape. The first receiving pattern part 331 and the second receiving pattern part 333 may have the same cross-sectional area.

The second receiving pattern part 333 is disposed to be spaced a predetermined distance under the first receiving pattern part 331. Alternatively, the second receiving pattern part 333 is disposed to be spaced a predetermined distance from the first receiving pattern part 331 in the second direction perpendicular to the first direction.

The connection pattern 315 of each of the driving electrode TX0, TX1, TX2, . . . may be disposed between the first receiving pattern part 331 and the second receiving pattern part 333. The first receiving pattern part 331 is disposed on the connection pattern 315, and the second receiving pattern part 333 is disposed below the connection pattern 315.

The first receiving pattern part 331 and the second receiving pattern part 333 are provided in plurality, which are alternately arranged in the second direction.

The plurality of first receiving pattern parts 331 and the plurality of second receiving pattern parts 333, which are alternately arranged in the second direction, are electrically connected by the first connection pattern 335 and the second connection pattern 337. Here, the plurality of first receiving pattern parts 331 and the plurality of second receiving pattern parts 333 may be electrically connected to the first connection pattern 335 and the second connection pattern 337 through conductive vias.

The first connection pattern 335 and the second connection pattern 337 may be disposed on a layer (first layer) different from a layer (second layer) on which the first receiving pattern part 331 and the second receiving pattern part 333 are disposed. This is to prevent electrical short-circuit with the driving electrodes TX0, TX1, TX2, . . . disposed on the layer (second layer) on which the second receiving pattern part 333 is disposed. An insulating layer may be disposed between the layer (second layer), on which the first receiving pattern part 331 and the second receiving pattern part 333 are disposed, and the other layer (first layer).

When the first receiving pattern part 331 and the second receiving pattern part 333, which are adjacent to each other in the vertical direction with the connection pattern 315 therebetween, are defined as one group, the plurality of first receiving pattern parts 331 and the plurality of second receiving pattern parts 333 alternately arranged in the second direction may be defined as a plurality of groups arranged in the second direction. Under this definition, the first connection pattern 335 electrically connects the first receiving pattern parts 0-0-1, 2-0-1, . . . and the second receiving pattern parts 0-0-2, 2-0-2, . . . of odd-numbered groups from the top. The second connection pattern 337 electrically connects the first receiving pattern part 331 and the second receiving pattern part 333 of each of even-numbered groups from the top.

The first connection pattern 335 electrically connects the first receiving pattern parts 0-0-1, 2-0-1, . . . and the second receiving pattern parts 0-0-2, 2-0-2, . . . , which are disposed between the two driving pattern parts 311 adjacent in a left and right directions in the odd-numbered driving electrodes TX0, TX2, . . . . In addition, the first connection pattern 335 electrically connects a second receiving pattern part 0-0-2 disposed between the two driving pattern parts 311 adjacent in the left and right direction in one odd-numbered driving electrode TX0 and a first receiving pattern part 2-0-1 disposed between the two driving pattern parts adjacent to each other in the left and right direction in the other odd-numbered driving electrode TX3 disposed next to the one driving electrode TX0. The odd-numbered driving electrodes TX0, TX2, . . . are electrically connected by the first connection pattern 335.

The second connection pattern 337 electrically connects the first receiving pattern part 331 and the second receiving pattern part 333, which are disposed between the two driving pattern parts 311 adjacent to the left and right direction in the even-numbered driving electrodes TX1, . . . . In addition, the second connection pattern 337 electrically connects a second receiving pattern part 333 disposed between the two driving pattern parts 311 adjacent in the left and right direction in one even-numbered driving electrode TX1 and a first receiving pattern part 3-0-1 disposed between the two driving pattern parts adjacent to each other in the left and right direction in the other even-numbered driving electrode disposed next to the one driving electrode TX1. The even-numbered driving electrodes TX1, TX3, . . . are electrically connected by the second connection pattern 337.

The first signal is output through the first connection pattern 335, and the second signal is output through the second connection pattern 337. Thus, signals having two channels are output from each of the receiving electrode RX0', RX1', RX2', . . . .

According to the driving electrodes TX0, TX1, TX2, . . . to which the driving signal is applied, one of the first signal and the second signal may be an active channel signal, and the other may be a dummy channel signal. When the driving signal is applied to the odd-numbered driving electrodes TX0, TX2, . . . , the first signal output through the first connection pattern 335 may be an active channel signal, and the second signal output through the second connection pattern 337 may be a dummy channel signal. When the driving signal is applied to the even-numbered driving electrodes TX1, . . . , the second signal output through the second connection pattern 337 may be an active channel signal, and the first signal output through the first connection pattern 335 may be a dummy channel signal.

For example, in FIG. 19, it is assumed that the driving signal (TX signal) is applied to the first driving electrode TX1, and an object (dotted line) is in contact with an intersection of the first driving electrode TX1 and the zero-th receiving electrode RX0.

When the driving signal is applied to the first driving electrode TX1, and the object (dotted line) is disposed on a partial area including the intersection of the first driving electrode TX1 and the second receiving electrode RX0', a capacitance (or active capacitance) disposed between the driving pattern part 311 of the first driving electrode TX1 and the first receiving pattern part 331 of the zero-th receiving electrode RX0' varies. The second signal including capacitance variation information is output through the second connection pattern 337. Here, the second signal may include an LGM noise signal and a display noise signal by the display panel.

Also, a capacitance (or dummy capacitance) generated between the driving pattern part 311 of the first driving electrode TX1 and the second receiving pattern part 0-0-2 of the zero-th receiving electrode RX0' also varies. The first signal including capacitance variation information is output through the first connection pattern 335. Here, the first signal may include an LGM noise signal and a display noise signal by the display panel.

Here, since the first receiving pattern part 331 and the second receiving pattern part 0-0-2, which are in contact with the object (dotted line), have the same cross-sectional area, almost the same or similar LGM noise signals may be input to each of the first receiving pattern part 331 and the second receiving pattern part 0-0-2, and the display noise signal by the display panel may also be input almost identically.

The sensing unit 11 illustrated in FIG. 1 may subtract the first signal output through the first connection pattern 335 from the second signal output through the second connection pattern 337 to offset the LGM noise signal and the display noise signal, which are input into the first receiving pattern 331 and the second receiving pattern part 0-0-2. Although a variation of the active capacitance contained in the second signal, which is the active channel signal, is reduced by the subtraction, since the variation in dummy capacitance contained in the first signal is relatively small, there is no problem in whether the touch occurs or/and detection of a touch position.

In addition, since the first receiving pattern part 331 serves as an AC ground between the driving pattern part 311 and the second receiving pattern part 0-0-2, the variation in capacitance contained in the second signal output through the first receiving pattern part 331 may increase, and the variation in capacitance contained in the first signal output from the second receiving pattern part 0-0-2 may be reduced. In this regard, it is replaced with FIG. 4 and the above-described contents of FIG. 4.

Like the touch sensor illustrated in FIG. 14 or 16, a touch sensor illustrated in FIGS. 18 to 19 according to further another embodiment may generate and output a magnetic field signal capable of driving a stylus pen. This is possible because a plurality of conductive patterns At0, At1, At2, . . . are electrically connected to provide one or more conductive loops.

Each of conductive patterns At0, At1, At2, At3, and At4 extends in the second direction and may be electrically connected to one driving dummy pattern part 213 for each of driving electrodes TX0, TX1, TX2, . . . .

In FIGS. 18 to 19, one end of each of the plurality of conductive patterns At0, At1, At2, . . . is electrically connected, and a loop driving signal is applied to the other end of one conductive pattern At1. The other ends of the two conductive patterns At0 and At2, which are respectively disposed at both sides of the conductive pattern At1, are grounded, and thus, a plurality of conductive loops may be provided as illustrated in FIG. 17. Here, a signal having a phase opposite to that of the loop driving signal may be applied to the other ends of the two conductive patterns At0 and At2.

In the touch sensor illustrated in FIG. 18, as illustrated in FIG. 14, ends of two conductive patterns may be electrically connected to each other to provide one conductive loop.

As described above, since the touch sensor illustrated in FIG. 18 provides one or more conductive loops, like the touch sensors illustrated in FIGS. 14 and 16, a magnetic field signal may be generated by one or more conductive loops, and the generated magnetic field signal may drive the stylus pen in proximity or contact within the conductive loop.

The touch input device including the touch sensor illustrated in FIGS. 14, 16, and 18 described above may generate the magnetic field signal and drive the stylus pen 500 by the generated magnetic field signal. On the other hand, the touch input device including the touch sensors shown in FIGS. 14, 16 and 18 described above may receive an electromagnetic signal output from the stylus pen 500 to sense a position of the stylus pen 500 on each touch sensor.

There may be several methods for sensing the position of the stylus pen 500 disposed at a specific position on each touch sensor illustrated in FIGS. 14, 16, and 18. Hereinafter, the two methods will be described with reference to the accompanying drawings.

Figure 20:
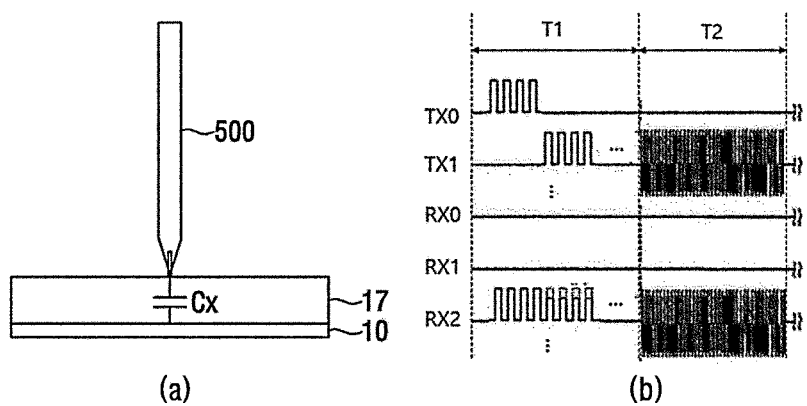
FIG. 20 is a schematic view for explaining one method for sensing a stylus pen 500 though touch sensors according to various embodiments of the present invention.

FIG. 20 is a schematic view for explaining one method for sensing a stylus pen 500 though touch sensors according to various embodiments of the present invention.

Referring to a left drawing of FIG. 20, a window layer 17 may be disposed on one touch sensor 10 of any one of FIGS. 14, 16 and 18. A capacitance Cx may be generated between the touch sensor 10 and a conductive tip of the stylus pen 500. That is, the touch sensor 10 and the stylus pen 500 are capacitively coupled to each other.

In a state in which the touch sensor 10 and the stylus pen 500 are capacitively coupled to each other, a signal generated by the stylus pen 500 (e.g., a resonance signal or a signal based on the resonance signal) may be transmitted to the touch sensor 10.

The signal transmitted from the stylus pen 500 may be received through a plurality of driving electrodes TX0, TX1, . . . and a plurality of receiving electrodes RX0, RX1, RX2, . . . of the touch sensor 10. For example, as illustrated at a right side of FIG. 20, a signal (resonance signal) from the stylus pen 500 may be detected through the first driving electrode TX1 and the second receiving electrode RX2, and thus, it may be detected that a position of the stylus pen 500 is in an area on which the first driving electrode TX1 and the second receiving electrode RX2 intersect.

Here, the control unit 13 illustrated in FIG. 1 may control a driving unit 12 so that a signal transmitted from the touch sensor 10 through a plurality of driving electrodes TX0, TX1, . . . and a plurality of receiving electrodes RX0, RX1, RX2, . . . detect the signal transmitted from the stylus pen 500. For example, the control unit 13 may operate to distinguish a time period T1 in which the plurality of driving electrodes TX0, TX1, . . . and the plurality of receiving electrodes RX0, RX1, RX2, . . . operate in a first mode and a time period in which the plurality of driving electrodes TX0, TX1, . . . and the plurality of receiving electrodes RX0, RX1, RX2, . . . operate in a second mode.

In the first mode, a driving signal is sequentially applied to the plurality of driving electrodes TX0, TX1, . . . in the time period T1, and the first mode is a mode in which a signal including mutual capacitance variation information is output from the plurality of receiving electrodes RX0, RX1, RX2, . . . . A mutual capacitance is generated between any one driving electrode and its adjacent receiving electrode, and since the mutual capacitance generated in the proximity or contact with an object is changed, a variation in mutual capacitance between any one driving electrode and the adjacent receiving electrode thereof is detected to detect whether the touch occurs and a touch position.

The second mode is a mode in which the plurality of driving electrodes TX0, TX1, . . . and the plurality of receiving electrodes RX0, RX1, RX2, . . . receive the signal from the stylus pen 500 in the time period T2. In the second mode, a resonance signal generated by the stylus pen 500, for example, may be received through the first driving electrode TX1 and the second receiving electrode RX2.

As described above, the control unit 13 illustrated in FIG. 1 controls the plurality of driving electrodes TX0, TX1, . . . and the plurality of receiving electrodes RX0, RX1, RX2, . . . in the first mode or the second mode to detect not only the finger but also the stylus pen 500.

Figure 21:
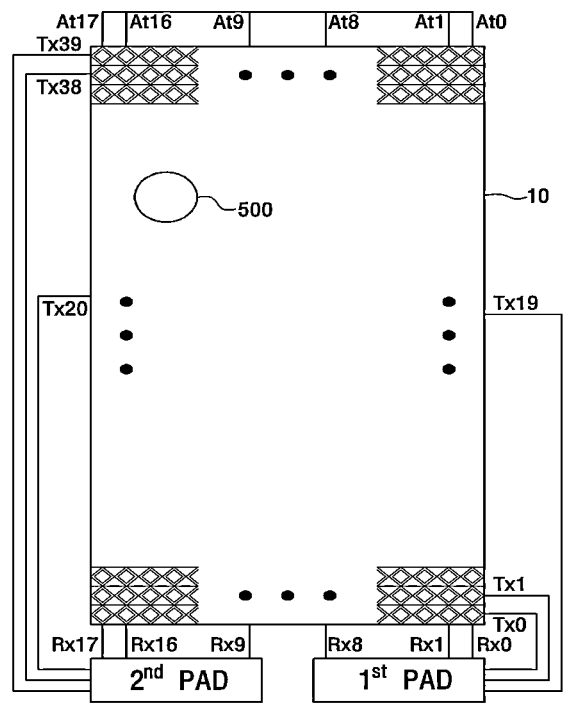
FIG. 21 is a schematic view for explaining the other method for sensing the stylus pen 500 though the touch sensors according to various embodiments of the present invention.

FIG. 21 is a schematic view for explaining the other method for sensing the stylus pen 500 though the touch sensors according to various embodiments of the present invention.

Here, the touch sensor 10 illustrated in FIG. 21 applies the touch sensor illustrated in FIG. 18, but the touch sensor illustrated in FIG. 14 or 16 may be applied.

In the touch sensor 10 illustrated in FIG. 21, the half of the receiving electrodes RX0, . . . , and RX8 of the plurality of receiving electrodes RX0, . . . RX17 may be connected to the first pad (first PAD) through a conductive trace, and the other half of the receiving electrodes RX9, . . . , and RX17 may be connected to the second pad (second PAD) through the conductive trace. In addition, the half of the driving electrodes TX0, . . . , and TX19 of the plurality of driving electrodes TX0, . . . , and TX39 are connected to the first pad (first PAD) by the conductive trace connected to one end (right end) of both ends, and the other half of the driving electrodes TX20, . . . , TX39 may be connected to the second pad (second PAD) by the conductive trace connected to the other end (left end) of both ends. Also, one ends of the plurality of conductive patterns At0, . . . , At17 may be electrically connected to each other. Although not separately shown, the other ends of the plurality of conductive patterns At0, . . . , At17 may be connected to the first pad (first PAD) or the second pad (second PAD).

When each of the plurality of receiving electrodes RX0, . . . , RX17 and the plurality of driving electrodes TX0, . . . , TX39 of the touch sensor 10 illustrated in FIG. 21 is made of a metal mesh, since resistance of the metal mesh is relatively less than that of an ITO, induced current may easily flow by the magnetic field signal emitted from the stylus pen 500. The magnetic field signal output from the stylus pen 500 may be sensed by using the generation of the induced current, and the position (or position coordinates) of the stylus pen 500 disposed at a specific position on the touch sensor 10 may be detected. A specific position detection method will be described below with reference to the drawings.

Figure 22:
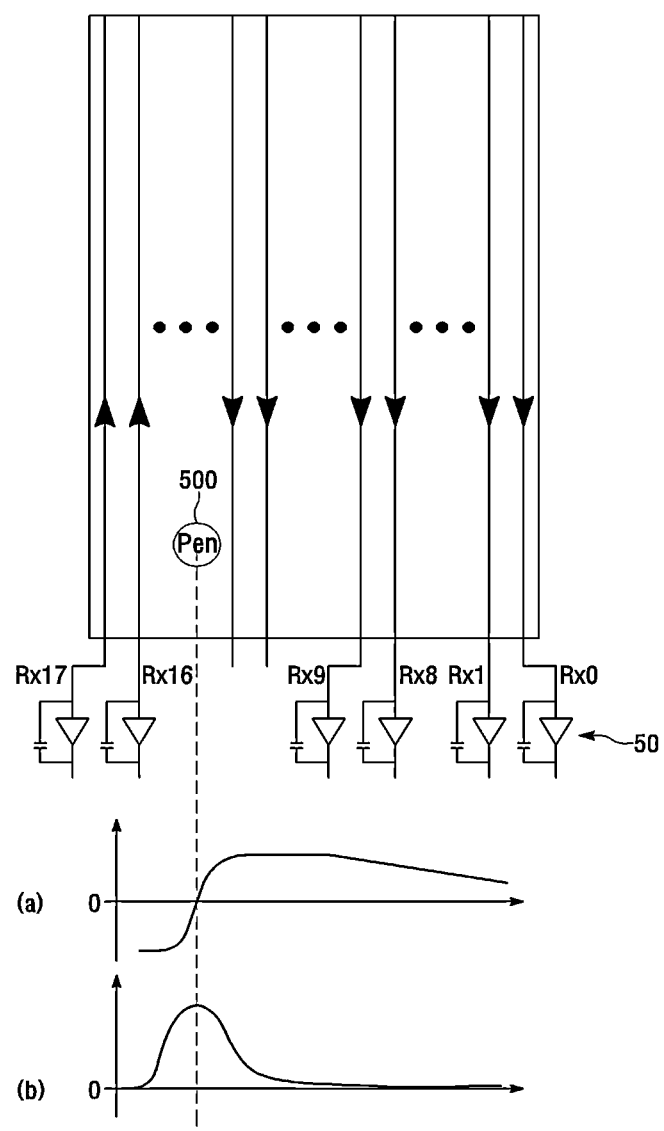
FIG. 22 is a schematic view for convenience of description of the touch sensor 10 of FIG. 21, i.e., a view for explaining a method for sensing a position of the stylus pen 500 on an X-axis using a magnetic signal output from the stylus fan 500.

FIG. 22 is a schematic view for convenience of description of the touch sensor 10 of FIG. 21, i.e., a view for explaining a method for sensing a position of the stylus pen 500 on an X-axis using a magnetic signal output from the stylus fan 500.

Referring to FIG. 22, a magnetic field is generated around the stylus pen 500 by driving the stylus pen 500. Current is induced in one direction (upward direction) to one or more receiving electrodes RX17 and RX16 disposed at a left side of the stylus pen 500 by the generated magnetic field, and current in a reverse direction (downward direction) of the one direction is induced to one or more receiving electrodes RX9, RX8, . . . , RX1, and RX0 disposed on a right side.

When the current signal output from each of the receiving electrodes RX0, RX1, . . . , RX16, and RX17 is input to an amplifier 50, the magnetic field signal of the stylus pen 500 is checked through the output of each amplifier 50, and as a result, if it is shown as a graph, the graph may be roughly shown as a graph (a). If a magnetic field signal in the graph (a) is differentiated, an approximate graph like a graph (b) is obtained. As shown in the graph (b), the magnetic field signal output from each amplifier 50 may be differentiated to determine a position at which the stylus pen 500 is disposed on an X-axis. For this, the touch input device 1 illustrated in FIG. 1 may include an amplifier 50 and a differentiator (not shown). The amplifier 50 and the differentiator (not shown) may be provided in the driving unit 11 of the touch input device 1.

Figure 23:
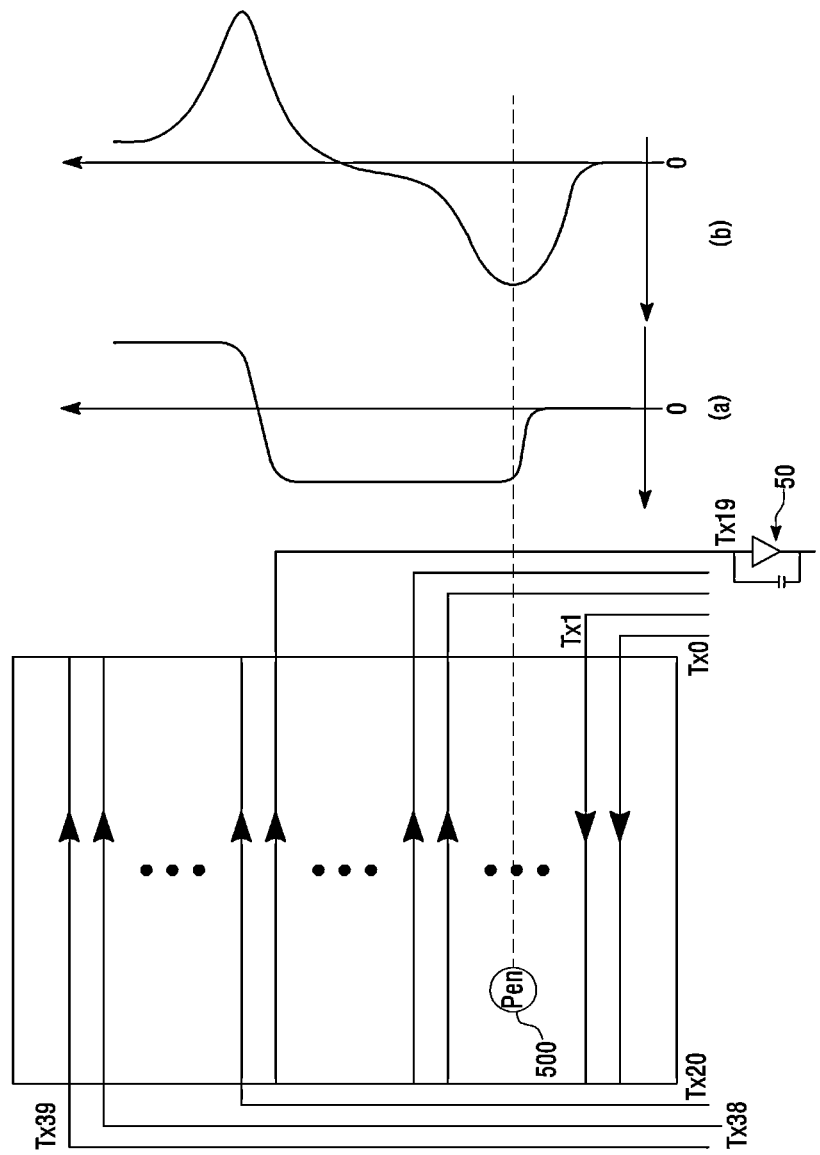
FIG. 23 is a schematic view for convenience of description of the touch sensor 10 of FIG. 21, i.e., a view for explaining a method for sensing a position of the stylus pen 500 on a Y-axis using the magnetic signal output from the stylus fan 500.

FIG. 23 is a schematic view for convenience of description of the touch sensor 10 of FIG. 21, i.e., a view for explaining a method for sensing a position of the stylus pen 500 on a Y-axis using the magnetic signal output from the stylus fan 500.

Referring to FIG. 23, a magnetic field is generated around the stylus pen 500 by driving the stylus pen 500. Current is induced in one direction (from a left side to a right side) to one or more driving electrodes TX19, TX20, . . . , TX38, and TX39 disposed above the stylus pen 500 by the generated magnetic field, and current in a reverse direction (from a right side to a left side) is induced to one or more of the driving electrodes TX1 and TX0 disposed below the stylus pen 500.

When the current signal output from each of the receiving electrodes TX0, TX1, . . . , TX38, and TX39 is input to an amplifier 50, the magnetic field signal of the stylus pen 500 is checked through the output of each amplifier 50, and as a result, if it is shown as a graph, the graph may be roughly shown as a graph (a). If a magnetic field signal in the graph (a) is differentiated, an approximate graph like a graph (b) is obtained. As shown in the graph (b), the magnetic field signal output from each amplifier 50 may be differentiated to determine a position at which the stylus pen 500 is disposed on a Y-axis. For this, the sensing unit 12 illustrated in FIG. 1 may include an amplifier 50 and a differentiator.

The control unit 13 illustrated in FIG. 1 may detect XY coordinates of the stylus pen 500 on the touch sensor 10 by using the method illustrated in FIGS. 22 and 23.

Referring to 21 again, a connection method between the plurality of driving electrodes TX0, TX1, . . . , TX38, and TX39 illustrated in FIG. 21 and first and second pads may be variously changed. For example, the half of the electrodes TX0, TX1, . . . , and TX19 of the plurality of driving electrodes TX0, TX1, . . . , TX38, and TX39 may be connected to the second pad by the conductive trace connected to the other end (left side) of both the ends, and the other half of the electrodes TX20, . . . TX38, and TX39 may be connected to the first pad by the conductive trace connected to one end (right side) of both the ends.

Figure 24:
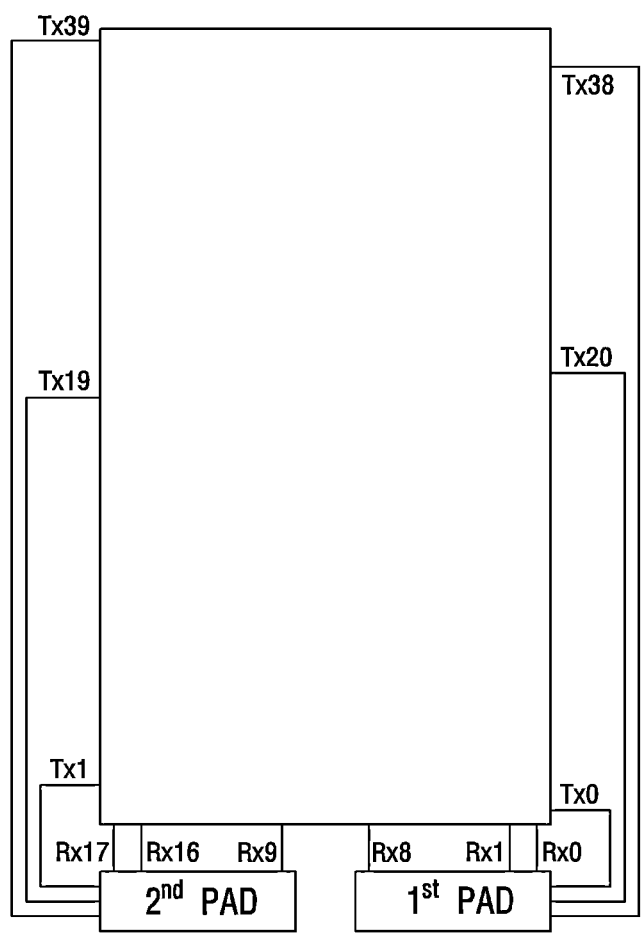
FIG. 24 is an exemplary view for explaining another method for connecting a plurality of driving electrodes TX0, TX1 . . . , TX38, and TX39 of FIG. 21 to first and second pads.

FIG. 24 is an exemplary view for explaining another method for connecting a plurality of driving electrodes TX0, TX1, . . . , TX38, and TX39 of FIG. 21 to first and second pads.

As illustrated in FIG. 24, the odd-numbered driving electrodes TX0, . . . , TX20, . . . , and TX38 from the bottom to the top may be connected to one end (right side) of both the ends by the conductive trace, and the even-numbered driving electrodes TX1, . . . , TX19, and TX39 from bottom to top may be connected to the second pad by the conductive trace connected to the other end (left side) of both the ends.

In addition to that illustrated in FIG. 24, the plurality of driving electrodes TX0, TX1, . . . , TX38, and TX39 may be connected to the first and second pads by the conductive traces in various manners.

Figure 25:
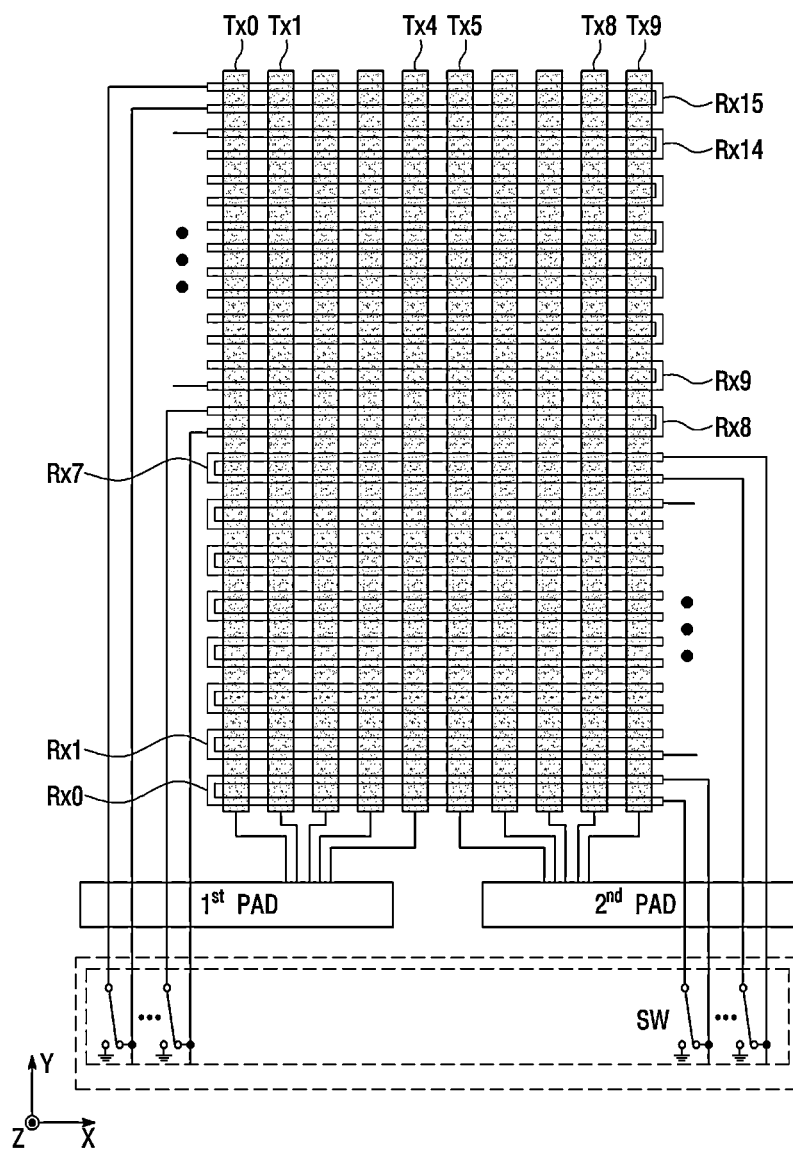
FIG. 25 is a view for explaining a touch sensor and a touch input device including the same according to further another embodiment of the present invention.

FIG. 25 is a view for explaining a touch sensor and a touch input device including the same according to further another embodiment of the present invention.

Referring to FIG. 25, a touch sensor according to further another embodiment of the present invention includes a plurality of first electrodes and a plurality of second electrodes. Hereinafter, it will be described that the plurality of first electrodes serve as a plurality of driving electrodes TX0, TX1, . . . , TX8, and TX9, and the plurality of second electrodes serve as a plurality of receiving electrodes RX0, RX1, . . . , RX14, and RX15. Although not shown in the drawing, on the contrary, the plurality of first electrodes may be the plurality of receiving electrodes RX0, RX1, . . . , RX14, and RX15, and the plurality of second electrodes may be the plurality of driving electrodes TX0, TX1, . . . , TX8, and TX9.

Each of the plurality of driving electrodes TX0, TX1, . . . , TX8, and TX9 may extend in one direction and have a bar shape. Here, each driving electrode may have a diamond shape or may have the same shape as the driving electrodes illustrated in FIGS. 14, 16 and 18. Among the plurality of driving electrodes TX0, TX1, . . . , TX8, and TX9, some driving electrodes TX0, . . . , and TX4 may be connected to the first pad (first PAD), and the remaining driving electrodes TX5, . . . , and TX9 may be connected to the second pad (second PAD). The plurality of driving electrodes TX0, TX1, . . . , TX8, and TX9 may receive a driving signal provided from the driving unit 13 illustrated in FIG. 1.

Each of the plurality of receiving electrodes RX0, RX1, . . . , RX14, and RX15 may have a '⊏' or 'U' shape. Each of the receiving electrodes has a shape extending in a direction perpendicular to one direction. The plurality of receiving electrodes RX0, RX1, . . . , RX14, and RX15 are disposed to cross the plurality of driving electrodes TX0, TX1, . . . , TX8, and TX9.

Among a plurality of receiving electrodes RX0, RX1, . . . , RX14, and RX15, both ends of some receiving electrodes RX0, . . . , and RX7 and both ends of the remaining receiving electrodes RX8, . . . , and RX15 may be disposed in directions opposite to each other. Here, although not shown in the drawing, both ends of the odd-numbered receiving electrodes and both ends of the even-numbered receiving electrodes among the plurality of receiving electrodes RX0, RX1, . . . , RX14, and RX15 may be disposed in directions opposite to each other.

Each of the receiving electrodes RX0, RX1, . . . , RX14, and RX15 may provide one conductive loop for driving the stylus pen. Both ends of each of the receiving electrodes RX0, RX1, . . . , RX14, and RX15 are connected to a switch SW by a conductive trace.

The switch SW electrically connects both the ends of each of the receiving electrodes by a first switching operation and connects one end of both the ends of each of the receiving electrodes to the ground by a second switching operation. Here, the first switching operation and the second switching operation of the switch SW may be controlled by the control unit 13 illustrated in FIG. 1.

When both the ends of each of the receiving electrodes are electrically connected by the first switching operation of the switch SW, each of the receiving electrodes may generate a capacitance with an adjacent driving electrode and output a signal including capacitance variation information due to the contact with the object.

On the other hand, one end of both the ends of each receiving electrode is connected to the ground by the second switching operation of the switch SW. Here, when a loop driving signal is applied to the other end of both the ends of each receiving electrode, one conductive loop is provided because each receiving electrode has a '⊏' or 'U' shape.

When the conductive loop is provided, when the stylus pen approaches or is in contact with the conductive loop, the stylus pen may be driven by a magnetic field caused by current flowing through the conductive loop.

The touch sensor illustrated in FIG. 25 and the touch input device including the same may detect the position of the stylus pen by detecting the signal output from the stylus pen, as illustrated in FIGS. 20, 22, and 23.

Figure 26:
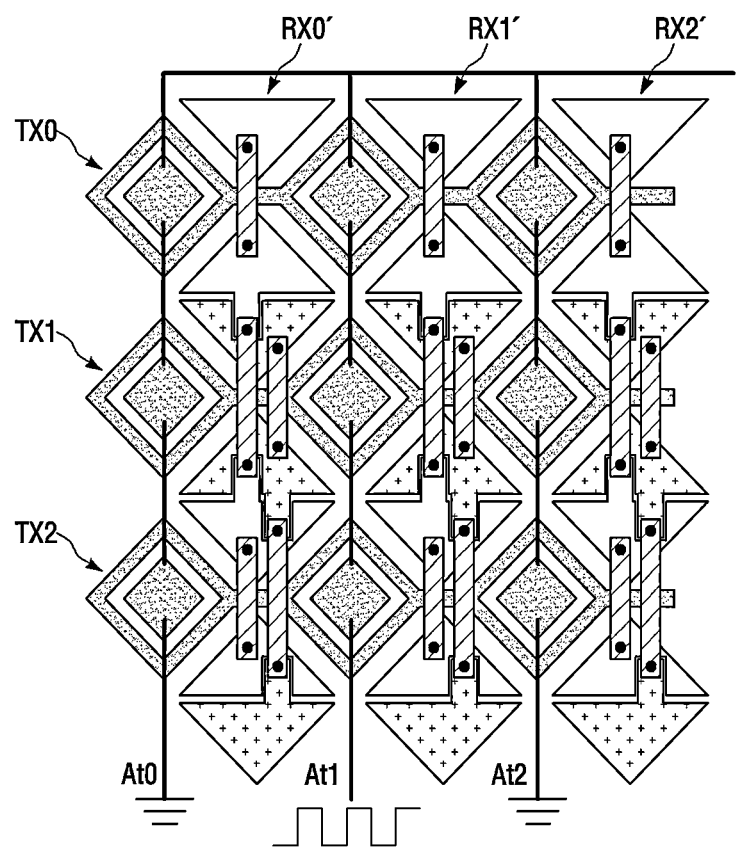
FIG. 26 is a partial plan view of a touch sensor according to further another embodiment of the present invention.
Figure 27:
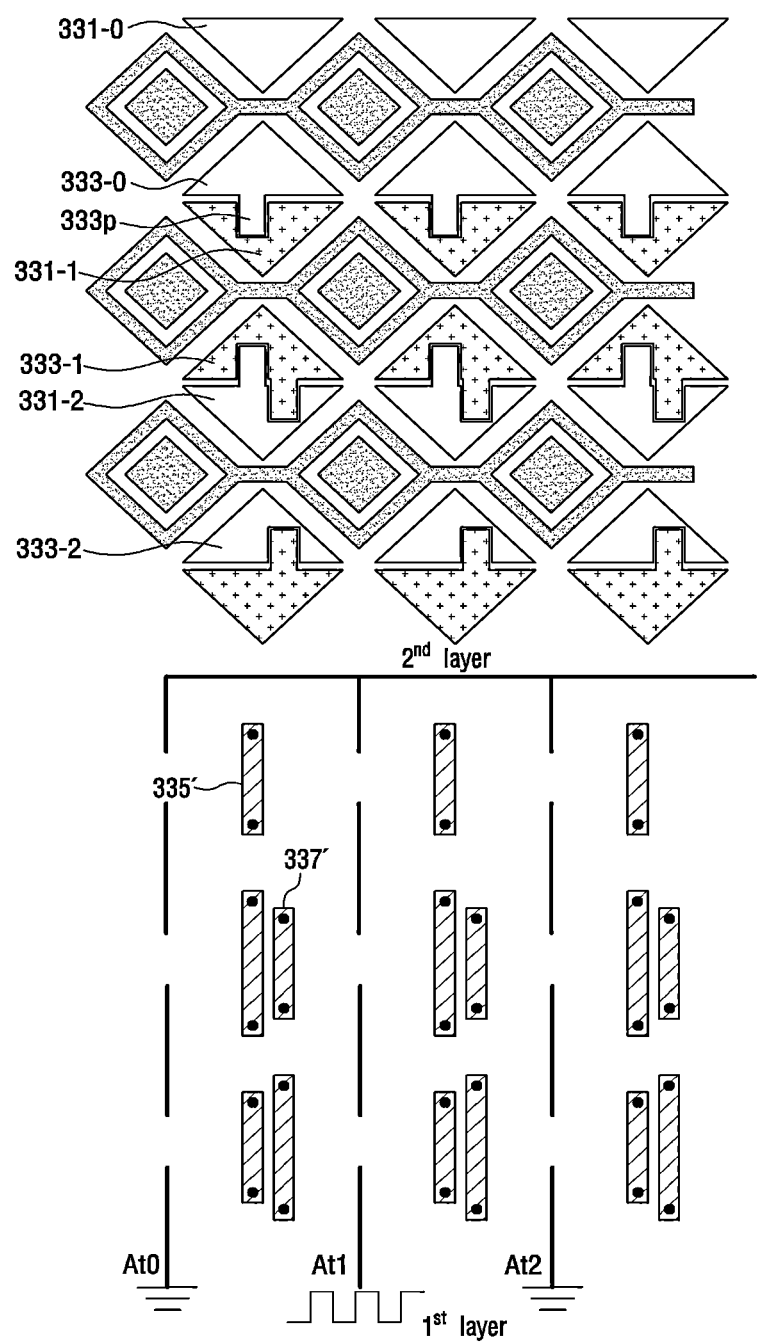
FIG. 27 is a plan view illustrating a state in which the touch sensor of FIG. 26 is divided into two layers.

FIG. 26 is a partial plan view of a touch sensor according to further another embodiment of the present invention, and FIG. 27 is a plan view illustrating a state in which the touch sensor of FIG. 26 is divided into two layers.

When compared with the touch sensors illustrated in FIGS. 18 and 19, in the touch sensor illustrated in FIGS. 26 and 27, a plurality of driving electrodes TX0, TX1, TX2, . . . are the same, but there is a difference in a plurality of receiving electrodes RX0', RX1', RX2', . . . . Therefore, hereinafter, the plurality of receiving electrodes RX0 ', RX1', RX2' . . . will be described in detail, and the descriptions of the plurality of driving electrodes TX0, TX1, TX2, . . . are replaced with the above-described contents. In addition, in the plurality of receiving electrodes RX0', RX1", RX2, . . . , descriptions of the same parts as the plurality of receiving electrodes RX0, RX1, RX2, . . . of the touch sensors illustrated in FIGS. 18 and 19 are replaced with the above-described contents.

When compared to the touch sensors illustrated in FIGS. 18 and 19, in the touch sensors illustrated in FIGS. 26 and 27, since a capacitance generated between the first and second receiving pattern parts disposed on different layers and a capacitance generated between the first and second connection patterns are reduced, there is an advantage in that a value of an RC time constant may be reduced.

Shapes of some of the first and second receiving pattern parts 331-1, 333-1, 331-2, 333-2, and 331-3 are different from those of the first and second receiving pattern parts 331 and 333 of the touch sensor illustrated in FIGS. 2 and 3.

The plurality of receiving electrodes RX0', RX1', RX2', . . . include a plurality of first receiving pattern parts 331-0, 331-1, 331-2, . . . and a plurality of second receiving pattern parts 331-0, 331-1, 331-2, . . . , and the plurality of second receiving pattern parts 333-0, 333-1, 333-2, . . . and the receiving pattern parts 333-0, 333-1, 333-2, . . . are alternately arranged in the second direction.

When one first receiving pattern part 331-0 and one second receiving pattern part 333-0 constitute one group, a plurality of groups may be arranged in the second direction.

One first receiving pattern part 331-1 of the plurality of first receiving pattern parts 331-0, 331-1, and 331-2 includes a recess pattern part corresponding to a protruding pattern part 333*p* of a second receiving pattern part 333-0 of another group adjacent to the group belonging to the one first receiving pattern part 331-1.

In addition, one second receiving pattern part 333-1 of the plurality of second receiving pattern parts 333-0, 333-1, and 333-2 includes a recess pattern part corresponding to a protruding pattern part of a first receiving pattern part 331-2 of another group adjacent to the group belonging to the one second receiving pattern part 333-1.

A minimum interval between the second receiving pattern part 333-0 of another group and the first receiving pattern part 331-2 of another group is shorter than a corresponding interval in the touch sensor illustrated in FIGS. 18 and 19 by the protruding pattern part 333*p* of the second receiving pattern part 333-0 of another group and the protruding pattern part of the first receiving pattern part 331-2 of another group. Therefore, a length of a first connection pattern 335' connecting the second receiving pattern part 333-0 of another group to the first receiving pattern part 331-2 of another group may be reduced, and furthermore, a capacitance generated between the first and second receiving pattern parts 331-1 and 333-1 that overlap each other, but are not electrically connected to each other may be reduced.

As illustrated in FIGS. 14 to 19, conductive patterns At0, At1, At2, . . . may be added to the touch sensors shown in FIGS. 26 and 27 and the touch input device including the same to drive the stylus pen 500. As illustrated in FIGS. 20, 22 and 23, a position of the stylus pen may be detected by detecting the signal output from the stylus pen.

Figure 28:
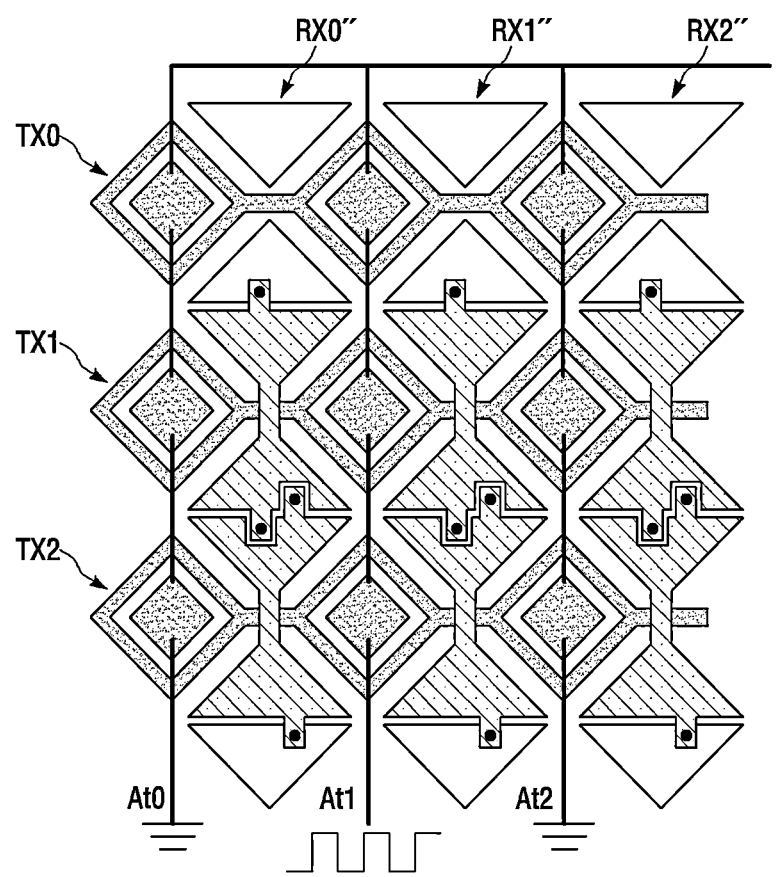
FIG. 28 is a plan view illustrating a portion of a touch sensor according to further another embodiment of the present invention.
Figure 29:
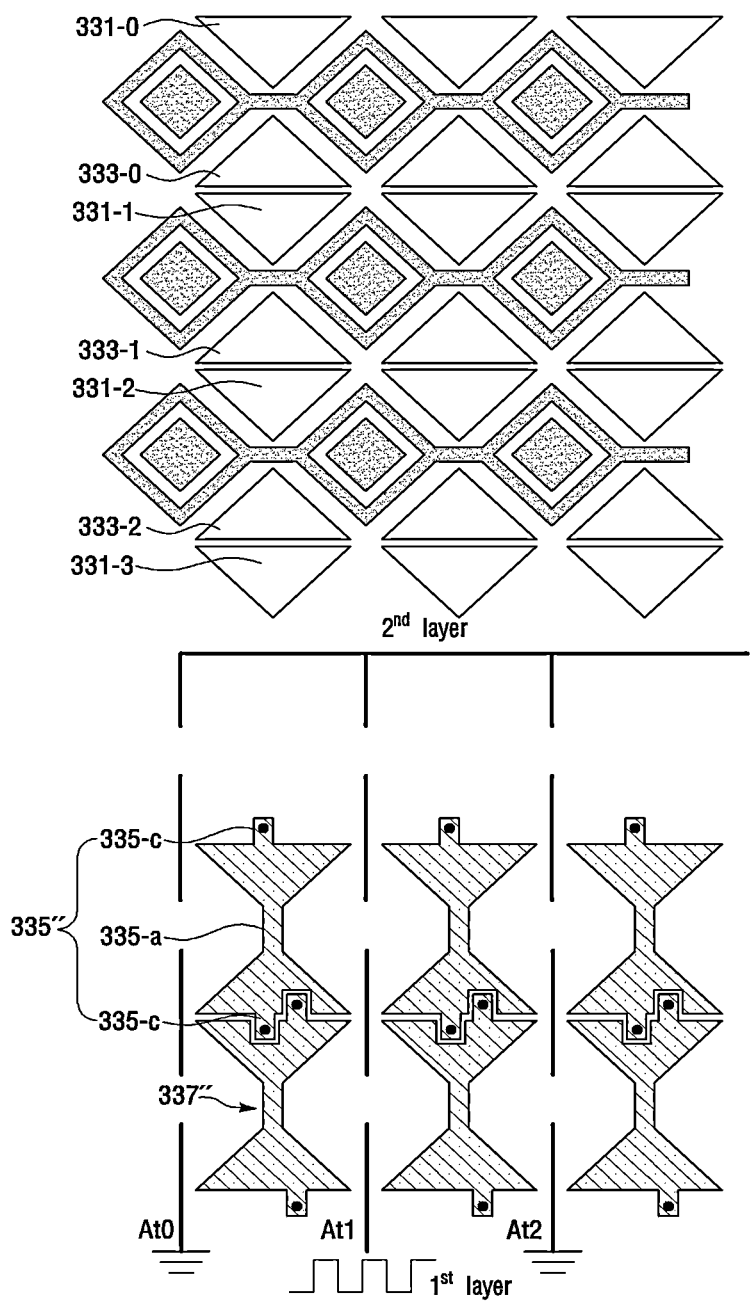
FIG. 29 is a plan view illustrating a state in which the touch sensor of FIG. 28 is divided into two layers.

FIG. 28 is a partial plan view of a touch sensor according to further another embodiment of the present invention, and FIG. 29 is a plan view illustrating a state in which the touch sensor of FIG. 28 is divided into two layers.

When compared with the touch sensors illustrated in FIGS. 18 and 19, in the touch sensor illustrated in FIGS. 28 and 29, a plurality of driving electrodes TX0, TX1, TX2, . . . are the same, but there is a difference in a plurality of receiving electrodes RX0", RX1", RX2", . . . . Therefore, hereinafter, the plurality of receiving electrodes RX0", RX1", RX2", . . . will be described in detail, and the descriptions of the plurality of driving electrodes TX0, TX1, TX2, . . . are replaced with the above-described contents. In addition, in the plurality of receiving electrodes RX0", RX1", RX2", . . . , descriptions of the same parts as the plurality of receiving electrodes RX0, RX1, RX2, . . . of the touch sensors illustrated in FIGS. 18 and 19 are replaced with the above-described contents.

Shapes and arrangement of the first and second receiving pattern parts 331-0, 333-0, 331-1, 333-1, 331-2, 333-2, and 331-3 are the same as the shapes and arrangement of the first and second receiving pattern parts 331 and 333 of each of the touch sensors illustrated in FIGS. 18 and 19.

When one first receiving pattern part 331-0 and one second receiving pattern part 333-0 constitute one group, a plurality of groups may be arranged in the second direction.

A first connection pattern 335" electrically connects odd-numbered groups of a plurality of groups and has a corresponding pattern 335-*a*, which is disposed at a position overlapping the first and second receiving pattern parts 331-1 and 333-1 of even-numbered groups, is not electrically connected to the first and second receiving pattern parts 331-1 and 333-1, and has a shape corresponding to that of each of the first and second receiving pattern parts 331-1 and 333-1 of even-numbered groups. In addition, the first connection pattern 335" may include an extension pattern 335-*c* extending from the corresponding pattern 335-*a* toward the first and second receiving pattern parts 331-0, 333-0, 331-2, and 333-2 of odd-numbered groups.

A second connection pattern 337" electrically connects even-numbered groups of a plurality of groups and has a corresponding pattern, which is disposed at a position overlapping the first and second receiving pattern parts 331-2 and 333-2 of the odd-numbered groups, is not electrically connected to the first and second receiving pattern parts 331-2 and 333-2, and has a shape corresponding to that of each of the first and second receiving pattern parts 331-1 and 333-1 of the odd-numbered groups. In addition, the second connection pattern 337" may include an extension pattern extending from the corresponding pattern toward the first and second receiving pattern parts 331-1, 333-1, and 331-3 of the even-numbered groups.

When compared to the touch sensors illustrated in FIGS. 28 and 29, each of the touch sensors illustrated in FIGS. 18 and 19 has an advantage in that a capacitance between the corresponding pattern 335-*a* and the first and second receiving pattern parts 331-1 and 331-2, which overlap the corresponding pattern 335-*a*, but are not electrically connected to each other, slightly increases, but resistance decreases because a cross-sectional area of the first connection pattern 335'' is widened.

As illustrated in FIGS. 14 to 19, conductive patterns At0, At1, At2, . . . may be added to the touch sensors shown in FIGS. 28 and 29 and the touch input device including the same to drive the stylus pen 500. As illustrated in FIGS. 20, 22 and 23, a position of the stylus pen may be detected by detecting the signal output from the stylus pen.

Figure 30:
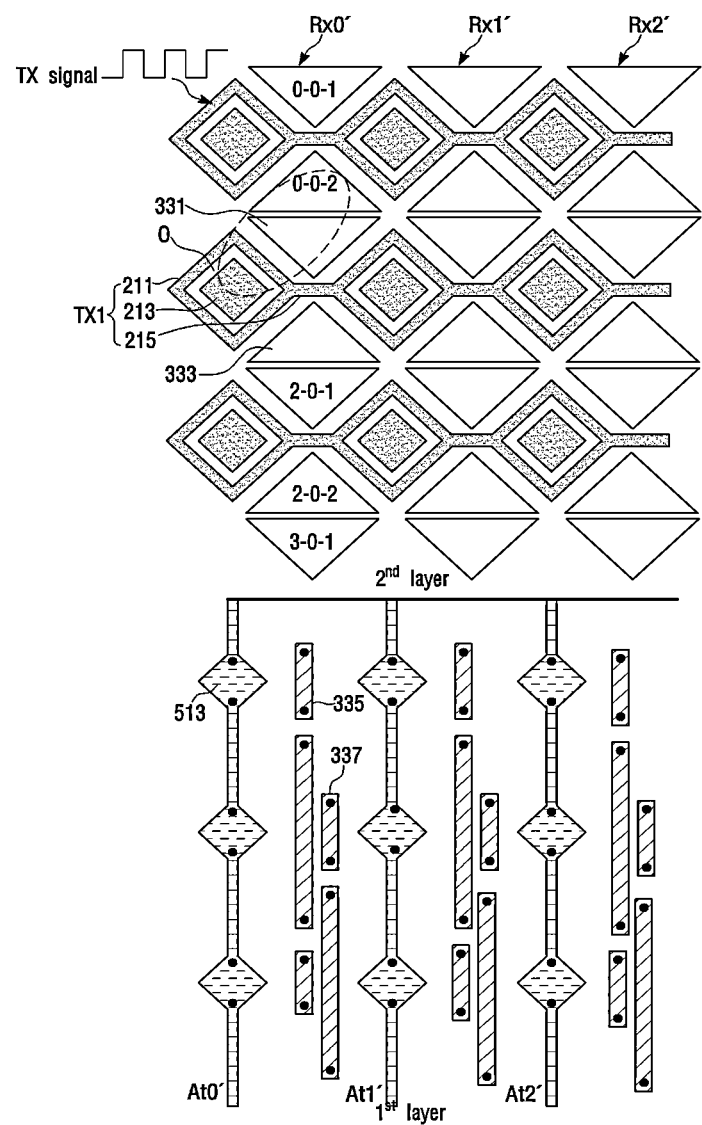
FIG. 30 is a plan view illustrating a modified example of the touch sensor of FIGS. 18 and 19, which is divided into two layers.

FIG. 30 is a plan view illustrating a modified example of the touch sensor of FIGS. 18 and 19, which is divided into two layers.

The touch sensor illustrated in FIG. 30 is different from the touch sensor illustrated in FIGS. 18 to 19 in a plurality of conductive patterns At0', At1', At2' . . . , and other components are the same. Therefore, hereinafter, the plurality of conductive patterns At0', At1', At2' . . . will be specifically described, and descriptions of other components will be omitted.

Each of the plurality of conductive patterns At0', At1', At2' . . . includes a plurality of pattern parts 513. The plurality of pattern parts 513 are disposed in the second direction in the corresponding conductive pattern At0' and disposed to overlap a driving dummy pattern parts 213 of a plurality of driving electrodes TX0, TX1, TX2, . . . . Here, the pattern part 513 may have a shape and size corresponding to that of the driving dummy pattern part 213 overlapping therewith, but is not limited thereto. For example, the pattern part 513 may have a shape different from that of the driving dummy pattern part 213 overlapping therewith and may also have a different size.

One pattern part 513 is electrically connected to the driving dummy pattern part 213 overlapping therewith through a conductive via. Thus, the driving dummy pattern part 213 overlapping one pattern part 513 is connected to the corresponding conductive pattern At0' in parallel. Since one pattern part 513 and the driving dummy pattern part 213 overlapping the pattern part 513 are connected in parallel, resistance of the corresponding conductive pattern At0' may be reduced.

The plurality of conductive patterns At0', At1', At2' . . . illustrated in FIG. 30 may be applied to the touch sensors illustrated in FIGS. 14, 16, 26, and 28 as they are.

Figure 31:
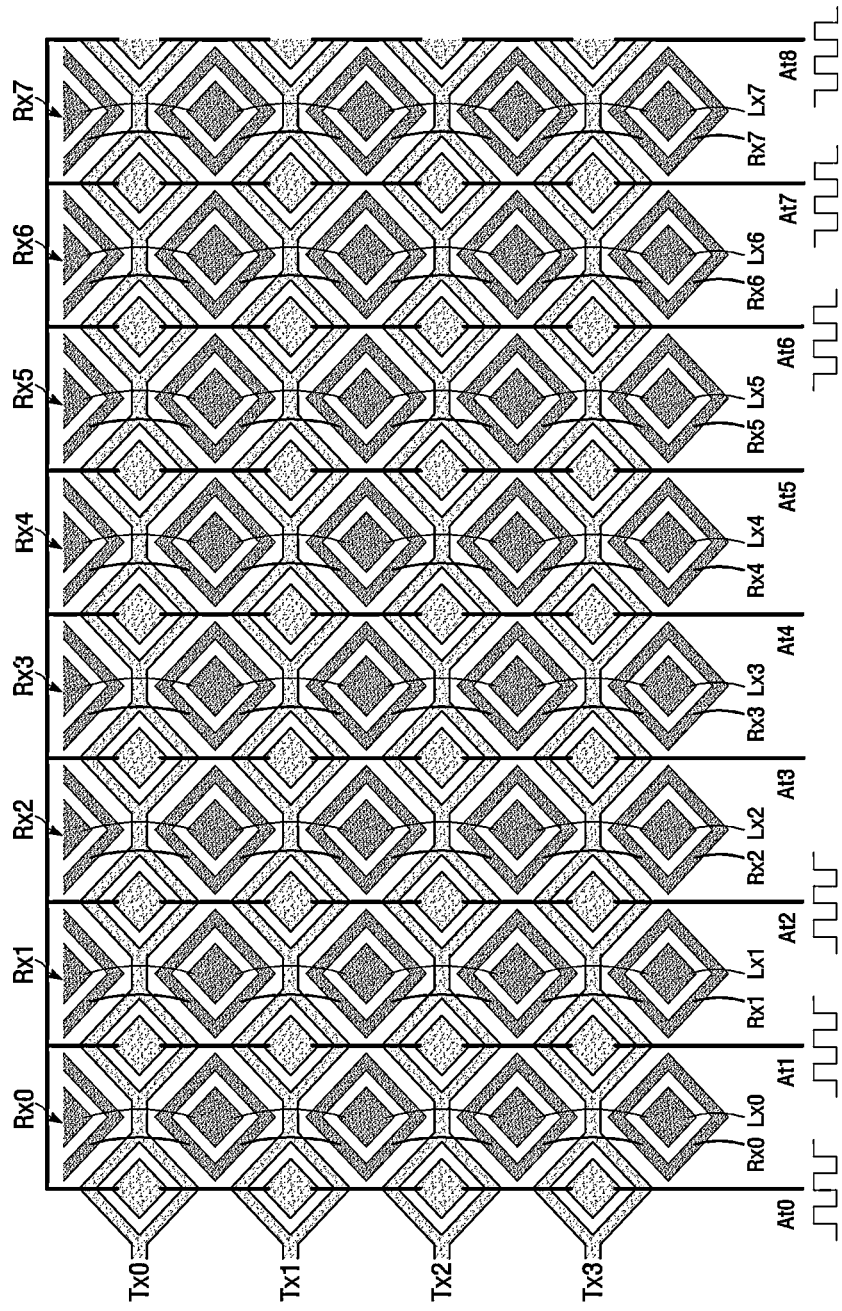
FIG. 31 is a view illustrating a modified example of the touch sensor of FIG. 16, i.e., a view for explaining a method for applying a loop driving signal to a plurality of conductive patterns.

FIG. 31 is a view illustrating a modified example of the touch sensor of FIG. 16, i.e., a view for explaining a method for applying a loop driving signal to a plurality of conductive patterns.

Referring to FIG. 31, a loop driving signal applied to each of the plurality of conductive patterns At0, At1, . . . , At7, and At8 may be controlled according to a position of a stylus pen (not shown).

For example, in FIG. 31, it is assumed that the stylus pen (not shown) is disposed on the fourth conductive pattern At4. A first loop driving signal is applied to at least one or more conductive patterns At0, At1, and At2 of the plurality of conductive patterns At0, At1, At2, and At3 disposed at one side of a point at which the stylus pen is disposed, and a second loop driving signal having a phase opposite to that of the first loop driving signal is applied to at least one or more conductive patterns At6, At7, and At8 of the plurality of conductive patterns At5, At6, At7, and At8 disposed at the other side of the point. Here, if there are conductive patterns At3, At4, and At5 to which the first and second loop driving signals are not applied, the corresponding conductive patterns At3, At4, and At5 may be floated.

The number of one or more conductive patterns At0, At1, and At2 to which the first loop driving signal is applied may be one or more, and as the number increases, strength of a magnetic field for driving the stylus pen increases, but power consumption increases. As a result, it is preferable to apply the first loop driving signal to an optimal number of conductive patterns.

The number of one or more conductive patterns At6, At7, and At8 to which the second loop driving signal is applied may be one or more, and as the number increases, strength of a magnetic field for driving the stylus pen increases, but power consumption increases. As a result, it is preferable to apply the first loop driving signal to an optimal number of conductive patterns.

One or more conductive patterns At0, At1, and At2 to which the first loop driving signal is applied and one or more conductive patterns At6, At7, and At8 to which the second loop driving signal is applied may be symmetrical based on the position of the stylus pen. For example, as illustrated in FIG. 31, when the stylus pen (not shown) is disposed on the fourth conductive pattern At4, one or more conductive patterns At0, At1, and At2 to which the first loop driving signal is applied based on the fourth conductive pattern At4, and one or more conductive patterns At6, At7, and At8 to which the second loop driving signal is applied are symmetrical to each other.

The method of applying the loop driving signal illustrated in FIG. 31 may be applied to the touch sensors of FIGS. 18, 25, 26, 28, and 30 and the touch input device including the same.

Figure 32:
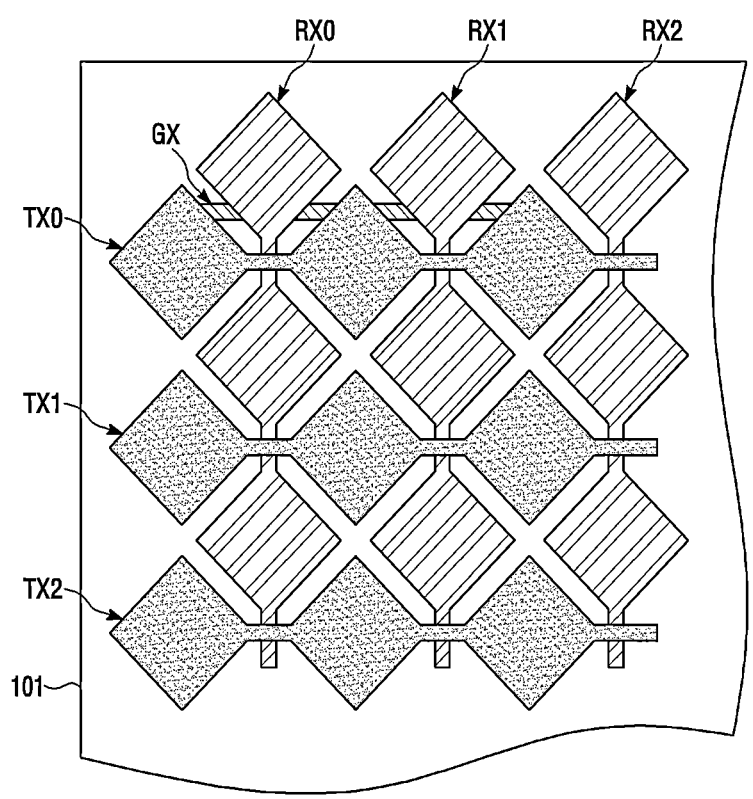
FIG. 32 is a partial plan view of the touch sensor 10 of FIG. 1 according to further another embodiment.
Figure 33:
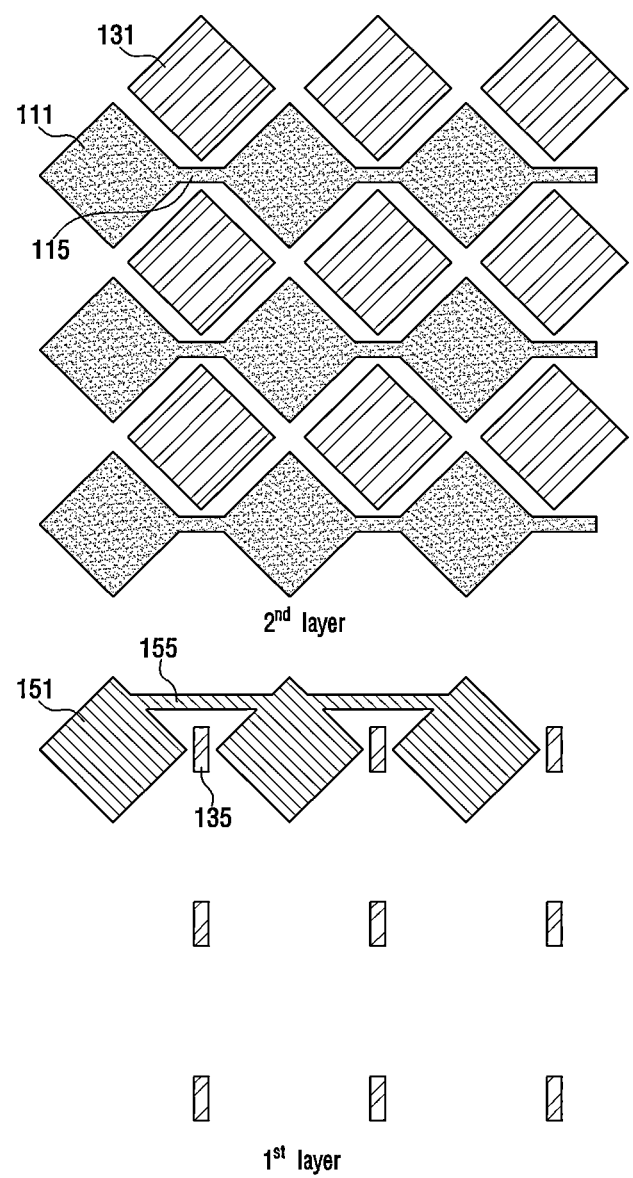
FIG. 33 is a plan view illustrating a state in which the touch sensor of FIG. 32 is divided into two layers.

FIG. 32 is a partial plan view of the touch sensor 10 of FIG. 1 according to further another embodiment, and FIG. 33 is a plan view illustrating a state in which the touch sensor of FIG. 32 is divided into two layers:

Referring to FIG. 32, a touch sensor according to further another embodiment of the present invention may be disposed in an active area 101 of a touch input device. The active area 101 may be an area on which a touch is input and may be an area corresponding to a display area of a display panel provided in a touch input device.

The touch sensor includes a plurality of first electrodes, a guard electrode GX, and a plurality of second electrodes. Here, the plurality of first electrodes may be any one of the plurality of driving electrodes TX0, TX1, TX2, . . . and the plurality of receiving electrodes RX0, RX1, RX2, . . . , and the plurality of second electrodes may be the other one. In FIGS. 32 and 33, the plurality of first electrodes are used as the plurality of driving electrodes TX0, TX1, TX2, . . . , and the plurality of second electrodes are used as the plurality of receiving electrodes RX0, RX1, RX2, . . . , but are not limited thereto, and conversely, the plurality of first electrodes may be the plurality of receiving electrodes RX0, RX1, RX2, . . . , and the plurality of second electrodes may be the plurality of driving electrodes TX0, TX1, TX2, . . . .

The plurality of driving electrodes TX0, TX1, TX2, . . . have a shape extending in a first direction, and the plurality of receiving electrodes RX0, RX1, RX2, . . . have a shape in a second direction perpendicular to the first direction.

A predetermined capacitance is disposed between the plurality of driving electrodes TX0, TX1, TX2, . . . and the plurality of receiving electrodes RX0, RX1, RX2, . . . , particularly at their intersections. The capacitance varies when a touch input occurs at or around a corresponding point. Thus, a capacitance variation may be detected from signals output from the plurality of receiving electrodes RX0, RX1, RX2, . . . to detect whether the touch occurs and the touch input.

Each of the plurality of driving electrodes TX0, TX1, TX2, . . . includes a driving pattern part 111 and a connection pattern 115 as illustrated in FIG. 33. The plurality of driving pattern parts 111 are arranged in the first direction, and the connection pattern 115 is disposed between two adjacent driving pattern parts 111.

The driving pattern part 111 may have a diamond shape or a rhombus shape. Although the driving pattern part 111 is illustrated in the diamond or rhombus shape in the drawing, this is only an example, and for example, the driving pattern part 111 may have a polygonal or rectangular shape.

The connection pattern 315 has one end connected to the driving pattern part 111 disposed at one side and the other end connected to the first pattern part disposed at the other side. The connection pattern 115 may have a bar shape, but is not limited thereto.

The plurality of driving pattern parts 311 and the plurality of connection patterns 115 are disposed together on the same layer (the second layer in FIG. 33). The plurality of driving pattern parts 311 and the plurality of connection patterns 115 may be made of the same material. For example, each of the plurality of driving pattern parts 311 and the plurality of connection patterns 115 may be made of a metal mesh. The metal mesh may be patterned according to the shapes of the plurality of driving pattern parts 311 and the plurality of connection patterns 115 to provide the plurality of driving electrodes TX0, TX1, TX2, . . . .

Each of the plurality of receiving electrodes RX0, RX1, RX2, . . . includes a receiving pattern part 131 and a connection pattern 135 as illustrated in FIG. 33. The plurality of receiving pattern parts 131 are arranged in the second direction, and the connection pattern 135 is disposed between two adjacent receiving pattern parts 131.

The receiving pattern part 131 may have a diamond shape or a rhombus shape. Although the receiving pattern part 131 is illustrated in the diamond or rhombus shape in the drawing, this is only an example, and for example, the receiving pattern part 131 may have a polygonal or rectangular shape.

The connection pattern 135 may be disposed on a layer (first layer) other than the layer (second layer) on which the receiving pattern part 131 is disposed. One end of the connection pattern 135 may be connected to the receiving pattern part 111 disposed at one side through a conductive via, and the other end may be connected to the receiving pattern part disposed at the other side through a conductive via. The connection pattern 115 may have a bar shape, but is not limited thereto.

The plurality of receiving pattern parts 131 and the plurality of connection patterns 135 are disposed on different layers. The plurality of receiving pattern parts 131 are disposed together on the same layer as the plurality of driving electrodes TX0, TX1, TX2, . . . . The plurality of receiving pattern parts 131 may be made of a metal mesh together with the plurality of driving electrodes TX0, TX1, TX2, . . . .

The guard electrode GX is disposed to overlap at least a portion of the plurality of driving electrodes TX0, TX1, TX2, . . . . For example, the guard electrode GX may be disposed to overlap a driving electrode adjacent to an edge of the active area 101.

As illustrated in FIG. 33, the guard electrode GX may be disposed on a layer (first layer) different from a layer (second layer) on which the plurality of driving electrodes TX0, TX1, TX2, . . . are disposed. Here, the other layer (first layer) may be disposed below the layer (second layer) on which the plurality of driving electrodes TX0, TX1, TX2, . . . are disposed.

The guard electrode GX includes a plurality of guard pattern parts 151 disposed to overlap the driving pattern parts 111 of some of the driving electrodes TX0 and also include a connection pattern 155 connecting the plurality of guard pattern parts 151 to each other.

The guard pattern part 151 and the connection pattern 155 may be disposed together on the same layer (first layer) as the connection pattern 135 of the receiving electrodes RX0, RX1, . . . . Therefore, the connection pattern 135 of the guard pattern part 151 and the connection pattern 155, and the receiving electrodes RX0, RX1, . . . may be made of a metal mesh together. As described above, the guard electrode GX may be formed on an unused area in the layer (first layer) in which some components (connection pattern 135) of the plurality of receiving electrodes RX0, RX1, . . . are disposed. Therefore, there is no need to provide a separate layer for the guard electrode GX, and when some components (connection pattern 135) of the plurality of receiving electrodes RX0, RX1, . . . are manufactured using the metal mesh, since the guard electrode GX is also manufactured, manufacturing cost may be reduced, and the touch input device may be miniaturized.

The guard pattern part 151 may have a shape corresponding to the driving pattern part 111. For example, the guard pattern part 151 may have a diamond or rhombus shape. However, it is not limited thereto, and the guard pattern part 151 may have any shape as long as it is capable of covering the driving pattern part 111.

A touch sensor and a touch input device including the touch sensor according to further another embodiment of the present invention may sense a hovering touch or a proximity touch using the guard electrode GX.

The touch sensor and the touch input device including the touch sensor according to further another embodiment of the present invention may operate in a touch sensing mode or a hover sensing mode. The touch sensing mode and the hovering sensing mode have a time period in which each mode operates.

The hovering sensing mode may be a mode in which proximity of an object is sensed by sensing a change in capacitance (self-capacitance) of the plurality of driving electrodes TX0, TX1, . . . . In this hovering sensing mode, a driving signal applied to the plurality of driving electrodes TX0, TX1, . . . is applied to the guard electrode GX as well. The driving unit 12 illustrated in FIG. 1 may simultaneously apply the same driving signal to the plurality of driving electrodes TX0, TX1, . . . and the guard electrode GX.

When the driving signal is simultaneously applied to the plurality of driving electrodes TX0, TX1, . . . and the guard electrode GX, the driving unit 12 may receive a signal including capacitance variation information due to the proximity of the object from the plurality of driving electrodes TX0, TX1, . . . and detect the capacitance variation information due to the proximity of the object to transmit the capacitance variation information to the control unit 13. The control unit 13 may sense whether the object is approaching based on the received capacitance variation information due to the proximity of the object.

When the driving signal is simultaneously applied to the plurality of driving electrodes TX0, TX1, . . . and the guard electrode GX, the guard electrode GX has equipotentiality with the corresponding driving electrode TX0 disposed to overlap itself, the capacitance is not generated between the driving electrode TX0 and the guard electrode GX. In addition, the guard electrode GX may block the formation of the capacitance between the corresponding driving electrode TX0 and the ground of the touch input device disposed under the guard electrode GX.

When there is no guard electrode GX, a self-capacitance value between the plurality of driving electrodes TX0, TX1, . . . and the ground of the touch input device is relatively larger than the self-capacitance value between objects that is close to the plurality of driving electrodes TX0, TX1, . . . . Therefore, it is difficult to sense a change in self-capacitance value between the plurality of driving electrodes TX0, TX1, . . . and the adjacent object. However, as in further another embodiment of the present invention, the guard electrode GX is disposed to overlap some of the driving electrodes TX0 of the plurality of driving electrodes, and since the same driving signal is applied to the guard electrode GX and the driving electrode TX0, which overlap each other, the corresponding driving electrode TX0 is blocked from the ground of the touch input device and the formation of the capacitance. Thus, since the signal output from the corresponding driving electrode TX0 includes only capacitance variation information with the approaching object, the control unit 13 illustrated in FIG. 1 may sense whether the object is approaching from the signal.

Alternatively, the hovering sensing mode may be a mode for sensing proximity of the object by sensing a change in mutual capacitance between the guard electrode GX and the driving electrode TX0. In the hovering sensing mode, the driving signal may be applied to the guard electrode GX, and the signal including mutual capacitance variation information may be output from the driving electrode TX0. The driving unit 12 may receive a signal including capacitance variation information due to the proximity of the object from the plurality of driving electrodes TX0, TX1, . . . and detect the capacitance variation information due to the proximity of the object to transmit the capacitance variation information to the control unit 13. The control unit 13 may sense whether the object is approaching based on the received capacitance variation information due to the proximity of the object.

As in further another embodiment of the present invention, the guard electrode GX is disposed to overlap some of the driving electrodes TX0 of the plurality of driving electrodes, and since the driving signal is applied to the guard electrodes GX, which overlap each other, the corresponding driving electrode TX0 is blocked from the ground of the touch input device and the formation of the capacitance. Thus, since the signal output from the corresponding driving electrode TX0 includes only capacitance variation information with the approaching object, the control unit 13 illustrated in FIG. 1 may sense whether the object is approaching from the signal.

Figure 34:
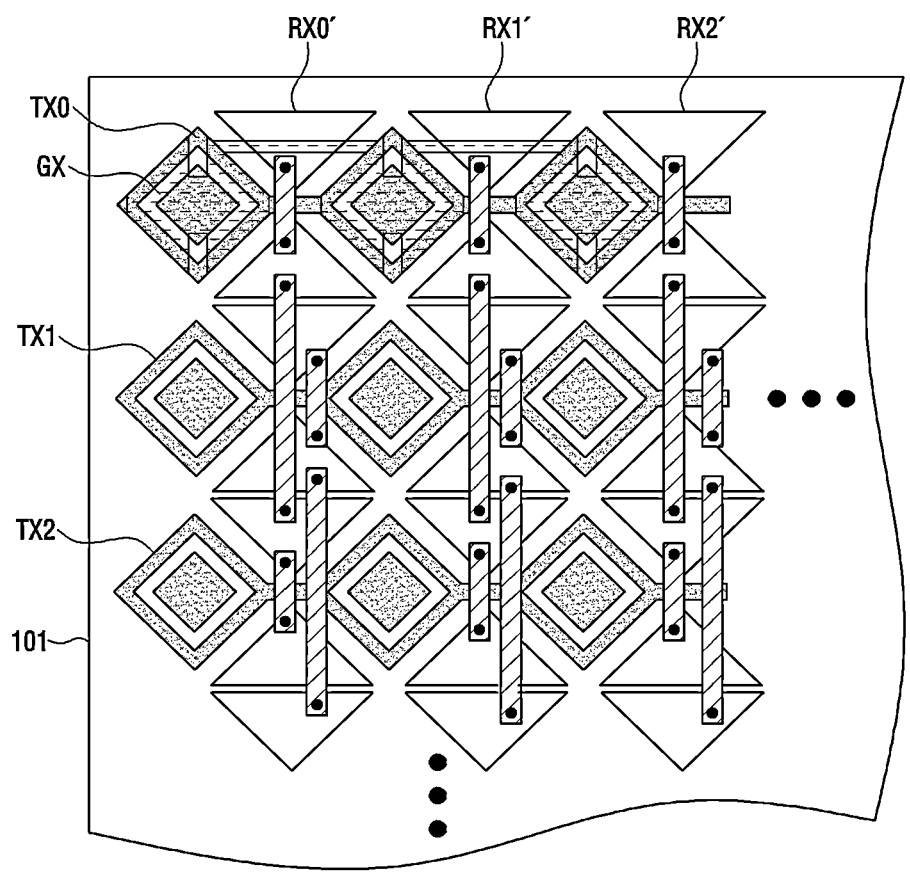
FIG. 34 is a partial plan view of a touch sensor according to further another embodiment of the present invention.
Figure 35:
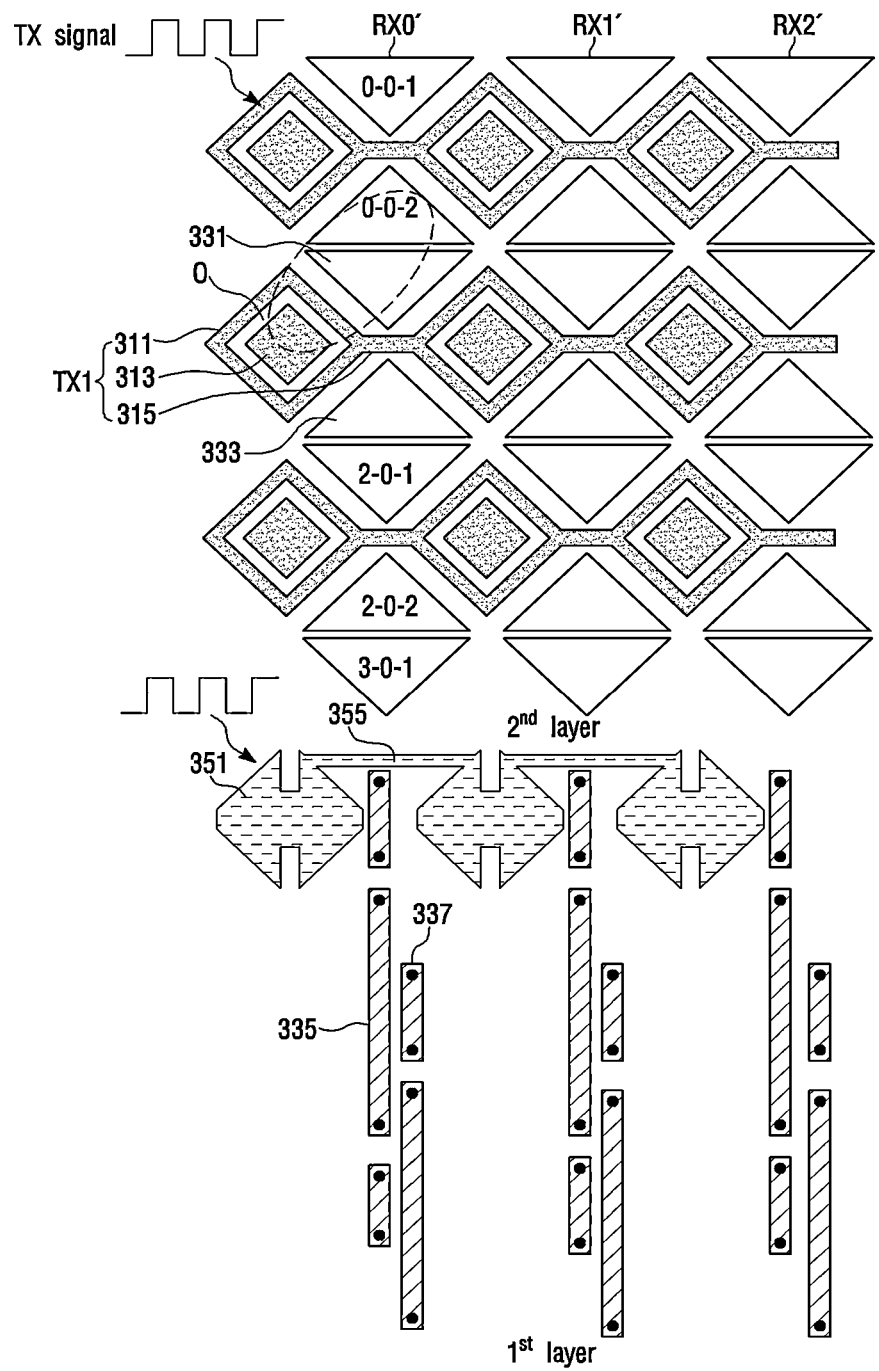
FIG. 35 is a plan view illustrating a state in which the touch sensor of FIG. 34 is divided into two layers.

FIG. 34 is a partial plan view of a touch sensor according to further another embodiment of the present invention, and FIG. 35 is a plan view illustrating a state in which the touch sensor of FIG. 34 is divided into two layers.

Referring to FIG. 34, a touch sensor according to further another embodiment of the present invention may be disposed in an active area 101 of a touch input device. The active area 101 may be an area on which a touch is input and may be an area corresponding to a display area of a display panel provided in a touch input device.

The touch sensor includes a plurality of driving electrodes TX0, TX1, TX2, . . . , one or more guard electrodes GX, and a plurality of receiving electrodes RX0', RX1', RX2', . . . .

The plurality of driving electrodes TX0, TX1, TX2, . . . have a shape extending in a first direction, and the plurality of receiving electrodes RX0', RX1'', RX2', . . . have a shape in a second direction perpendicular to the first direction.

A predetermined capacitance is disposed between the plurality of driving electrodes TX0, TX1, TX2, . . . and the plurality of receiving electrodes RX0', RX1', RX2', . . . , particularly at their intersections. The capacitance varies when a touch input occurs at or around a corresponding point. Thus, a capacitance variation may be detected from signals output from the plurality of receiving electrodes RX0'', RX1', RX2, . . . to detect whether the touch occurs and the touch input.

The plurality of driving electrodes TX0, TX1, TX2, . . . illustrated in FIG. 34 may include a driving pattern part 311, a dummy pattern part 313, and a connection pattern 315 as illustrated in FIG. 35. Here, the dummy pattern part 313 may be an additional component and thus may be omitted. When there is no dummy pattern part 313, each of the plurality of driving electrodes TX0, TX1, TX2, . . . may be constituted by the driving pattern part 311 and the connection pattern 315.

The driving pattern part 311 has a diamond shape or a rhombus shape and has an opening O with the inside opened. The opening O has a diamond shape or a rhombus shape corresponding to an external shape of the driving pattern part 311. Due to the opening O, the driving pattern part 311 may have a diamond or rhombus band shape.

Although the driving pattern part 311 is illustrated in the diamond or rhombus shape in the drawing, this is only an example, and for example, the driving pattern part 311 may have a polygonal or rectangular shape.

The dummy pattern part 313 is disposed in the opening O of the driving pattern part 311.

The dummy pattern part 313 has a diamond shape or a rhombus shape. An external shape of the dummy pattern part 313 has a shape corresponding to that of the driving pattern part 311. Unlike the driving pattern part 311, the dummy pattern part 313 may not have an opening defined therein.

The driving pattern part 311 and the dummy pattern part 313 are spaced a predetermined distance from each other so that the driving pattern part 311 and the dummy pattern part 313 are electrically insulated from each other.

The driving pattern part 311 in which the dummy pattern part 313 is disposed is provided in plurality, which are arranged in the first direction (or horizontal direction). The connection pattern 315 disposed between the plurality of driving pattern parts 311 electrically connects the driving pattern parts 311 to each other.

The connection pattern 315 connects two adjacent driving pattern parts 311 to each other. The connection pattern 315 has one end connected to the driving pattern part 311 disposed at one side and the other end connected to the first pattern part disposed at the other side. The connection pattern 315 may have a bar shape, but is not limited thereto.

The plurality of driving pattern parts 311, the plurality of dummy pattern parts 313, and the plurality of connection patterns 315 are disposed together on the same layer (the second layer in FIG. 35). The plurality of driving pattern parts 311, the plurality of dummy pattern parts 313, and the plurality of connection patterns 315 may be made of the same material. For example, each of the plurality of driving pattern parts 311, the plurality of dummy pattern parts 313, and the plurality of connection patterns 315 may be made of a metal mesh. The metal mesh may be patterned according to the shapes of the plurality of driving pattern parts 311, the plurality of dummy pattern parts 313, and the plurality of connection patterns 315 to provide the plurality of driving electrodes TX0, TX1, TX2, . . . .

In FIGS. 34 and 35, the dummy pattern part 313 is disposed in the opening O inside the driving pattern part 311, but each driving electrode according to the present invention is not limited thereto. For example, the driving pattern part 311 and the dummy pattern part 313 may have shapes other than the diamond or rhombus shape. The driving pattern part 311 and the dummy pattern part 313 may be combined with each other in various shapes to provide the driving electrode. The guard electrode GX illustrated in FIGS. 34 and 35 is disposed to overlap at least a portion of the plurality of driving electrodes TX0, TX1, TX2, . . . .

As illustrated in FIG. 35, the guard electrode GX may be disposed on a layer (first layer) different from a layer (second layer) on which the plurality of driving electrodes TX0, TX1, TX2, . . . are disposed. Here, the other layer (first layer) may be disposed below the layer (second layer) on which the plurality of driving electrodes TX0, TX1, TX2, . . . are disposed.

The guard electrode GX may be disposed to overlap some of the driving electrodes TX0 of the plurality of driving electrodes TX0, TX1, TX2, . . . . For example, the guard electrode GX may be disposed to overlap a driving electrode adjacent to an edge of the active area 101.

The guard electrode GX includes a plurality of guard pattern parts 351 disposed to overlap the driving pattern parts 311 of some of the driving electrodes TX0 and also include a connection pattern 355 connecting the plurality of guard pattern parts 351 to each other.

The guard pattern part 351 and the connection pattern 355 may be disposed together on the same layer (first layer) as the first and second connection patterns 335 and 337 of the receiving electrodes RX0, RX1, . . . .

The guard pattern part 351 may have a shape corresponding to the driving pattern part 311. For example, the guard pattern part 151 may have a diamond or rhombus shape. However, it is not limited thereto, and the guard pattern part 351 may have any shape as long as it is capable of covering the driving pattern part 311.

A touch sensor and a touch input device including the touch sensor according to further another embodiment of the present invention may sense a hovering touch or a proximity touch using the guard electrode GX.

The touch sensor and the touch input device including the touch sensor according to further another embodiment of the present invention may operate in a touch sensing mode or a hover sensing mode. The touch sensing mode and the hovering sensing mode have a time period in which each mode operates.

The hovering sensing mode is a mode in which proximity of an object is sensed by sensing a change in capacitance (self-capacitance) of the plurality of driving electrodes TX0, TX1, . . . . In the hovering sensing mode, a driving signal applied to the plurality of driving electrodes TX0, TX1, . . . is applied to the guard electrode GX as well. The driving unit 12 illustrated in FIG. 1 may simultaneously apply the same driving signal to the plurality of driving electrodes TX0, TX1, . . . and the guard electrode GX.

When the driving signal is simultaneously applied to the plurality of driving electrodes TX0, TX1, . . . and the guard electrode GX, the driving unit 12 may receive a signal including capacitance variation information due to the proximity of the object from the plurality of driving electrodes TX0, TX1, . . . and detect the capacitance variation information due to the proximity of the object to transmit the capacitance variation information to the control unit 13. The control unit 13 may sense whether the object is approaching based on the received capacitance variation information due to the proximity of the object.

When the driving signal is simultaneously applied to the plurality of driving electrodes TX0, TX1, . . . and the guard electrode GX, the guard electrode GX has equipotentiality with the corresponding driving electrode TX0 disposed to overlap itself, the capacitance is not generated between the driving electrode TX0 and the guard electrode GX. In addition, the guard electrode GX may block the formation of the capacitance between the corresponding driving electrode TX0 and the ground of the touch input device disposed under the guard electrode GX.

When there is no guard electrode GX, a self-capacitance value between the plurality of driving electrodes TX0, TX1, . . . and the ground of the touch input device is relatively larger than the self-capacitance value between objects that is close to the plurality of driving electrodes TX0, TX1, . . . . Therefore, it is difficult to sense a change in self-capacitance value between the plurality of driving electrodes TX0, TX1, . . . and the adjacent object. However, as in another embodiment of the present invention, the guard electrode GX is disposed to overlap some of the driving electrodes TX0 of the plurality of driving electrodes, and since the same driving signal is applied to the guard electrode GX and the driving electrode TX0, which overlap each other, the corresponding driving electrode TX0 is blocked from the ground of the touch input device and the formation of the capacitance. Thus, since the signal output from the corresponding driving electrode TX0 includes only capacitance variation information with the approaching object, the control unit 13 illustrated in FIG. 1 may sense whether the object is approaching from the signal.

Alternatively, the hovering sensing mode may be a mode for sensing proximity of the object by sensing a change in mutual capacitance between the guard electrode GX and the driving electrode TX0. In the hovering sensing mode, the driving signal may be applied to the guard electrode GX, and the signal including mutual capacitance variation information may be output from the driving electrode TX0. The driving unit 12 may receive a signal including capacitance variation information due to the proximity of the object from the plurality of driving electrodes TX0, TX1, . . . and detect the capacitance variation information due to the proximity of the object to transmit the capacitance variation information to the control unit 13. The control unit 13 may sense whether the object is approaching based on the received capacitance variation information due to the proximity of the object.

As in an embodiment of the present invention, the guard electrode GX is disposed to overlap some of the driving electrodes TX0 of the plurality of driving electrodes, and since the driving signal is applied to the guard electrodes GX, which overlap each other, the corresponding driving electrode TX0 is blocked from the ground of the touch input device and the formation of the capacitance. Thus, since the signal output from the corresponding driving electrode TX0 includes only capacitance variation information with the approaching object, the control unit 13 illustrated in FIG. 1 may sense whether the object is approaching from the signal.

In addition, the guard electrode GX according to an embodiment of the present invention may be formed on an unused area in the layer (first layer) in which some components (first and second connection patterns 335 and 337) of the plurality of receiving electrodes RX0', RX1', . . . are disposed. Therefore, there is no need to provide a separate layer for the guard electrode GX, and when some components (first and second connection patterns 335 and 337) of the plurality of receiving electrodes RX0', RX1', . . . are manufactured using the metal mesh, since the guard electrode GX is also manufactured, manufacturing cost may be reduced, and the touch input device may be miniaturized.

As illustrated in FIG. 35, each of the plurality of receiving electrodes RX0', RX1', RX2, . . . illustrated in FIG. 35 may include a first receiving pattern part 331, a second receiving pattern part 333, a first connection pattern 335 and a second connection pattern 337.

The first receiving pattern part 331 and the second receiving pattern part 333 are disposed between two driving pattern parts 311 adjacent to each of the driving electrodes TX0, TX1, TX2, . . . .

The first receiving pattern part 331 has an inverted triangular shape, and the second receiving pattern part 333 has a triangular shape that is symmetrical to the first receiving pattern part 331. Here, the first and second receiving pattern parts 331 and 333 are not limited to the triangular shapes. For example, although not shown in the drawing, each of the first and second receiving pattern parts 331 and 333 may have a shape surrounding an outer circumference of one driving pattern part 331, and each of the first and second receiving pattern parts surrounding the outer circumference of the driving pattern part 331 may have a rectangular or polygonal shape as a whole.

The first receiving pattern part 331 and the second receiving pattern part 333 may have the same size and shape. The first receiving pattern part 331 and the second receiving pattern part 333 may have the same cross-sectional area.

The second receiving pattern part 333 is disposed to be spaced a predetermined distance under the first receiving pattern part 331. Alternatively, the second receiving pattern part 333 is disposed to be spaced a predetermined distance from the first receiving pattern part 331 in the second direction perpendicular to the first direction.

The connection pattern 315 of each of the driving electrode TX0, TX1, TX2, . . . may be disposed between the first receiving pattern part 331 and the second receiving pattern part 333. The first receiving pattern part 331 is disposed on the connection pattern 315, and the second receiving pattern part 333 is disposed below the connection pattern 315.

The first receiving pattern part 331 and the second receiving pattern part 333 are provided in plurality, which are alternately arranged in the second direction.

The plurality of first receiving pattern parts 331 and the plurality of second receiving pattern parts 333, which are alternately arranged in the second direction, are electrically connected by the first connection pattern 335 and the second connection pattern 337. Here, the first connection pattern 335 and the second connection pattern 337 may be electrically connected to the plurality of first receiving pattern parts 331 and the plurality of second receiving pattern parts 333 through conductive vias.

The first connection pattern 335 and the second connection pattern 337 may be disposed on a layer (first layer) different from a layer (second layer) on which the first receiving pattern part 331 and the second receiving pattern part 333 are disposed. This is to prevent electrical short-circuit with the driving electrodes TX0, TX1, TX2, . . . disposed on the layer (second layer) on which the second receiving pattern part 333 is disposed. An insulating layer may be disposed between the layer (second layer), on which the first receiving pattern part 331 and the second receiving pattern part 333 are disposed, and the other layer (first layer).

When the first receiving pattern part 331 and the second receiving pattern part 333, which are adjacent to each other in the vertical direction with the connection pattern 315 therebetween, are defined as one group, the plurality of first receiving pattern parts 331 and the plurality of second receiving pattern parts 333 alternately arranged in the second direction may be defined as a plurality of groups arranged in the second direction. Under this definition, the first connection pattern 335 electrically connects the first receiving pattern parts 0-0-1, 2-0-1, . . . and the second receiving pattern parts 0-0-2, 2-0-2, . . . of odd-numbered groups from the top. The second connection pattern 337 electrically connects the first receiving pattern part 331 and the second receiving pattern part 333 of each of even-numbered groups from the top.

The first connection pattern 335 electrically connects the first receiving pattern parts 0-0-1, 2-0-1, . . . and the second receiving pattern parts 0-0-2, 2-0-2, . . . , which are disposed between the two driving pattern parts 311 adjacent in a left and right directions in the odd-numbered driving electrodes TX0, TX2, . . . . In addition, the first connection pattern 335 electrically connects a second receiving pattern part 0-0-2 disposed between the two driving pattern parts 311 adjacent in the left and right direction in one odd-numbered driving electrode TX0 and a first receiving pattern part 2-0-1 disposed between the two driving pattern parts adjacent to each other in the left and right direction in the other odd-numbered driving electrode TX3 disposed next to the one driving electrode TX0. The odd-numbered driving electrodes TX0, TX2, . . . are electrically connected by the first connection pattern 335.

The second connection pattern 337 electrically connects the first receiving pattern part 331 and the second receiving pattern part 333, which are disposed between the two driving pattern parts 311 adjacent to the left and right direction in the even-numbered driving electrodes TX1, . . . . In addition, the second connection pattern 337 electrically connects a second receiving pattern part 333 disposed between the two driving pattern parts 311 adjacent in the left and right direction in one even-numbered driving electrode TX1 and a first receiving pattern part 3-0-1 disposed between the two driving pattern parts adjacent to each other in the left and right direction in the other even-numbered driving electrode disposed next to the one driving electrode TX1. The even-numbered driving electrodes TX1, TX3, . . . are electrically connected by the second connection pattern 337.

The first signal is output through the first connection pattern 335, and the second signal is output through the second connection pattern 337. Thus, signals having two channels are output from each of the receiving electrode RX0', RX1', RX2', . . . .

According to the driving electrodes TX0, TX1, TX2, . . . to which the driving signal is applied, one of the first signal and the second signal may be an active channel signal, and the other may be a dummy channel signal. When the driving signal is applied to the odd-numbered driving electrodes TX0, TX2, . . . , the first signal output through the first connection pattern 335 may be an active channel signal, and the second signal output through the second connection pattern 337 may be a dummy channel signal. When the driving signal is applied to the even-numbered driving electrodes TX1, . . . , the second signal output through the second connection pattern 337 may be an active channel signal, and the first signal output through the first connection pattern 335 may be a dummy channel signal.

For example, in FIG. 3, it is assumed that the driving signal (TX signal) is applied to the first driving electrode TX1, and an object (dotted line) is in contact with an intersection of the first driving electrode TX1 and the zero-th receiving electrode RX0'.

When the driving signal is applied to the first driving electrode TX1, and the object (dotted line) is disposed on a partial area including the intersection of the first driving electrode TX1 and the second receiving electrode RX0', a capacitance (or active capacitance) disposed between the driving pattern part 311 of the first driving electrode TX1 and the first receiving pattern part 331 of the zero-th receiving electrode RX0' varies. The second signal including capacitance variation information is output through the second connection pattern 337. Here, the second signal may include an LGM noise signal and a display noise signal by the display panel.

Also, a capacitance (or dummy capacitance) generated between the driving pattern part 311 of the first driving electrode TX1 and the second receiving pattern part 0-0-2 of the zero-th receiving electrode RX0' also varies. The first signal including capacitance variation information is output through the first connection pattern 335. Here, the first signal may include an LGM noise signal and a display noise signal by the display panel.

Here, since the first receiving pattern part 331 and the second receiving pattern part 0-0-2, which are in contact with the object (dotted line), have the same cross-sectional area, almost the same or similar LGM noise signals may be input to each of the first receiving pattern part 331 and the second receiving pattern part 0-0-2, and the display noise signal by the display panel may also be input almost identically.

The sensing unit 11 illustrated in FIG. 1 may subtract the second signal output through the first connection pattern 335 from the first signal output through the second connection pattern 337 to offset the LGM noise signal and the display noise signal, which are input into the first receiving pattern 331 and the second receiving pattern part 0-0-2. Although a variation of the active capacitance contained in the second signal, which is the active channel signal, is reduced by the subtraction, since the variation in dummy capacitance contained in the first signal is relatively small, there is no problem in whether the touch occurs or/and detection of a touch position.

In addition, since the first receiving pattern part 331 serves as an AC ground between the driving pattern part 311 and the second receiving pattern part 0-0-2, the variation in capacitance contained in the second signal output through the first receiving pattern part 331 may increase, and the variation in capacitance contained in the first signal output from the second receiving pattern part 0-0-2 may be reduced. In this regard, it is replaced with FIG. 4 and the above-described contents of FIG. 4.

Figure 36:
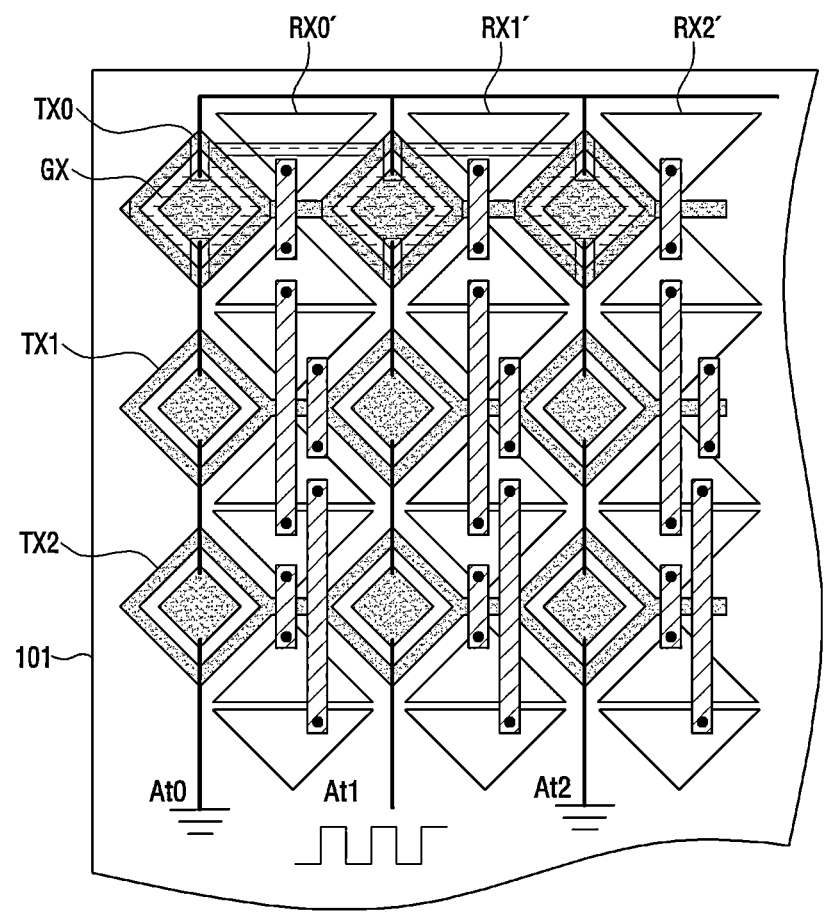
FIG. 36 is a plan view of a touch sensor according to further another embodiment of the present invention.
Figure 37:
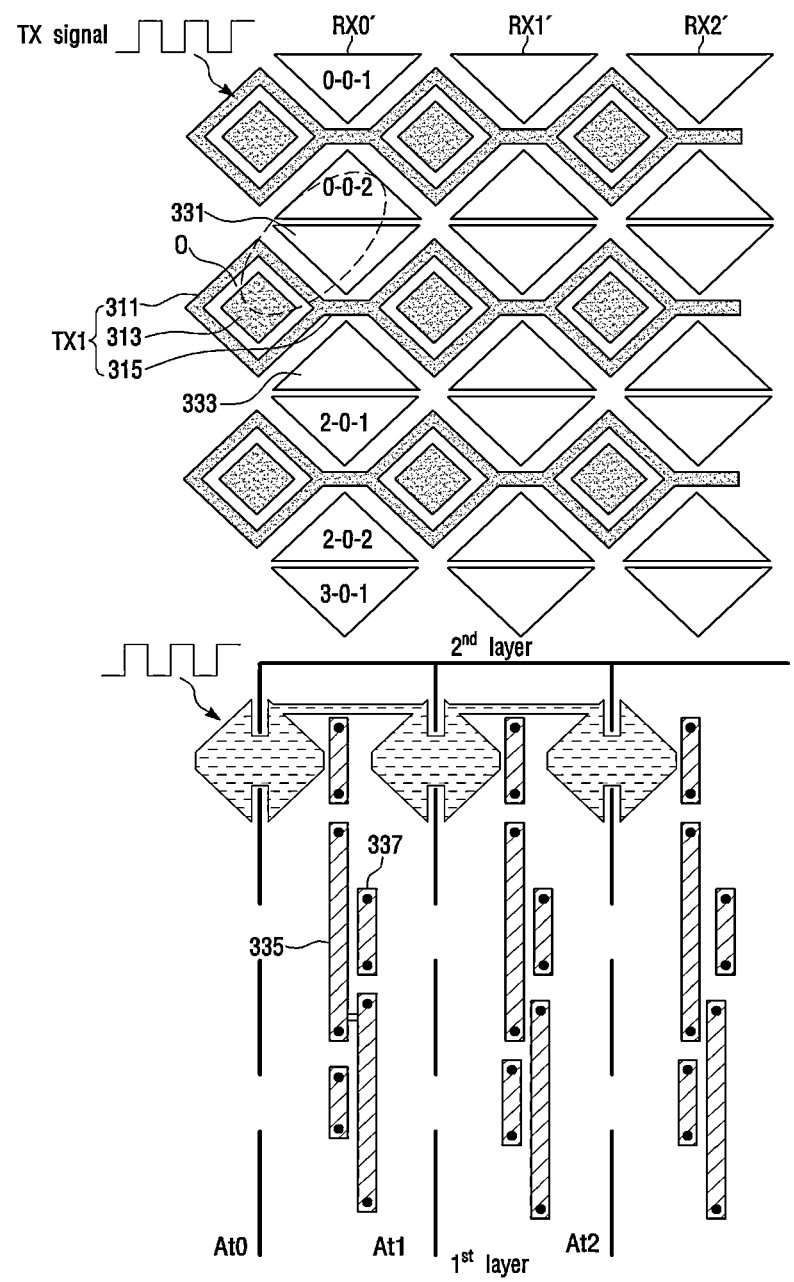
FIG. 37 is a plan view illustrating a state in which the touch sensor of FIG. 36 is divided into two layers.

FIG. 36 is a plan view of a touch sensor according to further another embodiment of the present invention, and FIG. 37 is a plan view illustrating a state in which the touch sensor of FIG. 36 is divided into two layers.

When compared to the touch sensor illustrated in FIGS. 34 and 35, the touch sensor illustrated in FIGS. 36 and 37 according to further another embodiment of the present invention further includes conductive patterns At0, At1, At2, . . . Therefore, hereinafter, the conductive patterns At0, At1, At2, . . . will be described in detail, and the remaining components will be replaced with the previously described contents.

Referring to FIGS. 36 and 37, a touch sensor according to further another embodiment of the present invention may have at least one or more conductive loops At1-At0 and At1-At2.

At least one or more conductive loops At1-At0 and At1-At2 generate a magnetic field signal for driving the stylus pen. The generated magnetic field signal may resonate with a resonator inside the stylus pen to drive the stylus pen.

The at least one or more conductive loops At1-At0 and At1-At2 may include a first loop At1-At0 and a second loop At1-At2. Although two loops are illustrated in FIGS. 36 and 37, the present invention is not limited thereto, and the touch sensor according to a further another embodiment of the present invention may include three or more conductive loops. Hereinafter, for convenience of description, two conductive loops At1-At0 and At1-At2 will be used.

The first loop At1-At0 is provided by electrically connecting the zero-th conductive pattern At0 to the first conductive pattern At01.

The zero-th conductive pattern At0 is disposed in the second direction in which the receiving electrodes RX0', RX1', RX2', . . . are arranged, and one driving dummy pattern part 313 is electrically connected for each of the driving electrodes TX0, TX1, TX2, . . . For example, as illustrated in FIGS. 36 and 37, the zero-th conductive pattern At0 is connected to the first driving dummy pattern part of the second driving electrode TX, connects the first driving dummy pattern part of the second driving electrode TX2 to the first driving dummy pattern part of the first driving electrode TX1, and connects the first driving dummy pattern part of the first driving electrode TX1 to the first driving dummy pattern part of the zero-th driving electrode TX0. In addition, the zero-th conductive pattern At0 extends from the first driving dummy pattern part 313 of the zero-th driving electrode TX0 in the second direction.

The first conductive pattern At1 is disposed in the second direction in which each of the receiving electrodes RX0, RX1, RX2, . . . is arranged, is disposed in parallel with the zero-th conductive pattern At0, and is electrically connected to one driving dummy pattern part for each of the electrodes TX0, TX1, TX2, . . . For example, as illustrated in FIGS. 36 and 37, the first conductive pattern At1 is connected to the second driving dummy pattern part of the second driving electrode TX2, connects the second driving dummy pattern part of the second driving electrode TX2 to the second driving dummy pattern part of the first driving electrode TX1, and connects the second driving dummy pattern part of the first driving electrode TX1 to the second driving dummy pattern part of the zero-th driving electrode TX0. In addition, the zero-th conductive pattern At0 extends from the second driving dummy pattern part of the zero-th driving electrode TX0 in the second direction.

The second loop At1-At2 is provided by electrically connecting the first conductive pattern At1 to the second conductive pattern At02.

The second conductive pattern At2 is disposed in the second direction in which each of the receiving electrodes RX0, RX1, RX2, . . . is arranged, is disposed in parallel with the zero-th conductive pattern At0, and is electrically connected to one driving dummy pattern part for each of the electrodes TX0, TX1, TX2, . . . For example, as illustrated in FIGS. 36 and 37, the second conductive pattern At2 is connected to the third driving dummy pattern part of the second driving electrode TX2, connects the third driving dummy pattern part of the second driving electrode TX2 to the third driving dummy pattern part of the first driving electrode TX1, and connects the third driving dummy pattern part of the first driving electrode TX1 to the third driving dummy pattern part of the zero driving electrode TX0. In addition, the zero-th conductive pattern At0 extends from the third driving dummy pattern part of the zero-th driving electrode TX0 in the second direction.

One ends of the plurality of conductive patterns At0, At1, and At2 may be connected to each other.

A loop driving signal (loop TX) may be applied to any one of the plurality of conductive patterns At0, At1, and At2, and the two conductive patterns disposed adjacent to each other at both sides of the one conductive pattern are may be grounded. Here, the loop driving signal may be a signal provided by the driving unit 12 under the control of the control unit 13 illustrated in FIG. 1 as a signal having a resonance frequency capable of resonating the stylus pen. In addition, a signal having a phase opposite to that of the loop driving signal, rather than a ground, may be applied to the two conductive patterns. When the signal having the phase opposite to that of the loop driving signal is applied to the two conductive patterns, an amplitude of the current loop may be doubled, and a flicker phenomenon that may occur in the display panel of the touch input device may be removed.

For example, a loop driving signal may be applied to the first conductive pattern At1, and the zero-th conductive pattern At0 and the second conductive pattern At2 disposed adjacent to both sides of the first conductive pattern At1 may be connected to the ground. Since the loop driving signal is applied to the first conductive pattern At1, the first conductive pattern At1 and the zero-th conductive pattern At0 generate current in a counterclockwise direction, and the first conductive pattern At1 and the second conductive pattern At1 generate current in a clockwise direction. This generates two current loops. A predetermined magnetic field signal may be generated by the generated current loop, and the generated magnetic field signal may resonate with a resonance part of the stylus pen when the stylus pen is disposed in the current loop, and the stylus pen may be driven by the resonance.

As described above, the touch sensor illustrated in FIGS. 36 and 37 and the touch input device including the same may perform hovering touch sensing using the guard electrode GX, touch sensing sensitivity may be improved by the first and second receiving pattern parts 331 and 333, and the magnetic field signal for driving the stylus pen may be generated using the conductive patterns At0, At1, and At2.

In addition, the conductive patterns At0, At1, and At2 are disposed on the unused area in the layer (first layer) on which some components (first and second connection patterns 335 and 337) of the plurality of receiving electrodes RX0', RX1', . . . and the guard electrode GX may be disposed. Therefore, there is no need to provide a separate layer for the conductive patterns At0, At1, and At2, and when some components (first and second connection patterns 335 and 337) of the plurality of receiving electrodes RX0', RX1, . . . , and the guard electrode GX are manufactured using the metal mash, since the conductive patterns At0, At1, and At2 may be also manufactured, the manufacturing cost may be reduced, and the touch input device may be miniaturized.

Figure 38:
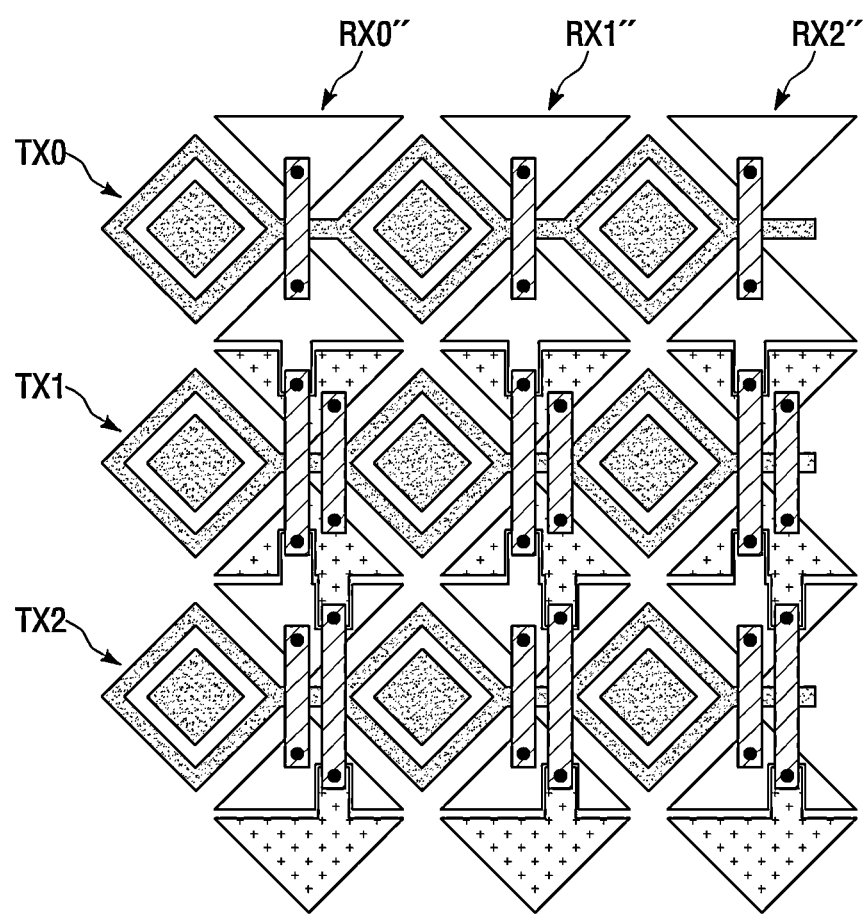
FIG. 38 is a plan view of a touch sensor according to a modified example of the touch sensor of FIG. 34.
Figure 39:
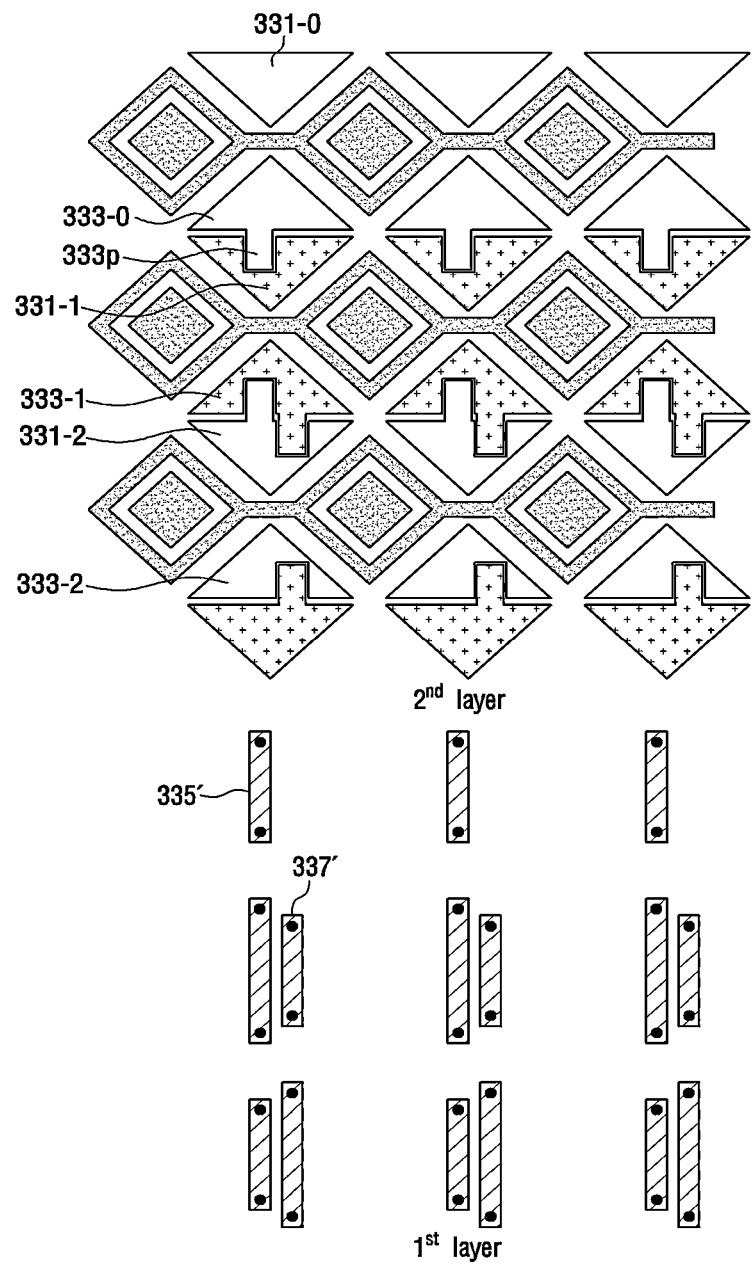
FIG. 39 is a plan view illustrating a state in which the touch sensor of FIG. 38 is divided into two layers.

FIG. 38 is a plan view of a touch sensor according to a modified example of the touch sensor of FIG. 34, and FIG. 39 is a plan view illustrating a state in which the touch sensor of FIG. 38 is divided into two layers.

When compared with the touch sensors illustrated in FIGS. 34 and 35, in the touch sensor illustrated in FIGS. 38 and 39, a plurality of driving electrodes TX0, TX1, TX2, . . . are the same, but there is a difference in a plurality of receiving electrodes RX0", RX1", RX2", . . . . Therefore, hereinafter, the plurality of receiving electrodes RX0", RX1", RX2", . . . will be described in detail, and the descriptions of the plurality of driving electrodes TX0, TX1, TX2, . . . are replaced with the above-described contents. In addition, in the plurality of receiving electrodes RX0", RX1", RX2", . . . , descriptions of the same parts as the plurality of receiving electrodes RX0', RX1', RX2', . . . of the touch sensors illustrated in FIGS. 34 and 35 are replaced with the above-described contents.

When compared to the touch sensors illustrated in FIGS. 34 and 35, in the touch sensors illustrated in FIGS. 38 and 39, since a capacitance generated between the first and second receiving pattern parts disposed on different layers and a capacitance generated between the first and second connection patterns are reduced, there is an advantage in that a value of an RC time constant may be reduced.

Shapes of some of the first and second receiving pattern parts 331-1, 333-1, 331-2, 333-2, and 331-3 are different from those of the first and second receiving pattern parts 331 and 333 of the touch sensor illustrated in FIGS. 34 and 35.

The plurality of receiving electrodes RX0", RX1", RX2", . . . include a plurality of first receiving pattern parts 331-0, 331-1, 331-2, . . . and a plurality of second receiving pattern parts 331-0, 331-1, 331-2, . . . , and the plurality of second receiving pattern parts 333-0, 333-1, 333-2, . . . and the receiving pattern parts 333-0, 333-1, 333-2, . . . are alternately arranged in the second direction.

When one first receiving pattern part 331-0 and one second receiving pattern part 333-0 constitute one group, a plurality of groups may be arranged in the second direction.

One first receiving pattern part 331-1 of the plurality of first receiving pattern parts 331-0, 331-1, and 331-2 includes a recess pattern part corresponding to a protruding pattern part 333p of a second receiving pattern part 333-0 of another group adjacent to the group belonging to the one first receiving pattern part 331-1.

In addition, one second receiving pattern part 333-1 of the plurality of second receiving pattern parts 333-0, 333-1, and 333-2 includes a recess pattern part corresponding to a protruding pattern part of a first receiving pattern part 331-2 of another group adjacent to the group belonging to the one second receiving pattern part 333-1.

A minimum interval between the second receiving pattern part 333-0 of another group and the first receiving pattern part 331-2 of another group is shorter than a corresponding interval in the touch sensor illustrated in FIG. 2 by the protruding pattern part 333p of the second receiving pattern part 333-0 of another group and the protruding pattern part of the first receiving pattern part 331-2 of another group. Therefore, a length of a first connection pattern 335' connecting the second receiving pattern part 333-0 of another group to the first receiving pattern part 331-2 of another group may be reduced, and furthermore, a capacitance generated between the first and second receiving pattern parts 331-1 and 333-1 that overlap each other, but are not electrically connected to each other may be reduced.

The touch sensor illustrated in FIGS. 38 to 39 and the touch input device including the same may also perform hover sensing by applying the guard electrode GX illustrated in FIGS. 34 to 35 as it is, and the conductive pattern At0, At1, and At2 illustrated in FIG. 36 may be applied to drive the stylus pen.

Figure 40:
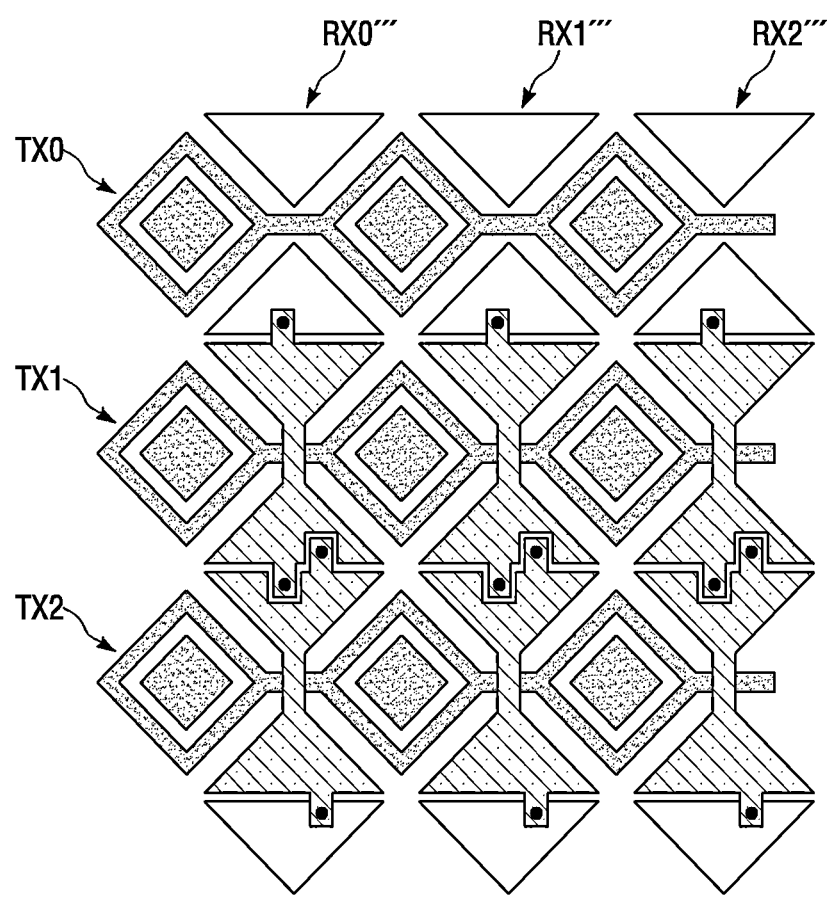
FIG. 40 is a partial plan view of a touch sensor according to another modified example of the touch sensor of FIG. 34.
Figure 41:
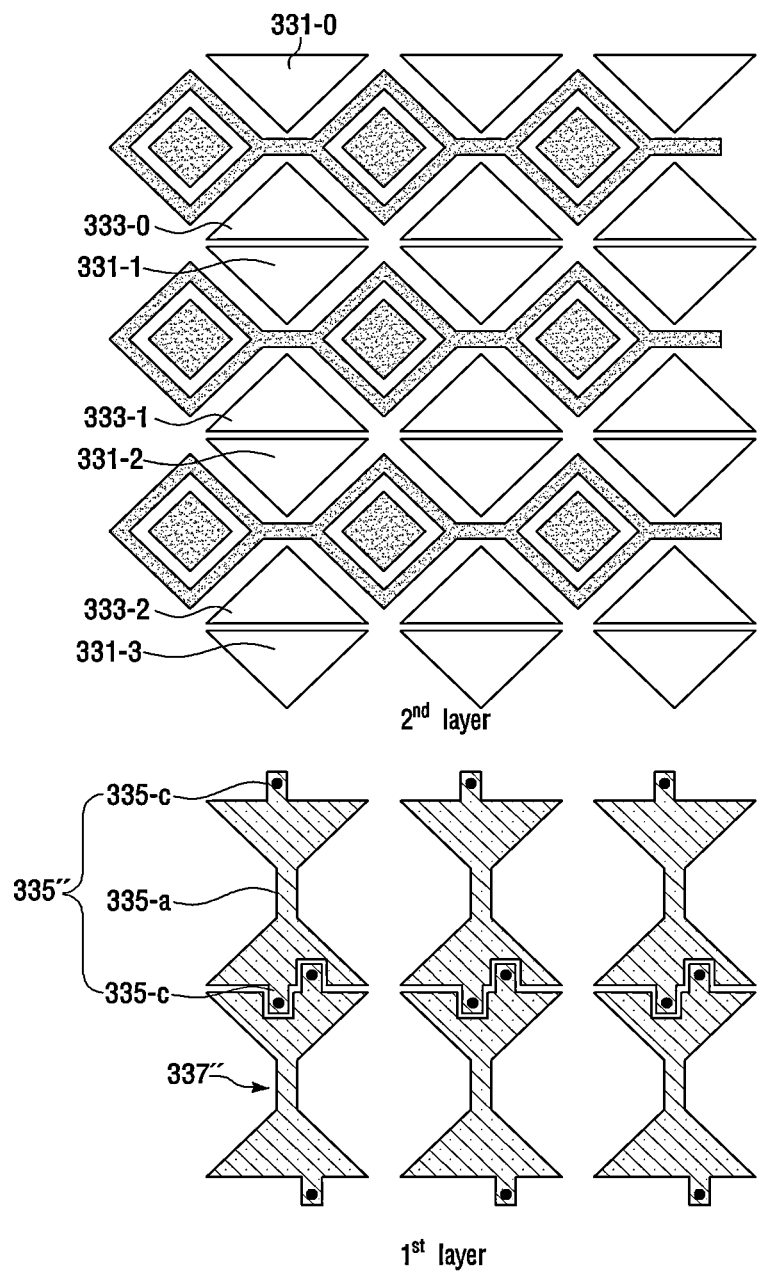
FIG. 41 is a plan view illustrating a state in which the touch sensor of FIG. 40 is divided into two layers.

FIG. 40 is a partial plan view of a touch sensor according to another modified example of the touch sensor of FIG. 34, and FIG. 41 is a plan view illustrating a state in which the touch sensor of FIG. 40 is divided into two layers.

When compared with the touch sensors illustrated in FIGS. 34 and 35, in the touch sensor illustrated in FIGS. 40 and 41, a plurality of driving electrodes TX0, TX1, TX2, . . . are the same, but there is a difference in a plurality of receiving electrodes RX0''', RX1''', RX2''', .... Therefore, hereinafter, the plurality of receiving electrodes RX0''', RX1''', RX2''', . . . will be described in detail, and the descriptions of the plurality of driving electrodes TX0, TX1, TX2, . . . are replaced with the above-described contents. In addition, in the plurality of receiving electrodes RX0''', RX1''', RX2''', . . . , descriptions of the same parts as the plurality of receiving electrodes RX0', RX1', RX2', . . . of the touch sensors illustrated in FIGS. 34 and 35 are replaced with the above-described contents.

Shapes and arrangement of the first and second receiving pattern parts 331-0, 333-0, 331-1, 333-1, 331-2, 333-2, and 331-3 are the same as the shapes and arrangement of the first and second receiving pattern parts 331 and 333 of each of the touch sensors illustrated in FIGS. 34 and 35.

When one first receiving pattern part 331-0 and one second receiving pattern part 333-0 constitute one group, a plurality of groups may be arranged in the second direction.

A first connection pattern 335'' electrically connects odd-numbered groups of a plurality of groups and has a corresponding pattern 335-a, which is disposed at a position overlapping the first and second receiving pattern parts 331-1 and 333-1 of even-numbered groups, is not electrically connected to the first and second receiving pattern parts 331-1 and 333-1, and has a shape corresponding to that of each of the first and second receiving pattern parts 331-1 and 333-1 of even-numbered groups. In addition, the first connection pattern 335'' may include an extension pattern 335-c extending from the corresponding pattern 335-a toward the first and second receiving pattern parts 331-0, 333-0, 331-2, and 333-2 of odd-numbered groups.

A second connection pattern 337'' electrically connects even-numbered groups of a plurality of groups and has a corresponding pattern, which is disposed at a position overlapping the first and second receiving pattern parts 331-2 and 333-2 of the odd-numbered groups, is not electrically connected to the first and second receiving pattern parts 331-2 and 333-2, and has a shape corresponding to that of each of the first and second receiving pattern parts 331-1 and 333-1 of the odd-numbered groups. In addition, the second connection pattern 337'' may include an extension pattern extending from the corresponding pattern toward the first and second receiving pattern parts 331-1, 333-1, and 331-3 of the even-numbered groups.

When compared to the touch sensors illustrated in FIGS. 40 and 41, each of the touch sensors illustrated in FIGS. 34 and 35 has an advantage in that a capacitance between the corresponding pattern 335-a and the first and second receiving pattern parts 331-1 and 331-2, which overlap the corresponding pattern 335-a, but are not electrically connected to each other, slightly increases, but resistance decreases because a cross-sectional area of the first connection pattern 335'' is widened.

The touch sensor illustrated in FIGS. 40 to 41 and the touch input device including the same may also perform hover sensing by applying the guard electrode GX illustrated in FIGS. 34 to 35 as it is, and the conductive pattern At0, At1, and At2 illustrated in FIG. 36 may be applied to drive the stylus pen.

Figure 42:
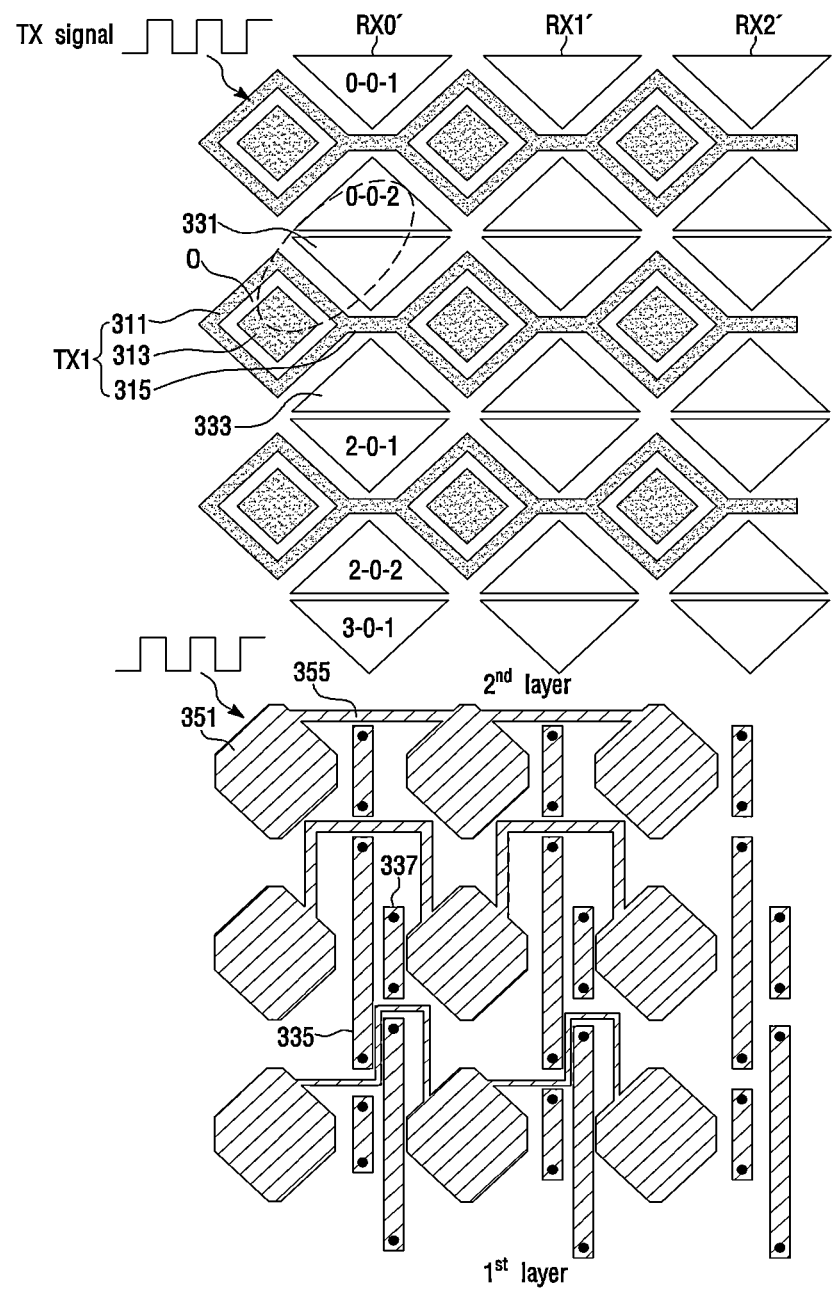
FIG. 42 is a plan view illustrating a modified example of the touch sensor of FIGS. 34 and 35, which is divided into two layers.

FIG. 42 is a plan view illustrating a modified example of the touch sensor of FIGS. 34 and 35, which is divided into two layers.

Referring to FIG. 42, a plurality of guard electrodes GX are provided, and the plurality of guard electrodes GX may be disposed to overlap the entirety of the plurality of driving electrodes TX0, TX1, TX2, . . . .

When the plurality of guard electrodes GX are disposed to overlap the entirety of the plurality of driving electrodes TX0, TX1, TX2, . . . , there is an advantage in that hover sensing or proximity sensing is performed on the entire active area of the touch input device.

The connection patterns 355 of each of the guard electrodes GX may be arranged so as not to be short-circuited with the first and second connection patterns 335 and 337 of the plurality of receiving electrodes RX0', RX1, RX2', . . . .

The configuration in which the plurality of guard electrodes GX illustrated in FIG. 42 are arranged to overlap the entirety of the plurality of driving electrodes TX0, TX1, TX2, . . . may also be applied to the touch sensor illustrated in FIGS. 32, 36, 38, and 40.

When the touch sensor and the touch input device including the same according to the embodiment of the present invention are used, the touch sensing sensitivity may be improved.

In addition, when the driving signal is applied to the driving electrode, there may be the advantage of being able to increase in active capacitance variation contained in the signal output from the receiving electrode and reduce the dummy capacitance variation.

In addition, there may be the advantage of being able to drive the stylus pen.

In addition, there may be the advantage in that the position of the stylus pen is sensed by sensing the signal output from the stylus pen.

In addition, there may be the advantage that the hovering touch sensing is possible.

Features, structures, and effects described in the above embodiments are incorporated into one embodiment, but are not limited to only one embodiment. Furthermore, features, structures, and effects exemplified in one embodiment can easily be combined and modified for another embodiment by those skilled in the art. Therefore, these combinations and modifications should be construed as falling within the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch input device comprising:
a touch sensor comprising a plurality of first electrodes, a plurality of second electrodes, and a plurality of conductive patterns;
a driving unit configured to apply a driving signal and a loop driving signal to the touch sensor; a sensing unit configured to sense a receiving signal from the touch sensor; and a control unit configured to control the driving unit and the sensing unit,
wherein a first electrode of the plurality of first electrodes comprises a plurality of first pattern parts which are arranged in a first direction and each of which has an opening therein, a first dummy pattern part disposed in the opening of a first pattern part of the plurality of first pattern parts, and a connection pattern configured to electrically connect two first pattern parts, which are adjacent to each other, of the plurality of first pattern parts, wherein a second electrode of the plurality of second electrodes extends in a second direction perpendicular to the first direction, wherein a conductive pattern of the plurality of conductive patterns extends in the second direction and is electrically connected to the first dummy pattern part of each of the plurality of first electrodes, and wherein two or more conductive patterns of the plurality of conductive patterns are connected to each other to constitute a current loop in which a magnetic field signal is provided to a stylus pen.

2. The touch input device of claim 1, wherein the conductive pattern has one end connected to one end of a second conductive pattern of the plurality of conductive patterns to constitute the current loop.

3. The touch input device of claim 2, wherein one ends of the plurality of conductive patterns are connected to each other to constitute a plurality of current loops.

4. The touch input device of claim 1, wherein the second electrode comprises a plurality of second pattern parts which are arranged in the second direction and each of which has an opening therein, a second dummy pattern part disposed in the opening of a second pattern part of the plurality of second pattern parts, and a second connection pattern configured to electrically connect two second pattern parts, which are adjacent to each other, of the plurality of second pattern parts to each other.

5. The touch input device of claim 1, wherein the first electrode is a driving electrode, and the second electrode is a receiving electrode, wherein, in the receiving electrode, a first receiving pattern part and a second receiving pattern part, which are disposed with the connection pattern of the driving electrode therebetween, are alternatively arranged in the second direction.

6. The touch input device of claim 5, wherein the first receiving pattern part and the second receiving pattern part are symmetrical to each other based on the connection pattern of the driving electrode.

7. The touch input device of claim 1, wherein the control unit is configured to control the driving unit so as to apply the loop driving signal to one of two conductive patterns constituting the current loop and allow the other one to be grounded or apply a signal having a phase opposite to a phase of the loop driving signal to the other one.

8. The touch input device of claim 1, wherein the control unit is configured to control the driving unit so as to allow one of the plurality of conductive patterns to be grounded and apply the loop driving signal to other conductive patterns.

9. The touch input device of claim 1, wherein the conductive pattern comprises a pattern part configured to overlap the first dummy pattern part and electrically connected to the first dummy pattern part.

10. A touch input device comprising:
a touch sensor comprising a plurality of first electrodes, a plurality of second electrodes, and a plurality of conductive patterns;
a driving unit configured to apply a driving signal and a loop driving signal to the touch sensor; a sensing unit configured to sense a receiving signal from the touch sensor; and a control unit configured to control the driving unit and the sensing unit,
wherein a first electrode of the plurality of first electrodes comprises a plurality of first pattern parts which are arranged in a first direction and each of which has an opening therein, a first dummy pattern part disposed in the opening of a first pattern part of the plurality of first pattern parts, and a connection pattern configured to electrically connect two first pattern parts, which are adjacent to each other, of the plurality of first pattern parts, wherein a second electrode of the plurality of second electrodes extends in a second direction perpendicular to the first direction, wherein a conductive pattern of the plurality of conductive patterns extends in the second direction and is electrically connected to the first dummy pattern part of each of the plurality of first electrodes, and wherein two or more conductive patterns of the plurality of conductive patterns are connected to each other to constitute a current loop in which a magnetic field signal is provided to a stylus pen, wherein the first electrode is a driving electrode, and the second electrode is a receiving electrode, wherein, in the receiving electrode, a first receiving pattern part and a second receiving pattern part, which are disposed with the connection pattern of the driving electrode therebetween, are alternatively arranged in the second direction, wherein the receiving electrode comprises a first connection pattern and a second connection pattern, wherein the first and second connection patterns are disposed on a layer different from that on which the first and second receiving pattern parts are disposed, wherein the first receiving pattern part and the second receiving pattern parts, which are disposed with the connection pattern of the driving electrode therebetween are configured to constitute one group, wherein the first connection pattern is configured to electrically connect the first receiving pattern part and the second receiving pattern part of each of odd-numbered groups of a plurality of groups in the second direction to each other, and electrically connect the odd-numbered groups to each other, and wherein the second connection pattern is configured to electrically connect the first receiving pattern part and the second receiving pattern part of each of even-numbered groups of the plurality of groups in the second direction, and electrically connect the even-numbered groups to each other.

11. The touch input device of claim 10, wherein the first receiving pattern part of one group of the plurality of groups has a recessed pattern part corresponding to a protruding pattern part of the second receiving pattern part of a second group of the plurality of groups, which is adjacent to the first receiving pattern part of the one group, the second receiving pattern part of the one group has a recessed pattern part corresponding to a protruding pattern part of the first receiving pattern part of a third group of the plurality of groups, which is adjacent to the second receiving pattern part of the one group, and the first connection pattern is configured to connect the protruding pattern part of the second receiving pattern part of the second group to the protruding pattern part of the first receiving pattern part of the third group.

12. The touch input device of claim 10, wherein the first connection pattern comprises:
a corresponding pattern having a shape corresponding to that of each of the first and second receiving pattern parts of even-numbered groups of the plurality of groups and disposed to overlap the first and second receiving pattern parts; and an extension pattern extending in a direction of the odd-numbered groups from the corresponding pattern.

13. A touch input device comprising:
a touch sensor comprising a plurality of first electrodes, a plurality of second electrodes, and a plurality of conductive patterns;
a driving unit configured to apply a driving signal and a loop driving signal to the touch sensor; a sensing unit configured to sense a receiving signal from the touch sensor; and a control unit configured to control the driving unit and the sensing unit,
wherein a first electrode of the plurality of first electrodes comprises a plurality of first pattern parts which are arranged in a first direction and each of which has an opening therein, a first dummy pattern part disposed in the opening of a first pattern part of the plurality of first pattern parts, and a connection pattern configured to electrically connect two first pattern parts, which are adjacent to each other, of the plurality of first pattern parts,
wherein a second electrode of the plurality of second electrodes extends in a second direction perpendicular to the first direction,
wherein a conductive pattern of the plurality of conductive patterns extends in the second direction and is electrically connected to the first dummy pattern part of each of the plurality of first electrodes, and wherein two or more conductive patterns of the plurality of conductive patterns are connected to each other to constitute a current loop in which a magnetic field signal is provided to a stylus pen,
wherein the control unit is configured to control the driving unit so that a first loop driving signal is applied to at least one or more conductive patterns of the plurality of conductive patterns disposed at one side based on a position of the stylus pen, and a second loop driving signal is applied to at least one or more conductive patterns of the plurality of conductive patterns disposed at the other side based on the position of the stylus pen, wherein the second loop driving signal is a signal having a phase opposite to that of the first loop driving signal.

14. The touch input device of claim 13, wherein at least one or more conductive patterns, to which the first loop driving signal is applied, and at least one or more conductive patterns, to which the second loop driving signal is applied, are symmetrical to each other based on the position of the stylus pen.

* * * * *